US011825544B1

(12) United States Patent
Jeon et al.

(10) Patent No.: US 11,825,544 B1
(45) Date of Patent: Nov. 21, 2023

(54) POWER CONTROL FOR SMALL DATA TRANSMISSION

(71) Applicant: Ofinno, LLC, Reston, VA (US)

(72) Inventors: Hyoungsuk Jeon, Centreville, VA (US); Taehun Kim, Fairfax, VA (US); Esmael Hejazi Dinan, McLean, VA (US); Kyungmin Park, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/223,774

(22) Filed: Jul. 19, 2023

Related U.S. Application Data

(63) Continuation of application No. PCT/US2022/012978, filed on Jan. 19, 2022.

(60) Provisional application No. 63/139,164, filed on Jan. 19, 2021.

(51) Int. Cl.
*H04W 76/27* (2018.01)
*H04W 52/28* (2009.01)
*H04W 52/14* (2009.01)

(52) U.S. Cl.
CPC ......... *H04W 76/27* (2018.02); *H04W 52/146* (2013.01); *H04W 52/28* (2013.01)

(58) Field of Classification Search
CPC ..... H04W 76/28; H04W 76/27; H04W 76/30; H04W 74/00; H04W 76/10; H04W 72/04; H04W 74/08; H04W 52/36; H04W 52/04
See application file for complete search history.

(56) References Cited

U.S. PATENT DOCUMENTS

2021/0259040 A1\* 8/2021 Babaei .................. H04W 72/23

FOREIGN PATENT DOCUMENTS

| WO | 2019/160343 A1 | 8/2019 |
| WO | 2020/020290 A1 | 1/2020 |
| WO | 2020/164621 A1 | 8/2020 |
| WO | 2020/167102 A1 | 8/2020 |

OTHER PUBLICATIONS

3GPP TS 38.211 V16.3.0 (Sep. 2020); Technical Specification; 3rd Generation Partnership Project; Technical Specification Group Radio Access Network; NR; Physical channels and modulation; (Release 16).

(Continued)

*Primary Examiner* — Tu X Nguyen
(74) *Attorney, Agent, or Firm* — Brett Gardner; Kavon Nasabzadeh; Philip R. Smith

(57) ABSTRACT

A wireless device receives a radio resource control (RRC) release message indicating a small data transmission (SDT) time window for an SDT in an RRC inactive state. The wireless device transmits, during the SDT time window, an initial uplink transmission using a first power control adjustment (PCA) state being reset to zero. The wireless device transmits, using a second PCA state, a second uplink transmission. In response to the second uplink transmission being subsequent to the initial uplink transmission during the SDT time window, the second PCA state is based on the first PCA state and one or more transmit power control command values received during the SDT time window.

20 Claims, 26 Drawing Sheets

(56) References Cited

OTHER PUBLICATIONS

3GPP TS 38.212 V16.3.0 (Sep. 2020); Technical Specification; 3rd Generation Partnership Project; Technical Specification Group Radio Access Network; NR; Multiplexing and channel coding; (Release 16).
3GPP TS 38.213 V16.3.0 (Sep. 2020); Technical Specification; 3rd Generation Partnership Project; Technical Specification Group Radio Access Network; NR; Physical layer procedures for control; (Release 16).
3GPP TS 38.214 V16.3.0 (Sep. 2020); Technical Specification; 3rd Generation Partnership Project; Technical Specification Group Radio Access Network; NR; Physical layer procedures for data; (Release 16).
3GPP TS 38.300 V16.3.0 (Sep. 2020); Technical Specification; 3rd Generation Partnership Project; Technical Specification Group Radio Access Network; NR; NR and NG-RAN Overall Description; Stage 2; (Release 16).
3GPP TS 38.321 V16.2.1 (Sep. 2020); Technical Specification; 3rd Generation Partnership Project; Technical Specification Group Radio Access Network; NR; Medium Access Control (MAC) protocol specification; (Release 16).
3GPP TS 38.331 V16.2.0 (Sep. 2020); Technical Specification; 3rd Generation Partnership Project; Technical Specification Group Radio Access Network; NR; Radio Resource Control (RRC) protocol specification; (Release 16).
R2-2008935; 3GPP TSG-RAN WG2 Meeting #112 electronic; Online, Nov. 2020; Agenda Item: 8.6.5; Source: Panasonic; Title: Handling of subsequent small data transmission in RRC_INACTIVE; Document for: Discussion, Decision.
R2-2008961; 3GPP TSG-RAN WG2 Meeting #112-electronic; Online, Nov. 2-13, 2020; Source: vivo; Title: Supporting small data transmission via CG configuration; Agenda Item: 8.6.5; Document for: Discussion and Decision.
R2-2008995; 3GPP TSG RAN WG2 Meeting #112-e; Electronic meeting, Nov. 2-13, 2020; Agenda item: 8.6.5; Source: Intel Corporation; Title: Handling of Configured grant for SDT; Document for: Discussion, Decision.
R2-2009015; 3GPP TSG-RAN WG2 #112-e; E-meeting, Nov. 2020; Agenda Item: 8.6.5; Source: OPPO; Title: Discussion on CG-based SDT; Document for: Discussion, Decision.
R2-2009056; 3GPP TSG-RAN WG2 #112-e; E-meeting, Nov. 2-13, 2020; Title: RA-based SDT; Source: Mediatek Inc.; Agenda item: 8.6.4; Document for: Discussion and Decision.
R2-2009057; 3GPP TSG-RAN WG2 #112-e; E-meeting, Nov. 2-13, 2020; Title: CG-based SDT; Source: Mediatek Inc.; Agenda item: 8.6.5; Document for: Discussion and Decision.
R2-2009094; 3GPP TSG-RAN2 Meeting #112 Electronic; Nov. 2-Nov. 13, 2020; Agenda item: 8.6.5; Source: Samsung; Title: Configured Grant based Small Data Transmission; Document for: Discussion & Decision.
R2-2009192; 3GPP TSG-RAN WG2 #112e; eMeeting, Nov. 2-13, 2019; Agenda item: 8.6.5; Source: ZTE Corporation, Sanechips; Title: Configured grant based small data transmission; Document for: Discussion and Decision.
R2-2009345; 3GPP TSG-RAN WG2 #112-e; Online meeting, Nov. 2-13, 2020; Title: SDT handling in RRC_INACTIVE state; Source: ETRI; Agenda item: 8.6.5; Document for: Discussion.
R2-2009350; 3GPP TSG-RAN WG2 Meeting #112 Electronic; Elbonia, Nov. 2-13, 2020; Agenda item: 8.6.5; Source: Nokia, Nokia Shanghai Bell; Title: Discussion on aspects specific to CG based SDT; WID/SID: NR_SmallData_INACTIVE—Release 17; Document for: Discussion and Decision.
R2-2009493; 3GPP TSG-RAN WG2 Meeting #112-e; Online, Nov. 2-13, 2020; Agenda Item: 8.6.5; Source: Apple; Title: CG based SDT procedure; Document for: Discussion and Decision.
R2-2009649; 3GPP TSG-RAN WG2 Meeting #112 electronic; Online, Nov. 2-Nov. 13, 2020; Agenda Item: 8.6.5; Source: ITL; Title: TAT maintenance for CG based SDT; Document for: Discussion and decision.
R2-2009657; 3GPP TSG-RAN WG2 #112 electronic; E-Meeting, Nov. 2-13, 2020; Source: NEC; Agenda item: 8.6.4; Title: Subsequent data transmission for SDT; Document for: Discussion.
R2-2009872; (revision of R2-2007479); 3GPP TSG-RAN WG2 Meeting #112 electronic; E-meeting, Nov. 2-13, 2020; Agenda item: 8.6.4; Source: Lenovo, Motorola Mobility; Title: The basic principle for small data transmissions; Document for: Discussion and Decision.
R2-2009874; 3GPP TSG-RAN WG2 Meeting #112 electronic; Online, Nov. 2-13, 2020; Agenda item: 8.6.5; Source: Lenovo, Motorola Mobility; Title: Consideration on CG based small data transmission; Document for: Discussion and Decision.
R2-2009890; 3GPP TSG-RAN WG2 Meeting #112 electronic; Online, Nov. 2-13, 2020; Agenda Item: 8.6.5; Source: Sony; Title: Details of CG-based schemes for SDT in NR; Document for: Discussion and Decision.
R2-2009964; 3GPP TSG-RAN WG2 #112e; Electronic meeting, Nov. 2-13, 2020; Agenda Item: 8.6.5; Source: Ericsson; Title: Details of CG based SDT; Document for: Discussion, Decision.
R2-2009965; 3GPP TSG-RAN WG2 #112e; Electronic meeting, Nov. 2-13, 2020; Agenda Item: 8.6.4; Source: Ericsson; Title: Subsequent transmissions after initial SDT; Document for: Discussion.
R2-2009973; 3GPP TSG-RAN WG2 Meeting #112 electronic; Online, Nov. 2-13, 2020; Agenda item: 8.6.5 Aspects specific to CG based schemes; Source: NEC; Title: Discussion on CG-based Small Data Transmissions; Document for: Discussion.
R2-2010006; 3GPP TSG-RAN WG2 Meeting #112e; Online, Nov. 2-13, 2020; Agenda item: 8.6.4; Source: Qualcomm Incorporated; Title: Discussion on RACH based NR small data transmission; WID/SID: NR_SmallData_INACTIVE-Core—Release 17; Document for: Discussion and Decision.
R2-2010007; 3GPP TSG-RAN WG2 Meeting #112e; Online, Nov. 2-13, 2020; Agenda item: 8.6.5; Source: Qualcomm Incorporated; Title: Discussion on CG based NR small data transmission; WID/SID: NR_SmallData_INACTIVE-Core—Release 17; Document for: Discussion and Decision.
R2-2010106; 3GPP RAN WG2 Meeting #112-e; Nov. 2-12, 2020; Agenda Item: 8.6.4; Source: InterDigital; Title: RACH-based UL small data transmission procedure; Document for: Discussion, Decision.
R2-2010107; 3GPP RAN WG2 Meeting #112e; eMeeting Nov. 2-13, 2020; Agenda Item: 8.6.5; Source: InterDigital; Title: Configuration and selection of CG-based SDT resource; Document for: Discussion, Decision.
R2-2010108; 3GPP RAN WG2 Meeting #112e; eMeeting Nov. 2-13, 2020; Agenda Item: 8.6.5; Source: InterDigital; Title: Beam selection and maintenance for CG-based SDT; Document for: Discussion, Decision.
R2-2010232; 3GPP TSG-RAN WG2 Meeting #112e; E-Meeting, Nov. 2-Nov. 13, 2020; Source: Xiaomi; Title: 2-step RACH and 4-step RACH selection criteria for SDT; Document for: Discussion and decision; Agenda Item: 8.6.4.
R2-2010281; 3GPP TSG-RAN WG2 #112-e; Online, Nov. 2-13, 2020; Agenda item: 8.6.2; Source: Huawei, HiSilicon; Title: Discussion on CG-based scheme; Document for: Discussion.
R2-2010391; 3GPP TSG-WG2 Meeting #112 electronic; Online, Nov. 2-13, 2020; Source: CMCC; Title: Consideration on CG based SDT; Agenda item: 8.6.5; Document for: Discussion.
R2-2010431; 3GPP TSG-RAN WG2 Meeting #112e; Electronic, Nov. 2-Nov. 13, 2020; Agenda Item: 8.6.4; Source: ASUSTek; Title: Discussion on initiating SDT based on radio condition; Document for: Discussion and Decision.
R2-2010432; 3GPP TSG-RAN WG2 Meeting #112 electronic; Online, Nov. 2-13, 2020; Agenda Item: 8.6.5; Source: ASUSTek; Title: Association between Pre-configured PUSCH resources and beam; Document for: Discussion and Decision.
R2-2010704; af3GPP TSG-RAN WG2 Meeting #112 electronic; Online, Nov. 2020; Source: Session Chair (InterDigital); Title: Report for Rel-16 (NR-U, Power Savings and 2-step RACH) and IIoT and Small Data.

(56) References Cited

OTHER PUBLICATIONS

International Search Report and Written Opinion of the International Searching authority dated May 4, 2022, in International Application No. PCT/US2022/012978.

* cited by examiner

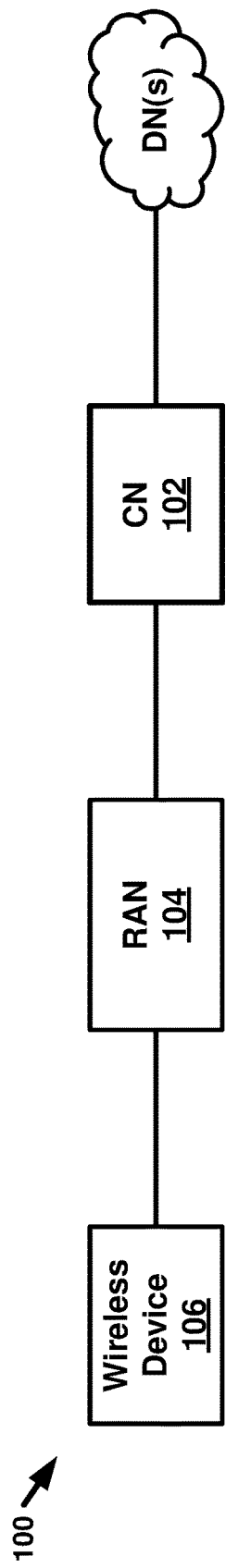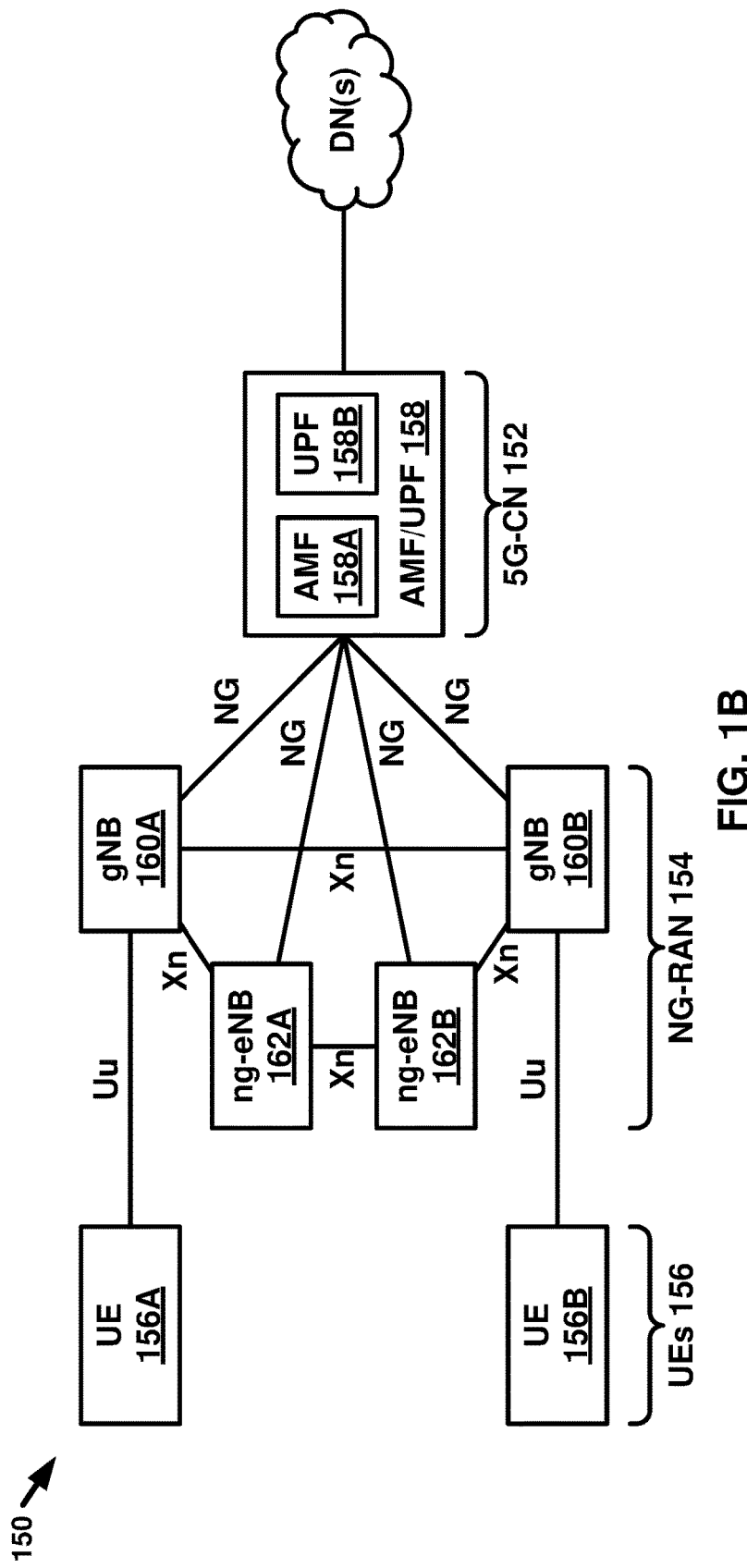
FIG. 1A
FIG. 1B

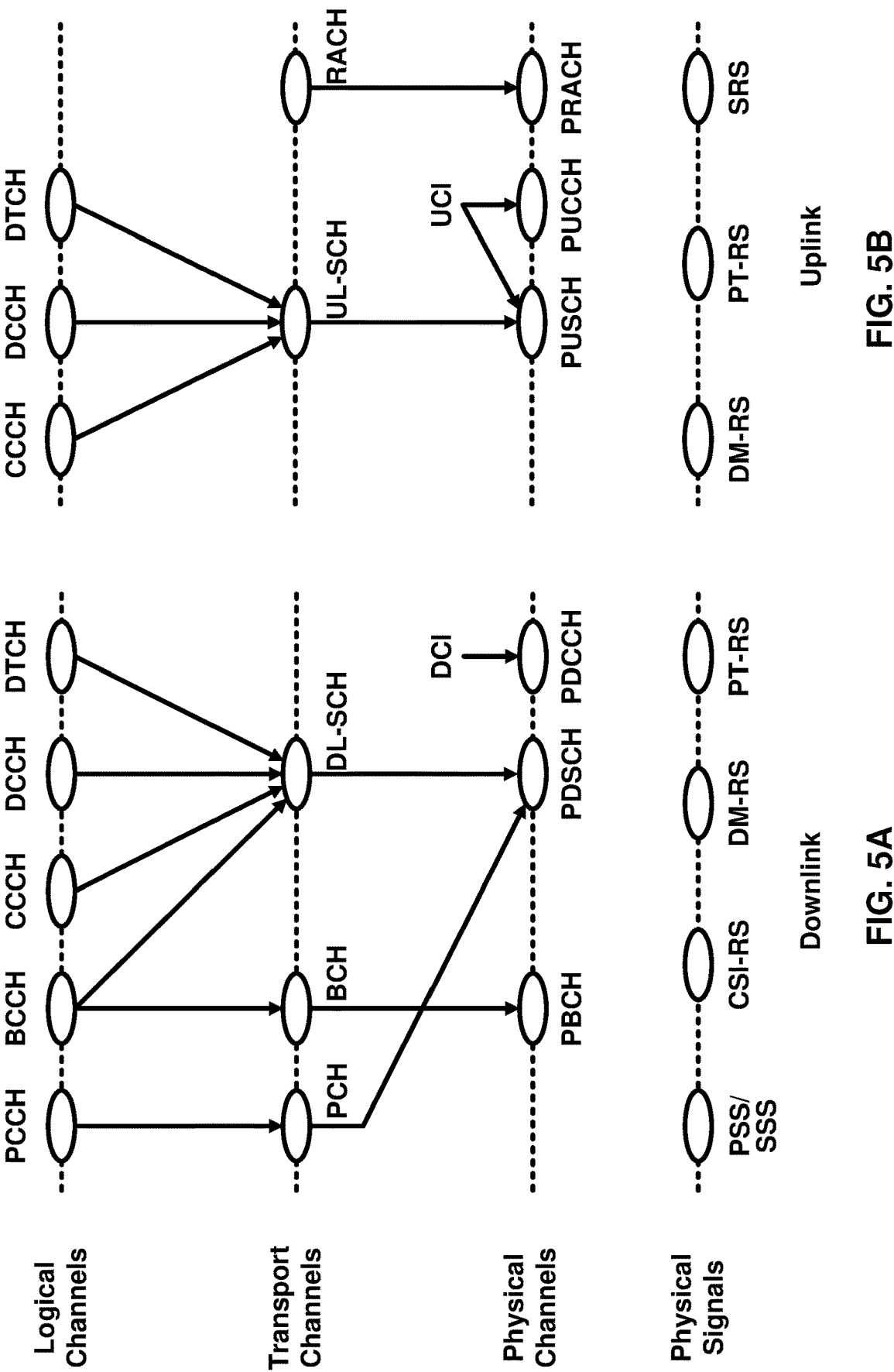

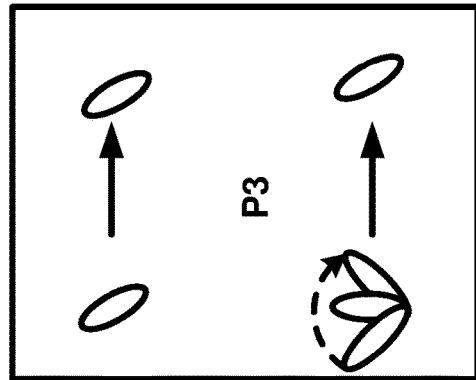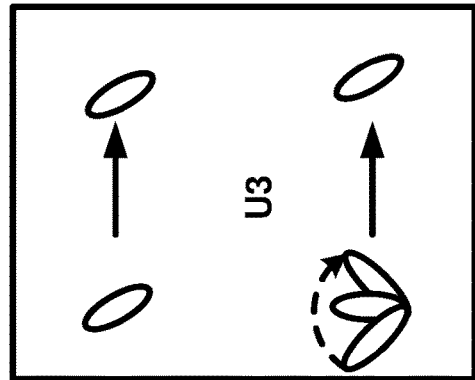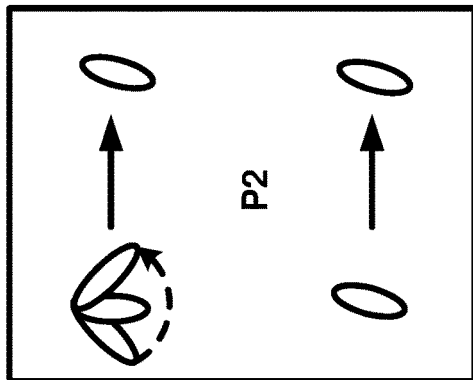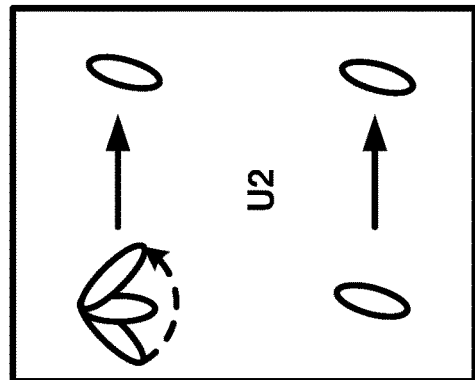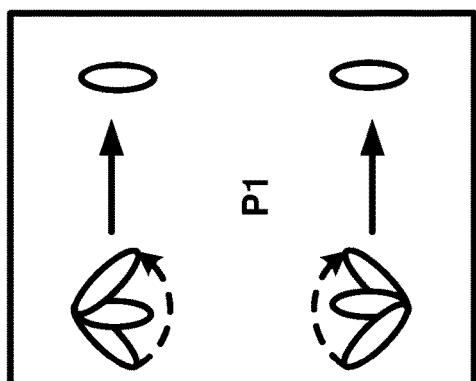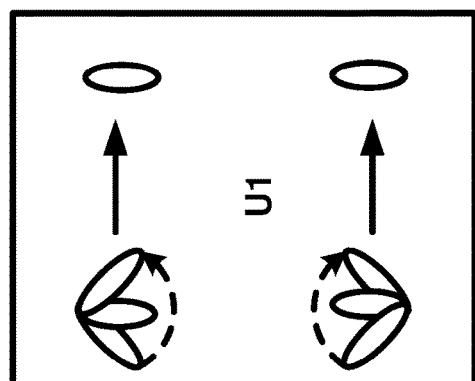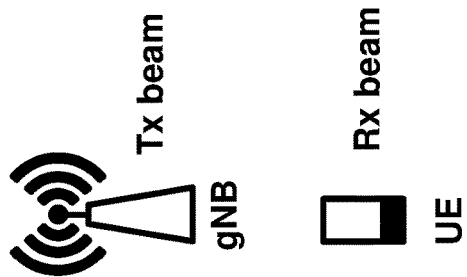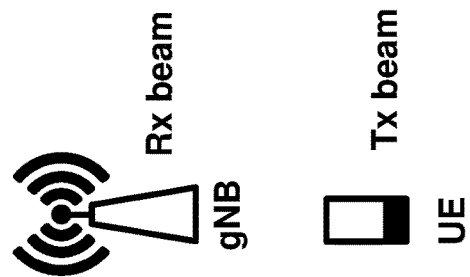
FIG. 12A
FIG. 12B

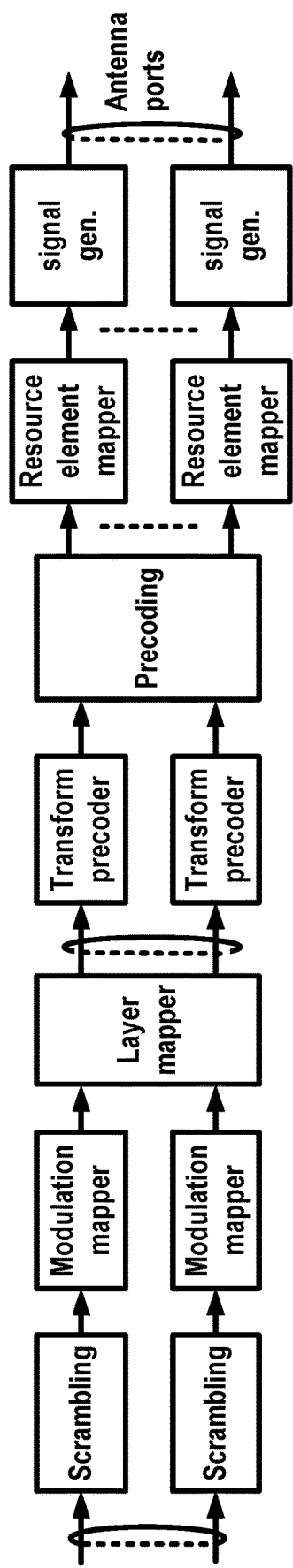
FIG. 16A
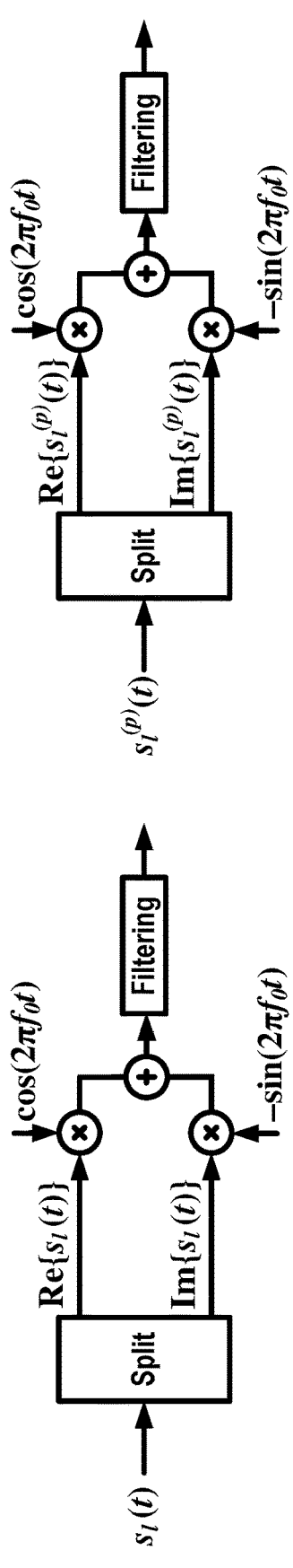
FIG. 16B
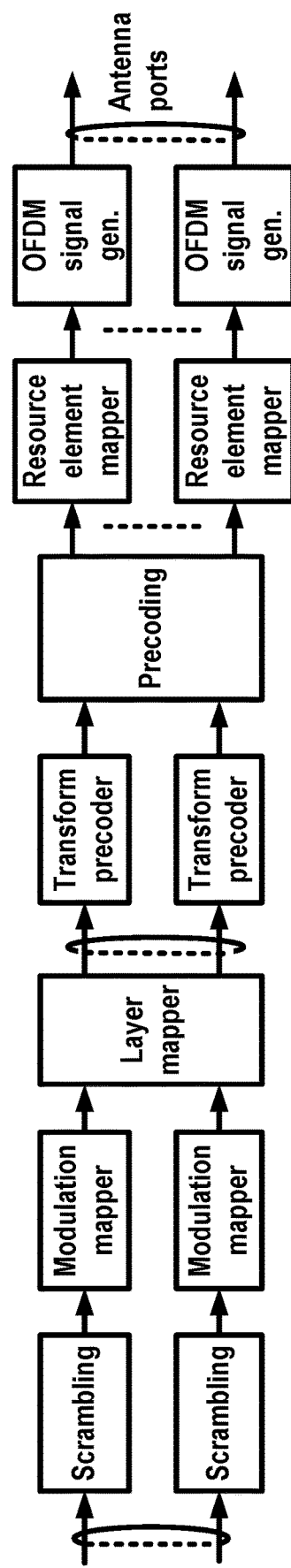
FIG. 16C
FIG. 16D

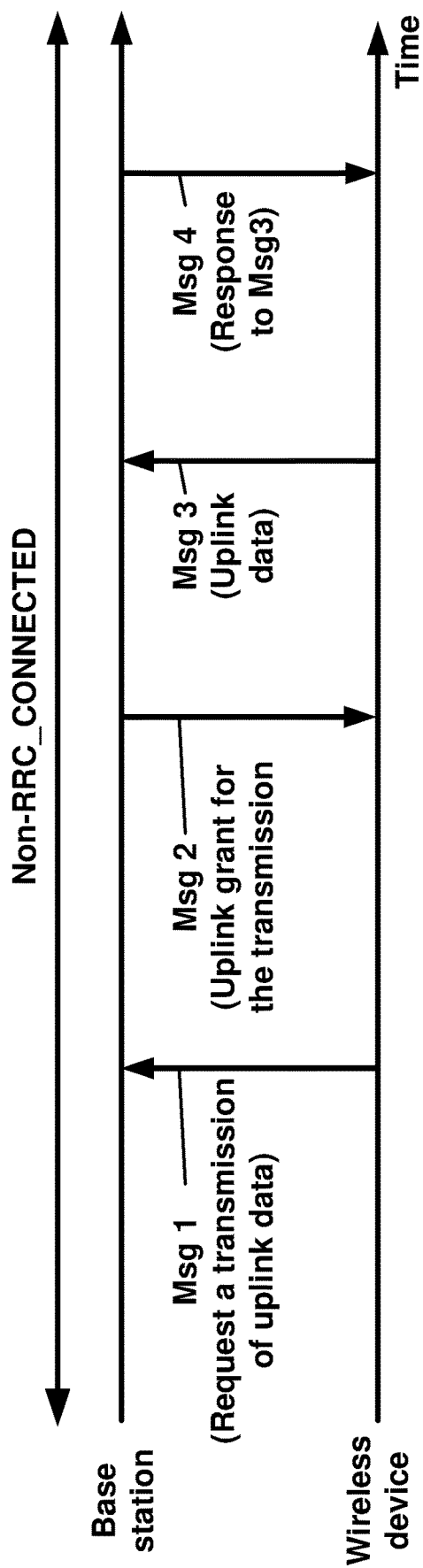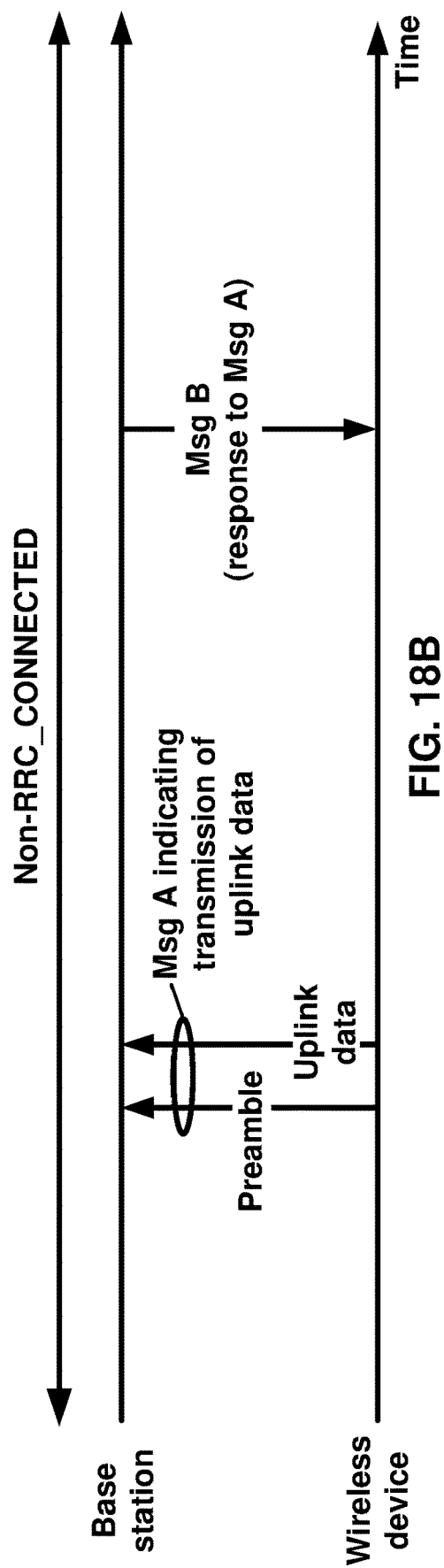
FIG. 18A
FIG. 18B

```
┌─────────────────────────────────────────────┐
│ Receive a message comprising one or more configured grants │
│ for a radio resource control (RRC) inactive state │
│ 2410 │
└─────────────────────────────────────────────┘
                      ↓
┌─────────────────────────────────────────────┐
│ Determine, based on a first transmission being initiated by a │
│ configured grant of the one or more configured grants, to │
│ reset a 1st power control adjustment value of a 1st transmit │
│ power of the 1st transmission │
│ 2420 │
└─────────────────────────────────────────────┘
                      ↓
┌─────────────────────────────────────────────┐
│ Transmit, based on the 1st transmit power, a 1st transport │
│ block via a resource of the configured grant │
│ 2430 │
└─────────────────────────────────────────────┘
                      ↓
┌─────────────────────────────────────────────┐
│ Receive, based on the transmitting the 1st transport block and │
│ in the RRC inactive state, a 1st dynamic grant comprising a │
│ 1st power control value │
│ 2440 │
└─────────────────────────────────────────────┘
                      ↓
┌─────────────────────────────────────────────┐
│ Determine, based on the 1st power control value and the 1st │
│ power control adjustment value, a 2nd power control │
│ adjustment value of a 2nd transmit power of a 2nd │
│ transmission scheduled by the 1st dynamic grant; │
│ 2450 │
└─────────────────────────────────────────────┘
                      ↓
┌─────────────────────────────────────────────┐
│ Transmit, based on the 2nd transmit power, a 2nd transport │
│ block via a resource of the 1st dynamic grant. │
│ 2460 │
└─────────────────────────────────────────────┘
```

FIG. 24

```
┌─────────────────────────────────────────────────┐
│ Transmit a message comprising one or more       │
│ configured grants for a radio resource control  │
│ (RRC) inactive state                            │
│ 2610                                            │
└─────────────────────────────────────────────────┘
                        │
                        ▼
┌─────────────────────────────────────────────────┐
│ Receive, based on a 1st transmit power, a 1st   │
│ transport block via a resource of the configured│
│ grant, wherein a 1st power control adjustment   │
│ value of the 1st transmit power of the 1st      │
│ transmission is reset based on the 1st          │
│ transmission being initiated by a configured    │
│ grant of the one or more configured grants      │
│ 2620                                            │
└─────────────────────────────────────────────────┘
                        │
                        ▼
┌─────────────────────────────────────────────────┐
│ Transmit, based on the transmitting the 1st     │
│ transport block and in the RRC inactive state,  │
│ a 1st dynamic grant comprising a 1st power      │
│ control value                                   │
│ 2630                                            │
└─────────────────────────────────────────────────┘
                        │
                        ▼
┌─────────────────────────────────────────────────┐
│ Receive, based on the 2nd transmit power, a 2nd │
│ transport block via a resource of the 1st       │
│ dynamic grant, wherein a 2nd power control      │
│ adjustment value of the 2nd transmit power of a │
│ 2nd transmission scheduled by the 1st dynamic   │
│ grant being based on the 1st power control value│
│ and the 1st power control adjustment value.     │
│ 2640                                            │
└─────────────────────────────────────────────────┘
```

FIG. 26

POWER CONTROL FOR SMALL DATA TRANSMISSION

CROSS-REFERENCE TO RELATED APPLICATIONS

This application is a continuation of International Application No. PCT/US2022/012978, filed Jan. 19, 2022, which claims the benefit of U.S. Provisional Application No. 63/139,164, filed Jan. 19, 2021, all of which are hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example mobile communication networks in which embodiments of the present disclosure may be implemented.

FIG. 5A and FIG. 5B respectively illustrate a mapping between logical channels, transport channels, and physical channels for the downlink and uplink.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 18A illustrates an RA-based SDT with a four-step RA procedure as per an aspect of an example embodiment of the present disclosure.

FIG. 18B illustrates an RA-based SDT with a two-step RA procedure as per an aspect of an example embodiment of the present disclosure.

FIG. 24 is a flow diagram as per an aspect of an example embodiment of the present disclosure.

FIG. 26 is a flow diagram as per an aspect of an example embodiment of the present disclosure.

DETAILED DESCRIPTION

Figure 2A:
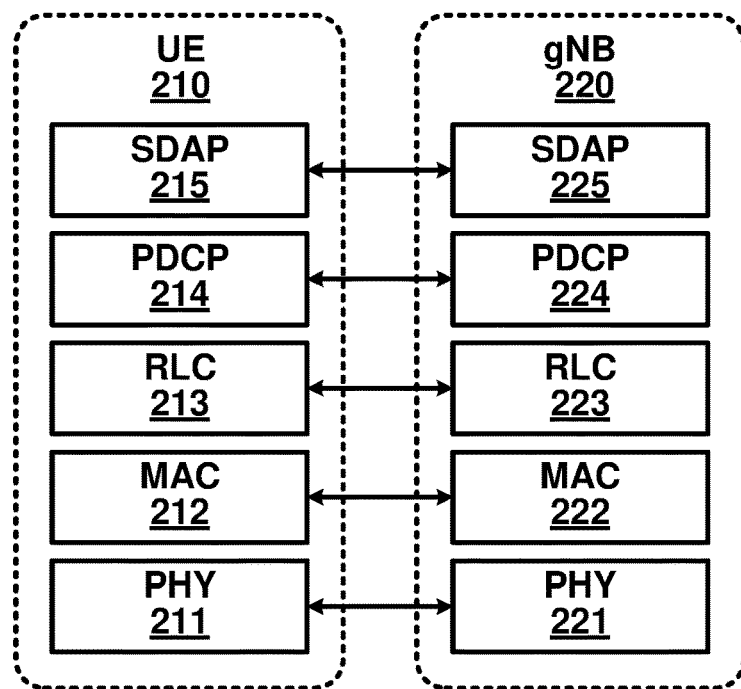
FIG. 2A and FIG. 2B respectively illustrate a New Radio (NR) user plane and control plane protocol stack.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2B:
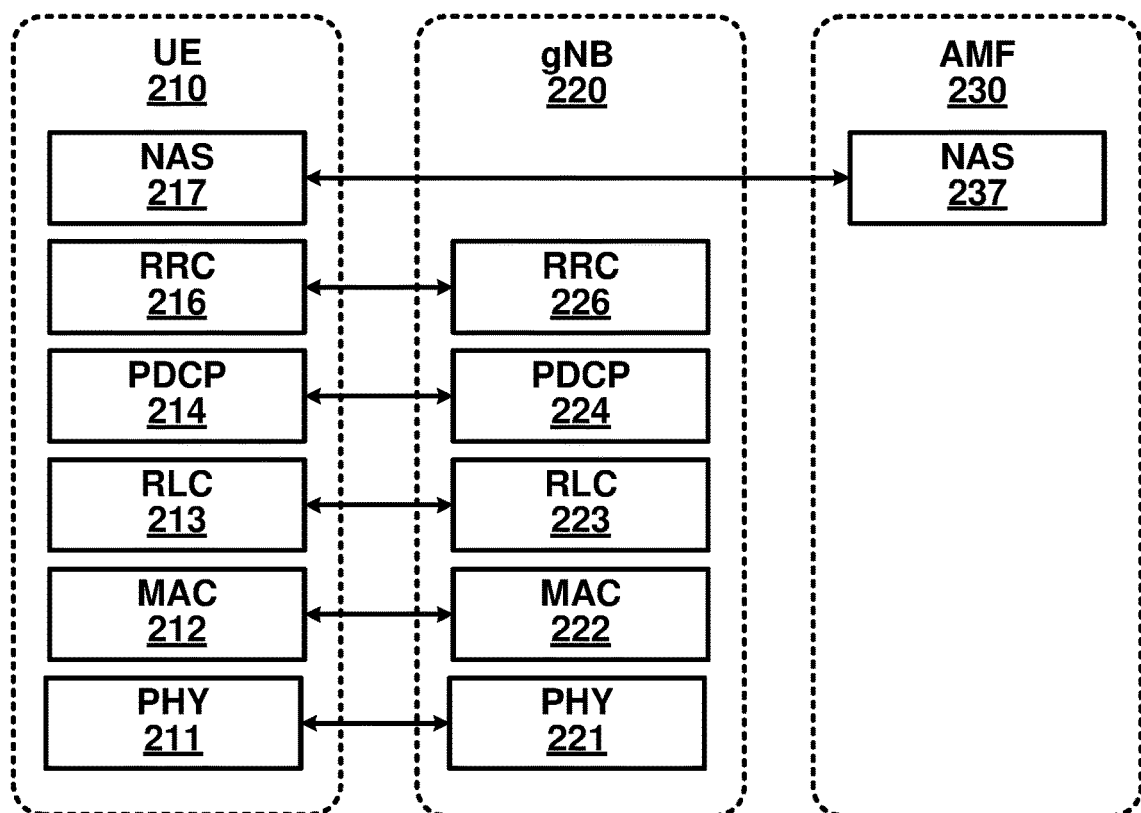

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
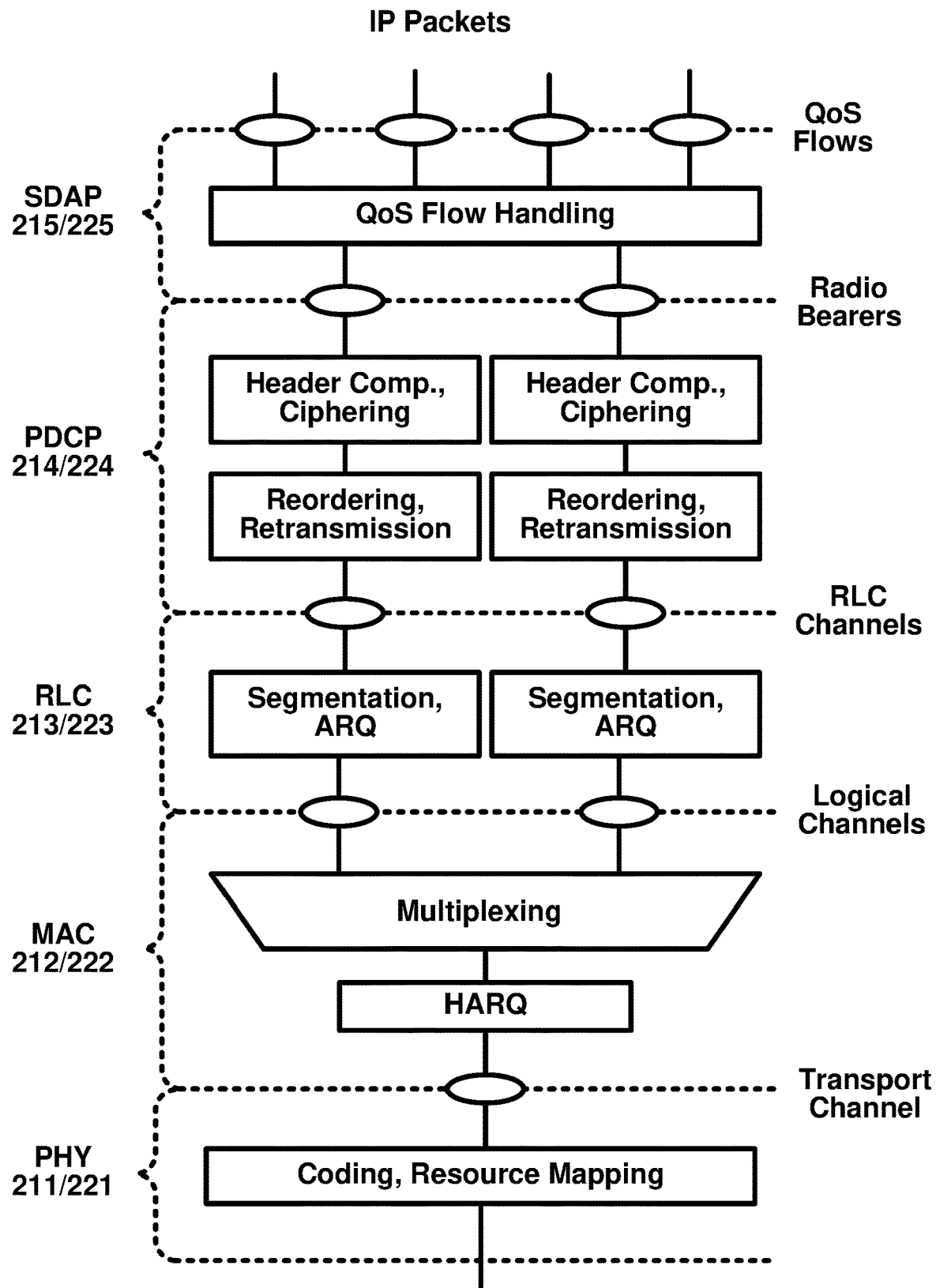
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
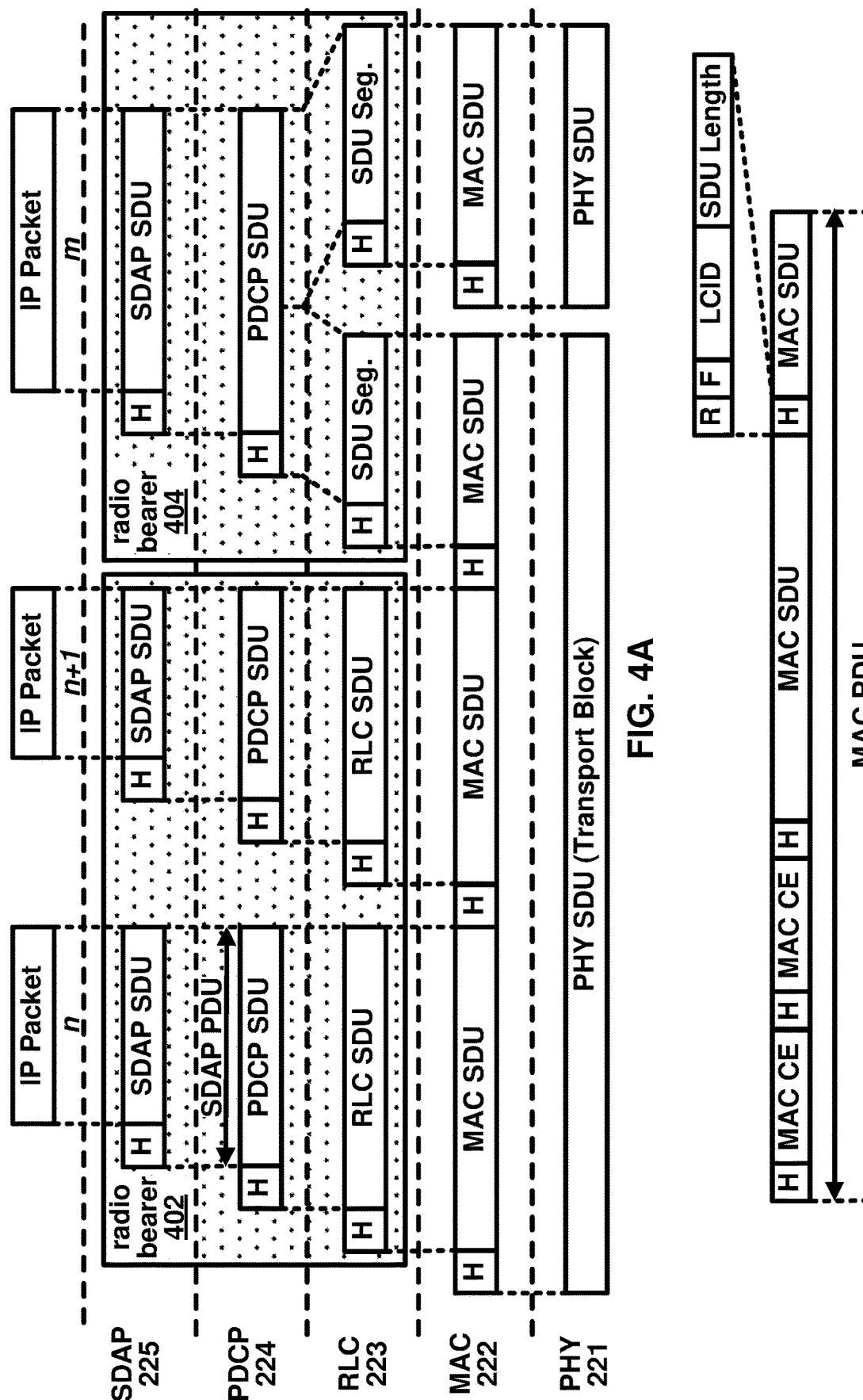
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
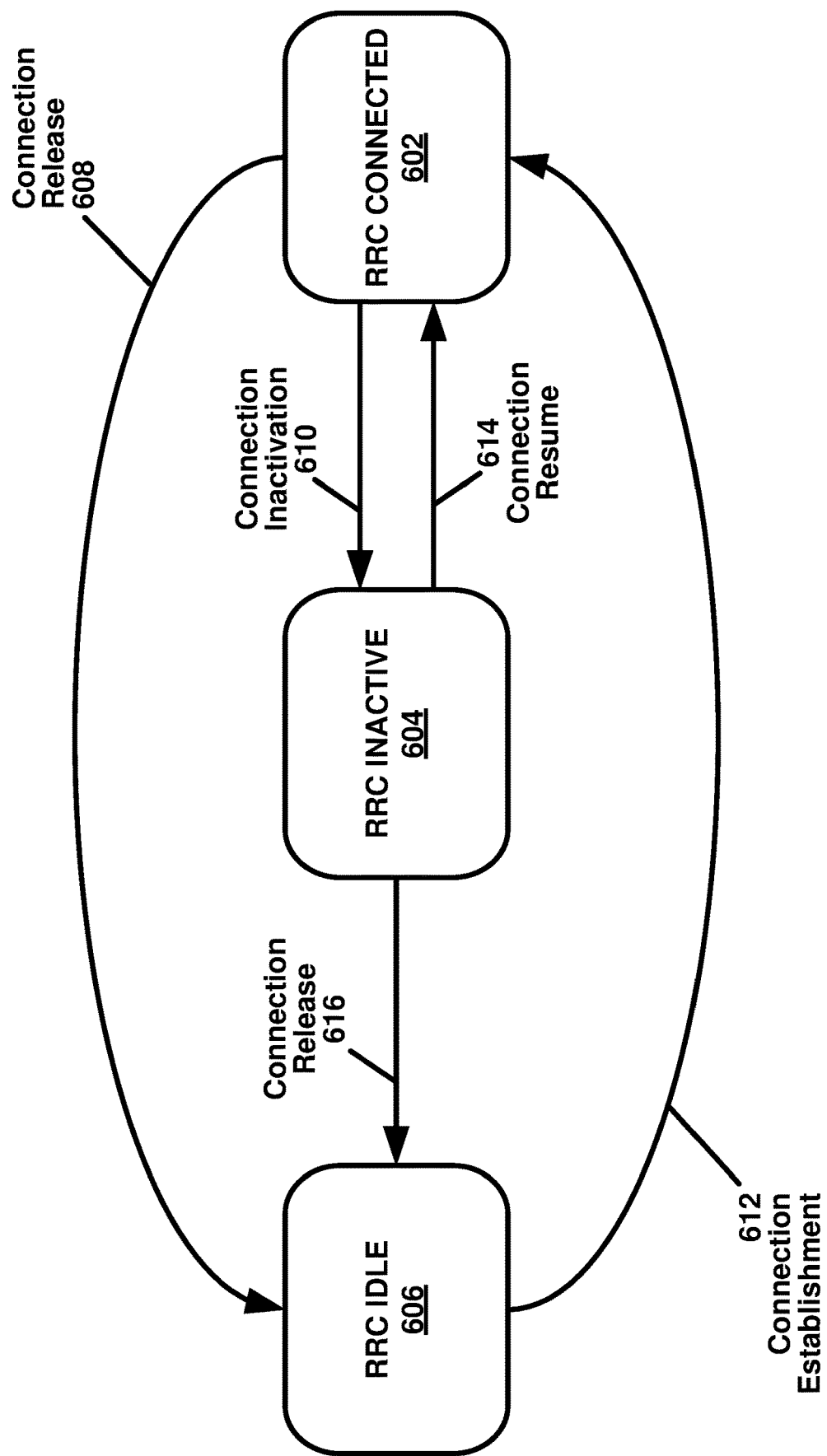
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
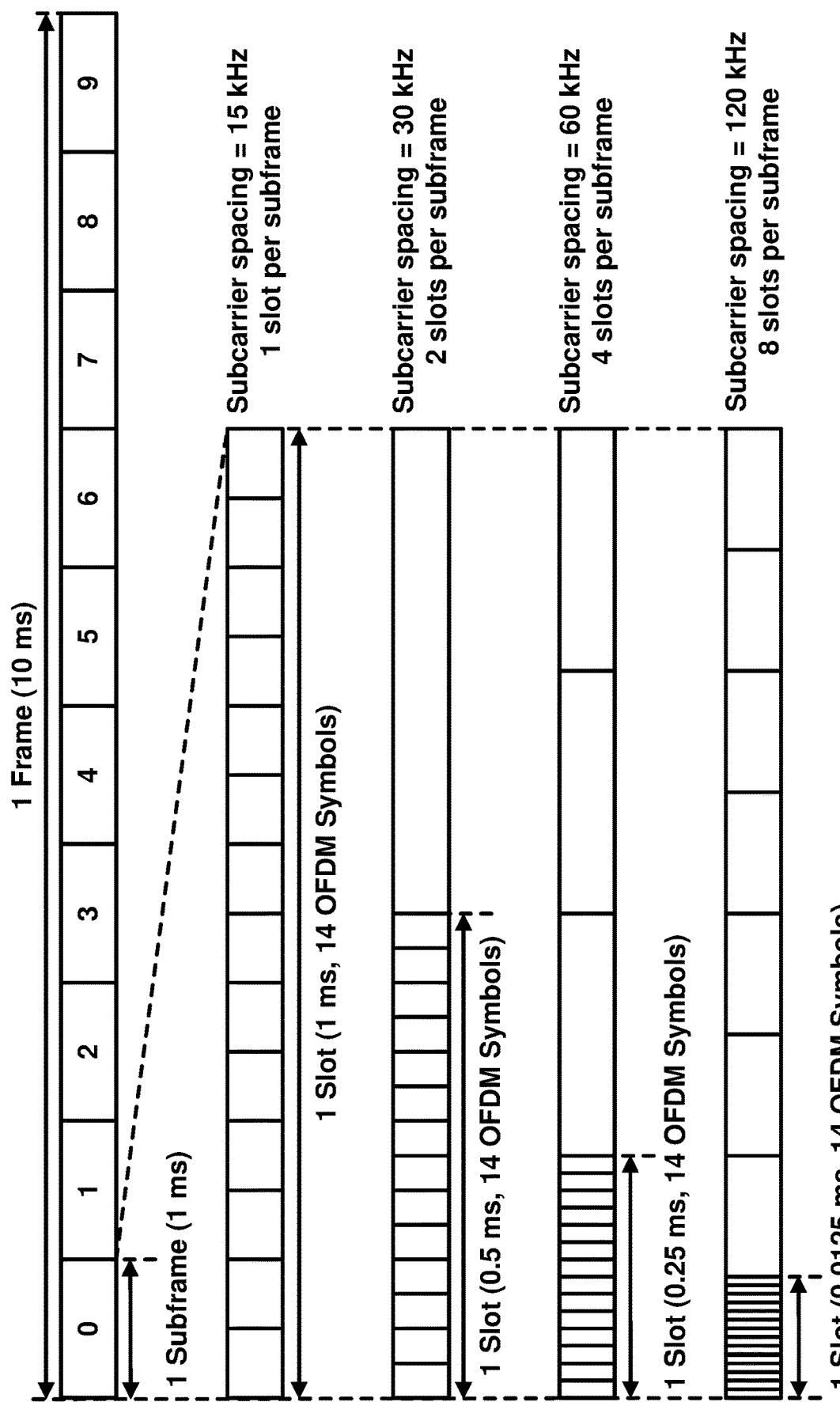
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/ cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
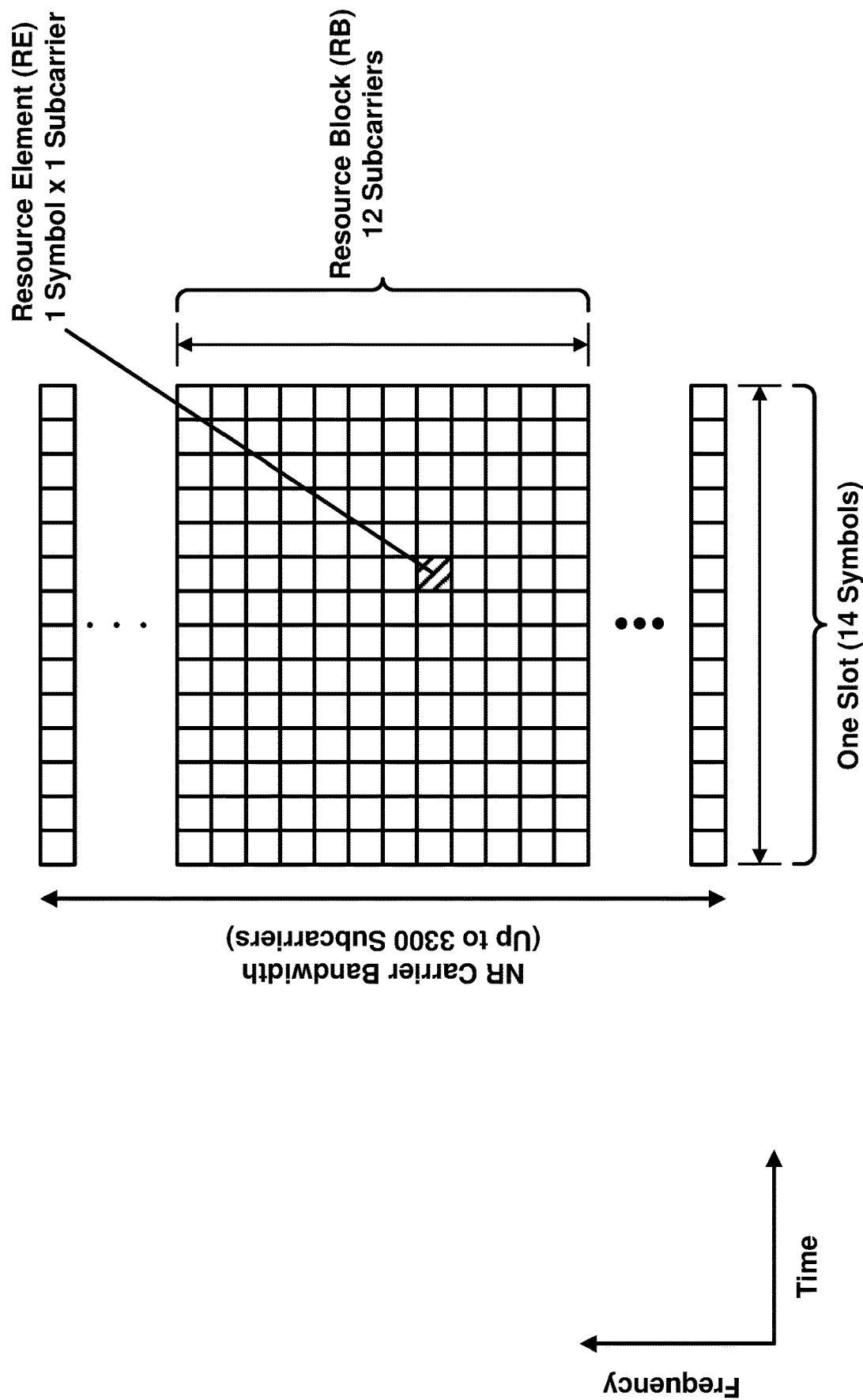
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORE-SETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
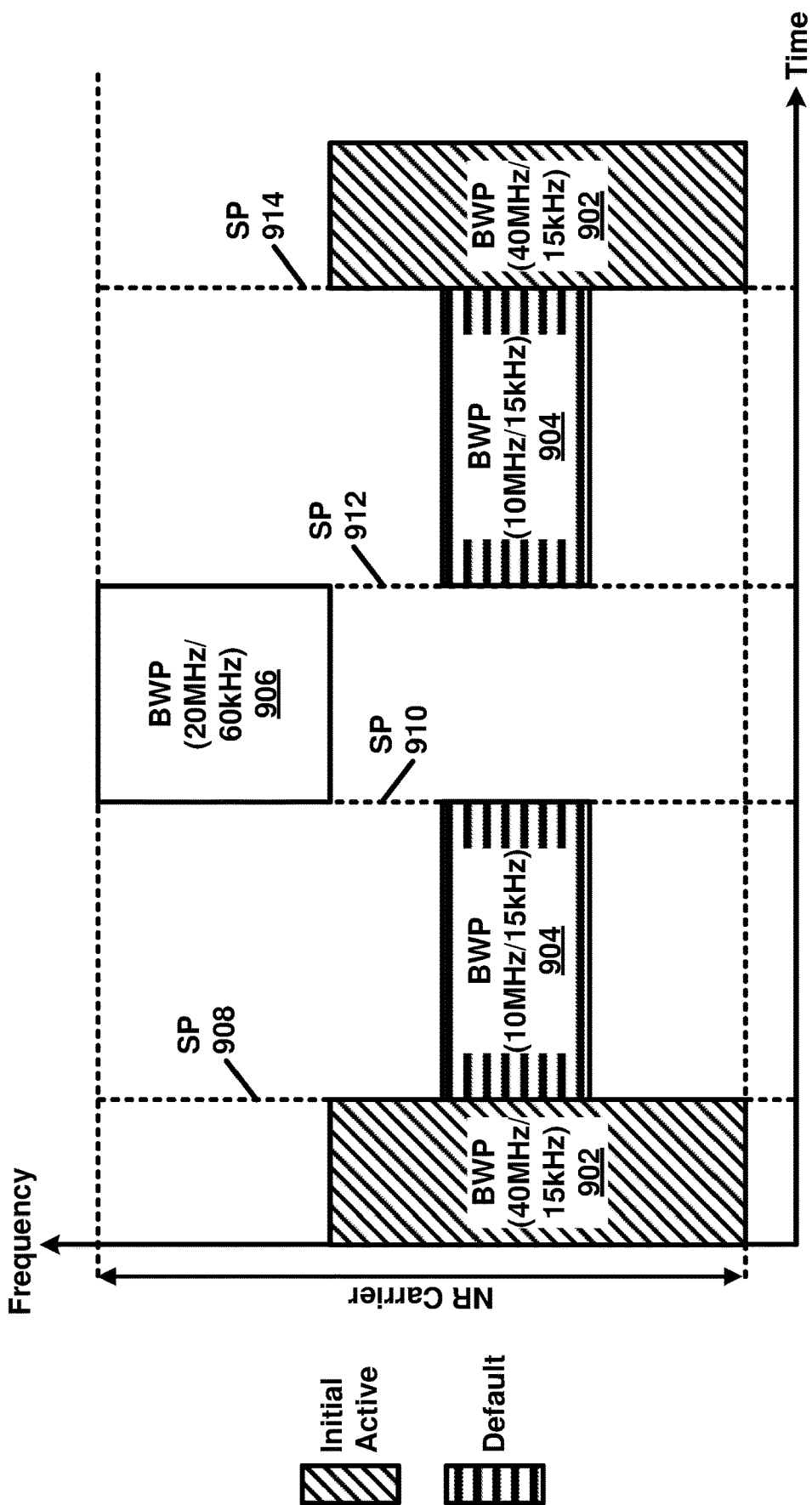
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
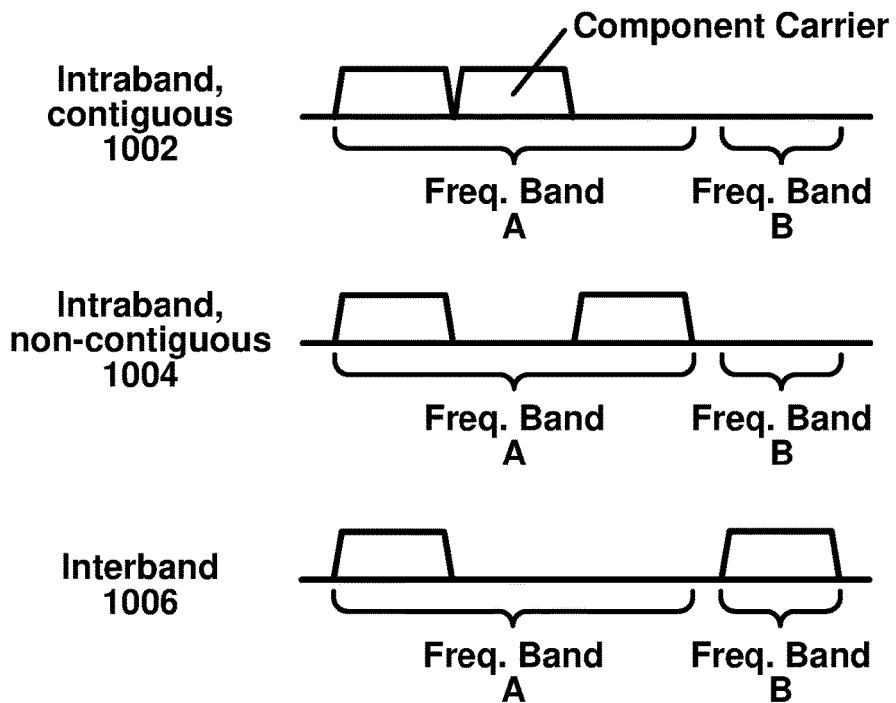
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
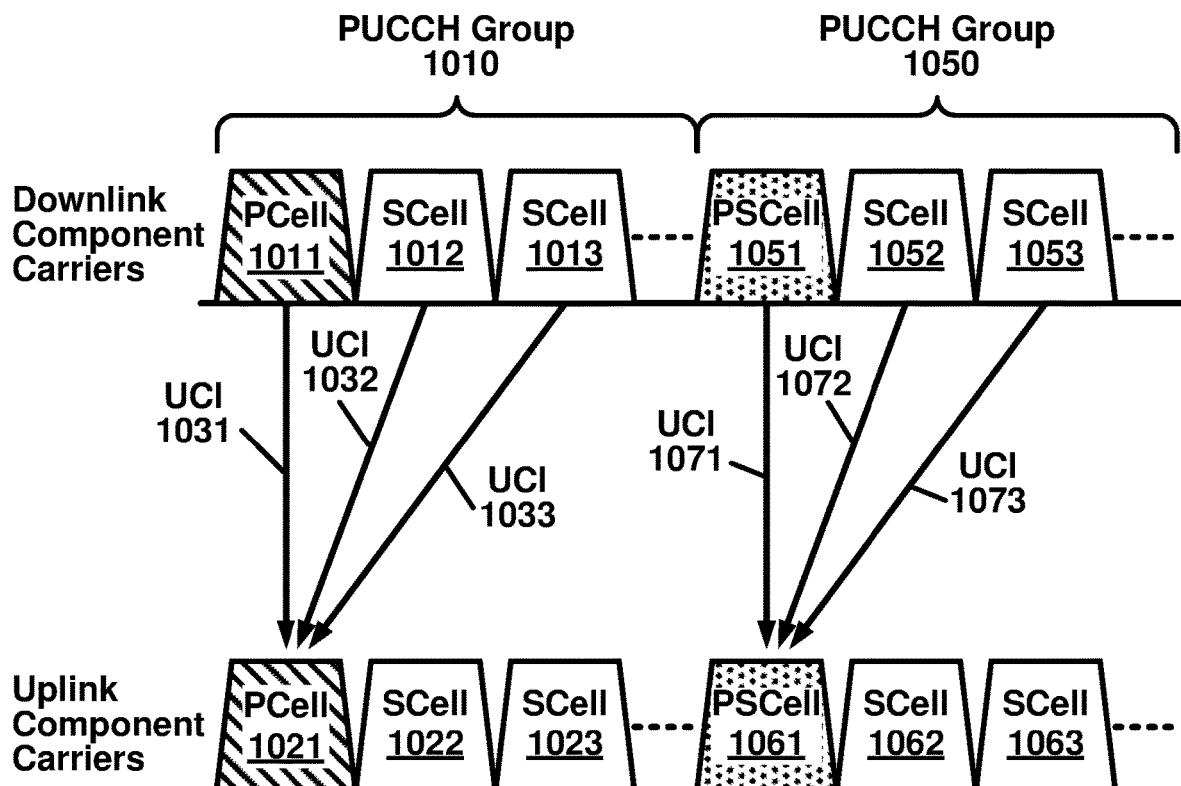
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
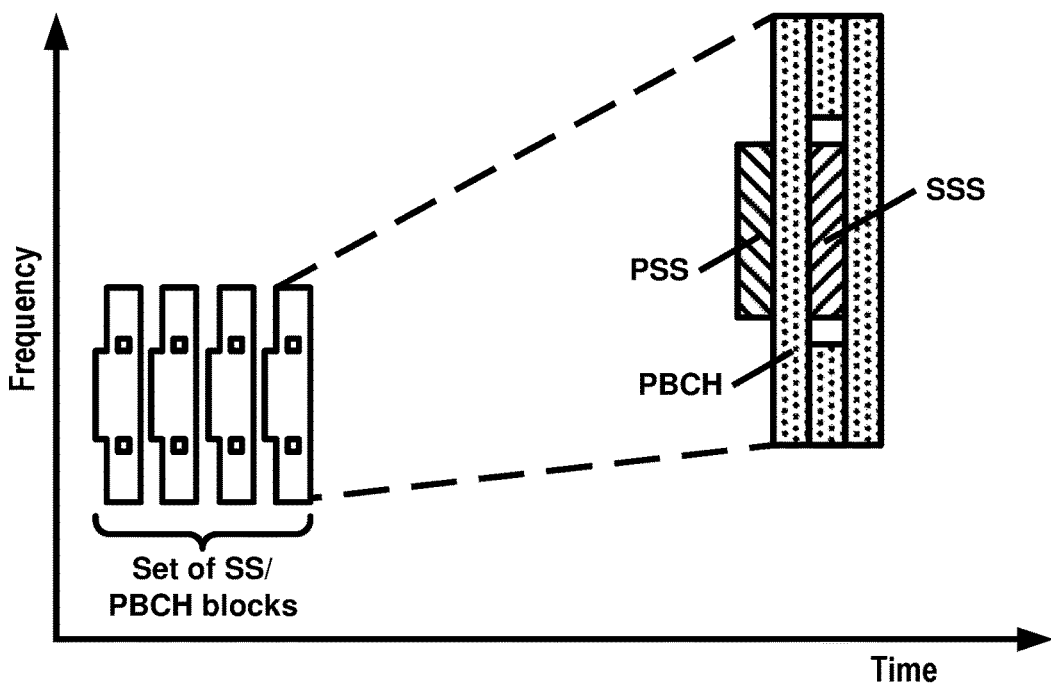
FIG. 11A illustrates an example of an SS/PBCH block structure and location.

FIG. 11A illustrates an example of an SS/PBCH blocks structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
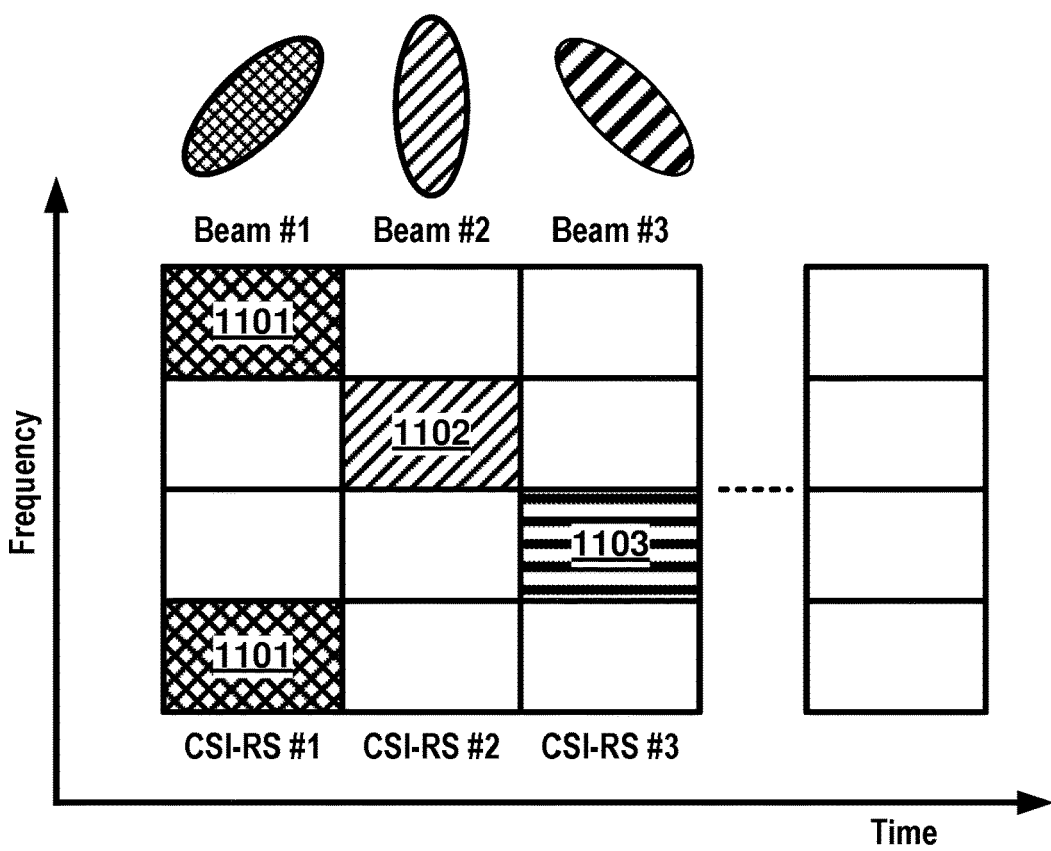
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
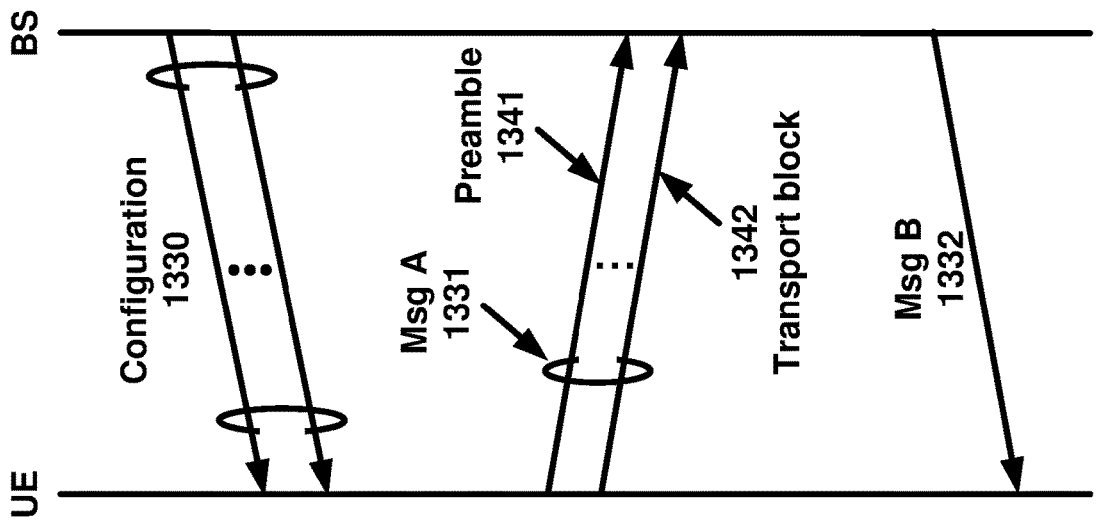
FIG. 13A, FIG. 13B, and FIG. 13C respectively illustrate a four-step contention-based random access procedure, a two-step contention-free random access procedure, and another two-step random access procedure.
Figure 13B:
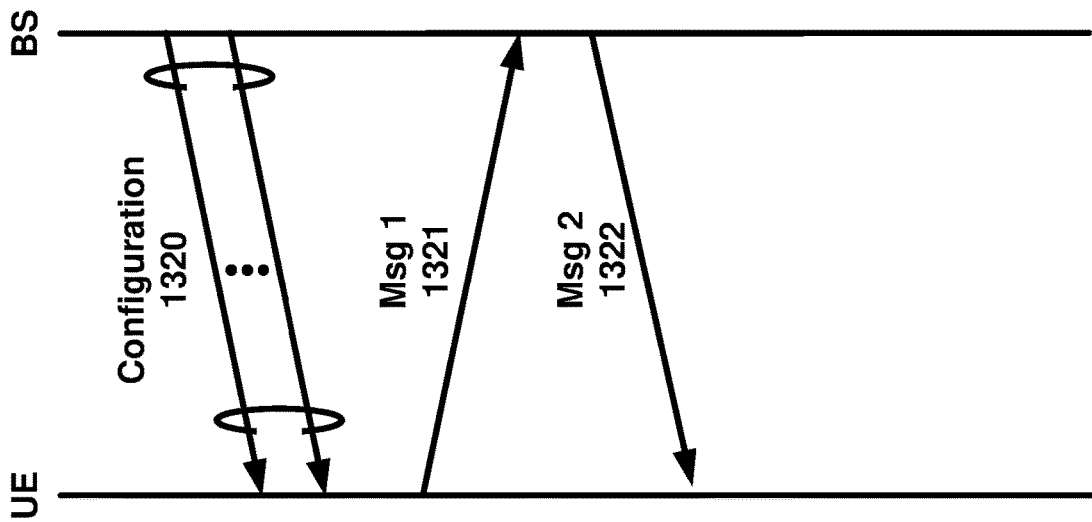
Figure 13A:
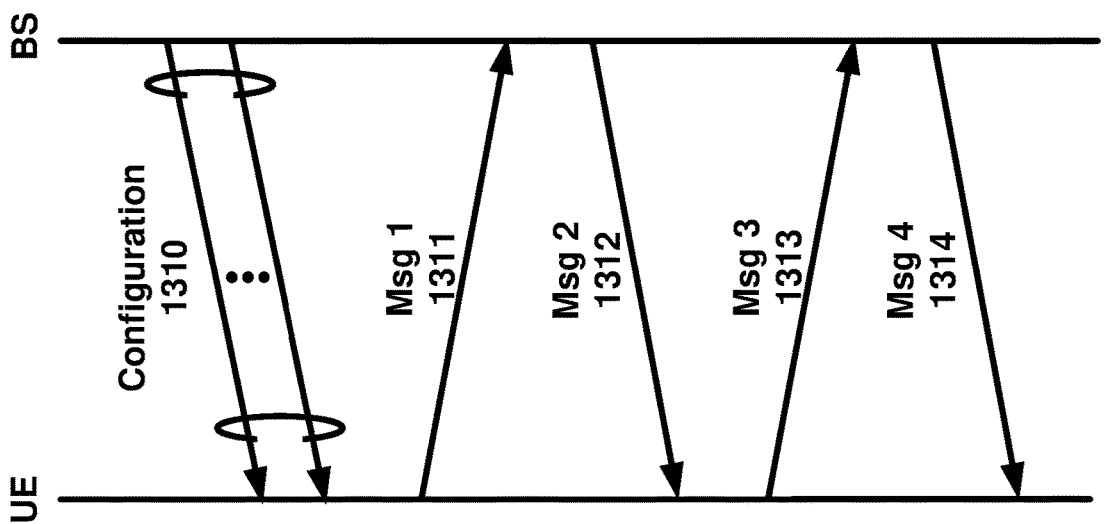

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×f_id+14×80×8×ul_carrier_id, where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
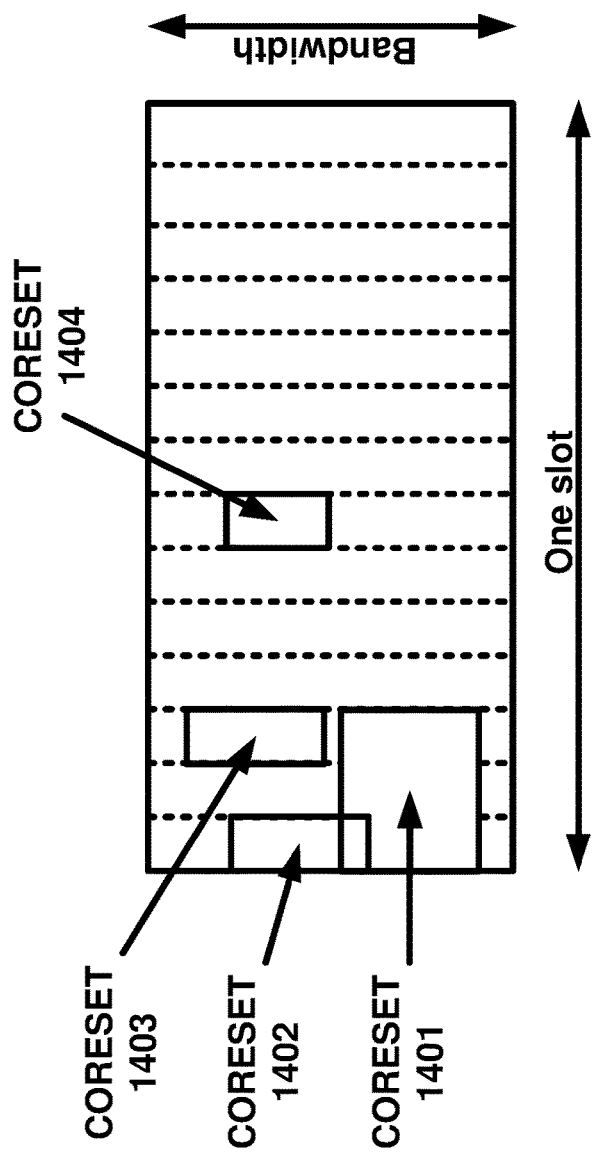
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
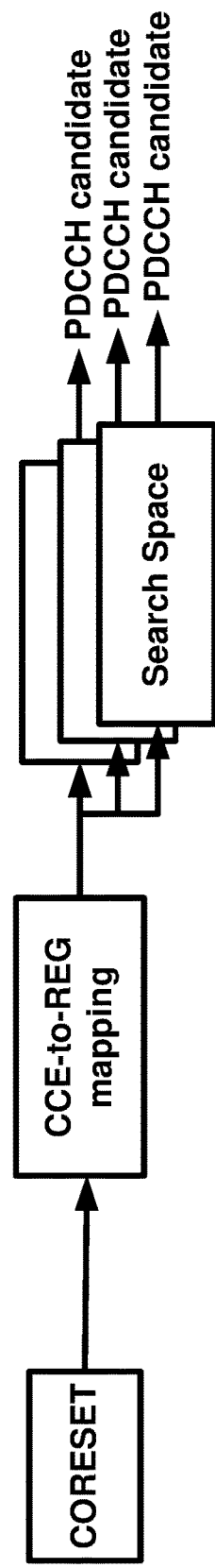
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
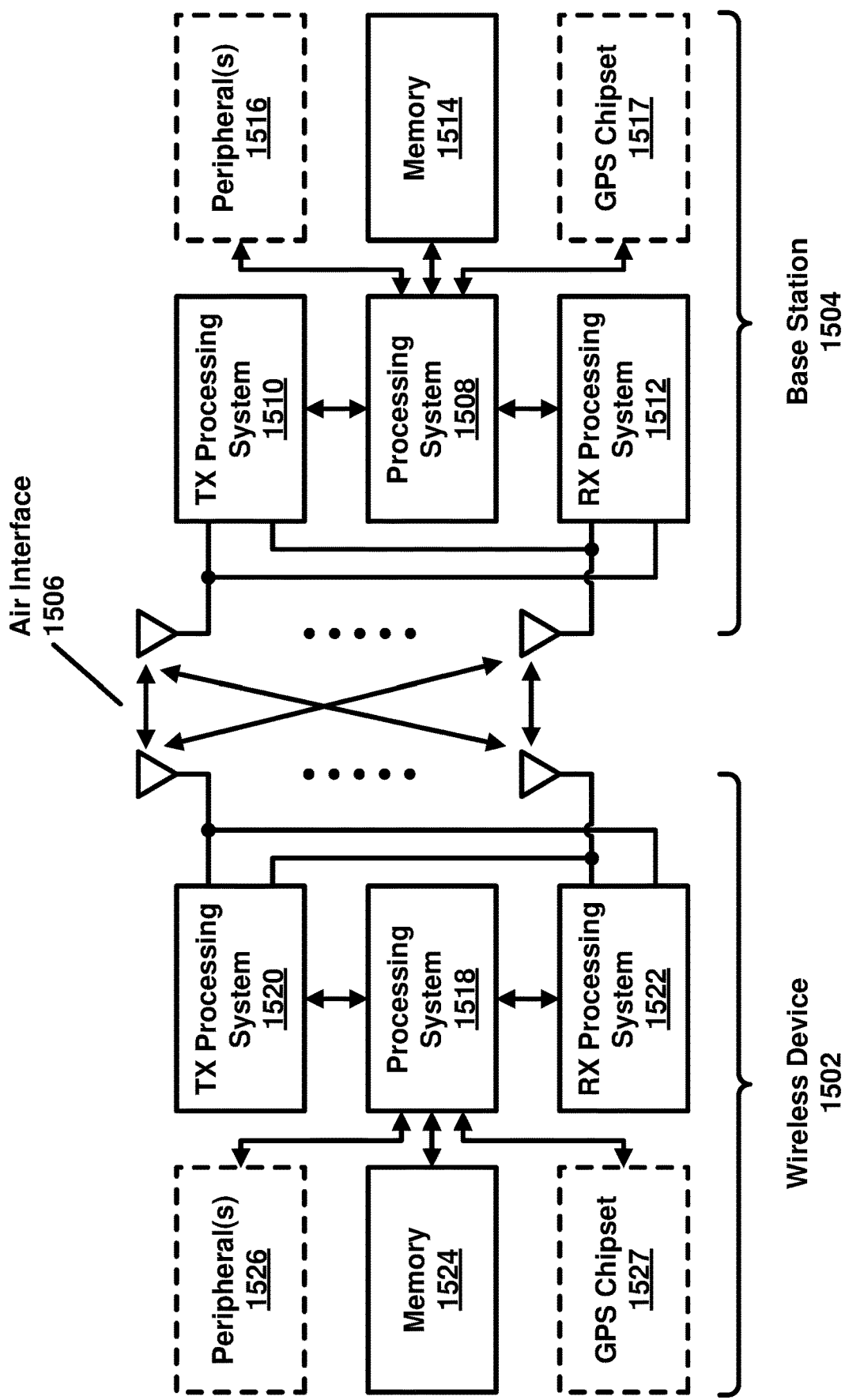
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP- OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/ window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A wireless device may make (e.g., set up, (re-)establish, and/or resume) a connection (e.g., RRC connection) to a network for transmission(s) of data. For example, to transmit the data (e.g., the data from DTCH), an RRC state of the wireless device may be an RRC_CONNECTED state. For example, the wireless device may not perform (e.g., may not be allowed to perform or may prohibit) an uplink transmission in a Non-RRC_CONNECTED (e.g., an RRC_INACTIVE state and/or an RRC_IDLE state). The data may be DL (e.g., mobile terminated (MT)) data and/or UL (e.g., mobile originated (MO)) data.

For example, a wireless device may perform one or more procedures to make the connection to the network in the RRC_INACTIVE state (or the RRC-IDLE state). For example, the one or more procedures comprise a connection setup procedure, connection a (re-) establish procedure, and/or a connection resume procedure. For example, the wireless device may perform the one or more procedures, e.g., when DL (e.g., mobile terminated (MT)) and/or UL (e.g., mobile originated (MO)) data are available in a buffer. Based on the one or more procedures (e.g., in response to successfully completing the connection setup or resume procedure), the RRC state of the wireless device may transition to an RRC_CONNECTED state from a Non-RRC_CONNECTED state (e.g., an RRC_INACTIVE state and/or an RRC_IDLE state). The wireless device may receive DL data and/or DL signal(s) via DL transmission(s) and/or may transmit UL data and/or UL signal(s) via UL transmission in the RRC_CONNECTED state. The wireless device may transition to the Non-RRC_CONNECTED from RRC_CONNECTED state, e.g., after or in response to no more DL data (e.g., to be received) and/or no more UL data (e.g., to be transmitted) in buffer(s). To transition to the Non-RRC_CONNECTED state from the RRC_CONNECTED state, the wireless device may perform a connection release procedure. The connection release procedure (e.g., an RRC release procedure) may result in transitioning the RRC state to the Non-RRC_CONNECTED state.

A frequent RRC state transition between RRC states (e.g., between a Non-RRC_CONNECTED state and an RRC_CONNECTED state) may require a wireless device to transmit and/or receive a plurality of control signals (e.g., RRC message(s), MAC CE(s), and/or DCI(s)) in one or more layers (e.g., RRC layer, MAC layer, and/or PHY layer).

For example, for an RRC connection setup, a wireless device may transmit, to a base station, an RRC connection setup request and receive an RRC connection setup message as a respond to the RRC connection setup request. For example, for an RRC connection resume, the wireless device may transmit, to a base station, an RRC connection resume request and receive an RRC connection resume message as a respond to the RRC connection resume request. For example, for an RRC connection release, the wireless device may receive, from a base station, an RRC connection release request.

For example, for DL and/or UL transmission of small data available (or arrival) in the Non-RRC_CONNECTED, it may be inefficient for a wireless device to make (or resume) an connection to a network (e.g., transition to an RRC_CO- NNECTED state from a Non-RRC_CONNECTED state) and release the connection (e.g., transition to a Non-RRC_CONNECTED state from an RRC_CONNECTED state) after or in response to perform the DL and/or UL transmission of small data in an RRC_CONNECTED state. This may result in increasing unnecessary power consumption and/or signaling overhead. For example, the signaling overhead (e.g., control signaling overhead for an RRC connection and/or an RRC release) required to transmit a payload may be larger than the payload. For example, a frequent RRC state transition for the small and infrequent DL and/or UL data packet(s) may cause unnecessary power consumption and signaling overhead for the wireless device.

Examples of small and infrequent data packets may be such traffic generated from smartphone applications, Instant Messaging (IM) services, heart-beat/keep-alive traffic from IM/email clients and other apps, push notifications from various applications, non-smartphone applications, wearables (e.g., positioning information), sensors (e.g., for transmitting temperature, pressure readings periodically or in an event triggered manner), and/or smart meters and smart meter networks sending meter readings.

Transmission(s) (e.g., DL and/or UL transmission(s)) in a Non-RRC_CONNECTED state may be beneficial. For example, a wireless device may transmit and/or receive one or more data packets in a Non-RRC_CONNECTED state. For example, a wireless device may transmit and/or receive one or more data packets without making a connection while keeping an RRC state as a Non-RRC_CONNECTED state.

For example, a wireless device may receive, from a base station, scheduling information (e.g., RRC message and/or SIB) indicating one or more uplink radio resources in the Non-RRC_CONNECTED state for the wireless device. The one or more uplink radio resources may be for infrequent data transmission. The one or more uplink radio resources may be for non-periodic data transmission. The one or more uplink radio resources may be for periodic data transmission. The wireless device may transmit the one or more data packets via the one or more radio resources while keeping its RRC state as the Non-RRC_CONNECTED state. For example, the wireless device may not transition its RRC state to the RRC_CONNECTED to transmit the one or more data packets. The uplink transmission(s) via the one or more radio resources in a Non-RRC_CONNECTED state may be efficient and flexible (e.g., for low throughput short data bursts). The uplink transmission(s) via the one or more radio resources in a Non-RRC_CONNECTED state may provide efficient signaling mechanisms (e.g., signaling overhead is less than payload). The uplink transmission(s) via the one or more radio resources in a Non-RRC_CONNECTED state may reduce signaling overhead. The uplink transmission(s) via the one or more radio resources in a Non-RRC_CONNECTED state may improve the battery performance of the wireless device. For example, a wireless device that has intermittent small data packets in the Non-RRC_CONNECTED state may benefit from such uplink transmission(s) in the Non-RRC_CONNECTED state.

Uplink transmission(s) in a Non-RRC_CONNECTED state may be based on a random access (RA) procedure. For example, the wireless device may transmit at least one preamble of the RA procedure to perform the uplink transmission(s). For example, a wireless device may transmit uplink data (e.g., SDU of DTCH) via Msg A PUSCH and/or Msg 3 PUSCH during the RA procedure. The wireless device may keep (or maintain) an RRC state as the Non-RRC_CONNECTED state during and/or after the RA procedure. For example, after or in response to completing the transmission of the uplink data and/or completing the RA procedure, the wireless device may keep (or maintain) an RRC state as the Non-RRC_CONNECTED state.

Uplink transmission in a Non-RRC_CONNECTED state may be based on pre-configured PUSCH resource(s). For example, a wireless device may receive resource configuration parameters indicating UL grant(s) and/or the pre-configured PUSCH resource(s) of the UL grant(s). The wireless device may transmit uplink data (e.g., associated with DTCH) using the UL grant(s) and/or via the pre-configured PUSCH resource(s) of the UL grant(s) in the Non-RRC_CONNECTED state.

Uplink data transmission(s) in a Non-RRC_CONNECTED state may be referred to as small data transmission (SDT), early data transmission (EDT), and/or data transmission via (pre-)configured uplink resource(s) (PURs). For example, in the present disclosure, an SDT and/or an EDT may be interchangeable with uplink data transmission(s) in a Non-RRC_CONNECTED state. For example, in the present disclosure, radio resource(s) used for an SDT in a Non-RRC_CONNECTED state may be referred to as PUR(s). For example, uplink transmission(s) based on a RA procedure in a Non-RRC_CONNECTED state may be referred to as an RA-based SDT, an RA-based EDT, an EDT, and/or the like. For example, an uplink transmission based on (pre-)configured grant(s) in a Non-RRC_CONNECTED state may be referred to as (pre-)configured grant based SDT (CG-based SDT). One or more radio resources of the (pre)configured grant(s) may be referred to as (pre)configured uplink resources (PURs), SDT resources, resources of SDT, and/or the like.

Figure 17:
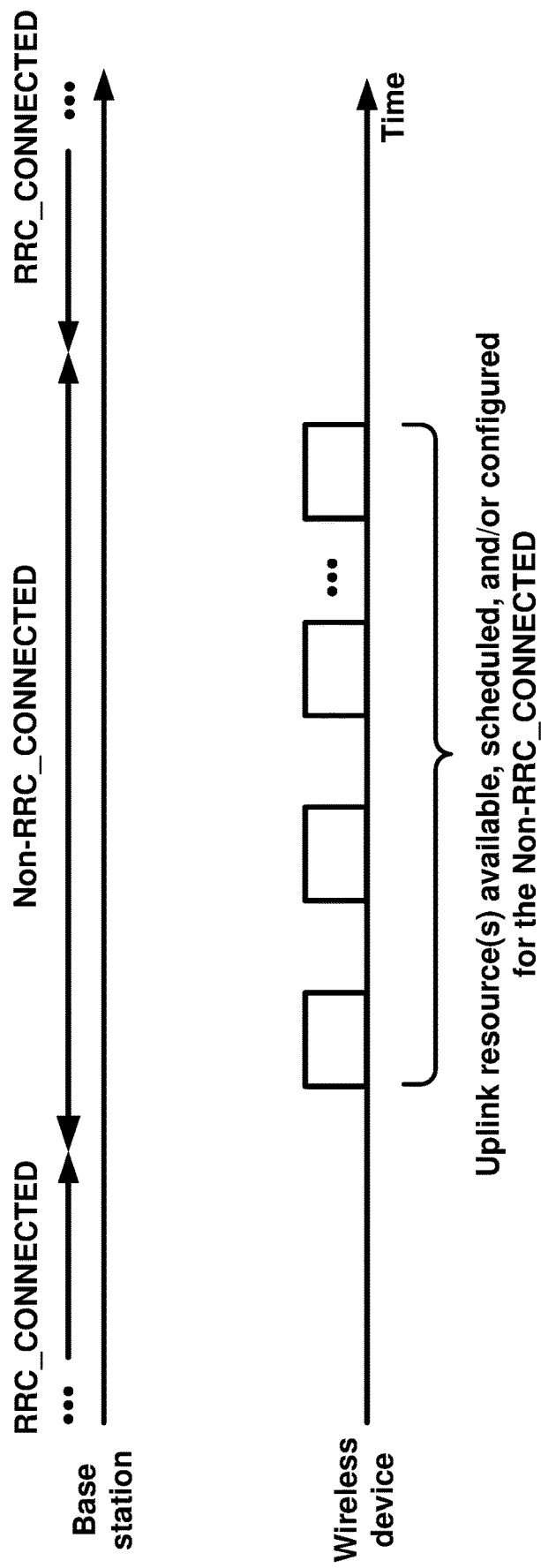
FIG. 17 illustrates uplink data transmission in a Non-RRC_CONNECTED state as per an aspect of an example embodiment of the present disclosure.

FIG. 17 illustrates uplink data transmission in a Non-RRC_CONNECTED state as per an aspect of an example embodiment of the present disclosure. The wireless device may receive one or more messages comprising configuration parameters for the uplink data transmission. The wireless device may receive the one or more messages in the RRC_CONNECTED state. The wireless device may receive the one or more messages in the Non-RRC_CONNECTED state. The one or more messages may be broadcast, e.g., system information block. The one or more messages may be wireless-device-specific, e.g., an RRC message, MAC CE, and/or a DCI dedicated to the wireless device. For example, the one or more messages comprise an RRC release message. The configuration parameters may indicate uplink grant(s) and/or radio resource(s) available, scheduled, and/or configured for SDT(s) during the Non-RRC_CONNECTED state. The wireless device may keep the RRC state as the Non-RRC_CONNECTED state, e.g., after or while performing the SDT(s).

In FIG. 17, a wireless device may determine to transition an RRC state of the wireless device to a Non-RRC_CONNECTED state from an RRC_CONNECTED state. The wireless device may determine to transition an RRC state to the Non-RRC_CONNECTED state after or in response to receiving an RRC message.

For example, a wireless device may receive, from a base station, an RRC message (e.g., RRC release message). The RRC message (e.g., RRC release message) may indicate a release of an RRC connection from a network. In response to receiving the RRC message, the wireless device may perform an RRC release procedure. The RRC release procedure may comprise a release and/or a suspension of an established radio bearers and/or configured radio resources. The RRC release procedure may comprise a suspension of the RRC connection (e.g., if a signaling radio bearer (SRB) (e.g., SRB2) and/or at least one dedicated radio bearer (DRB) are setup) and/or a suspension of the established radio bearer(s). After and/or in response to receiving the RRC message (or performing the RRC release procedure), the wireless device may determine to transition an RRC state of the wireless devices to a Non-RRC_CONNECTED state from an RRC_CONNECTED state.

In FIG. 17, a wireless device may determine to transition an RRC state of the wireless device from a Non-RRC_CONNECTED state to an RRC_CONNECTED state. For example, the wireless device may perform a random access procedure to transition to the RRC_CONNECTED state. The wireless device may transition to the RRC_CONNECTED state without a random access procedure.

For example, a wireless device may transition to the RRC_CONNECTED state via a random access procedure. For example, a wireless device may perform (and/or initiate) the random access procedure for a SDT. For example, the wireless device may perform the random access procedure as an RA-based SDT. The wireless device may perform (and/or initiate) the random access procedure for an initial access. For example, the initial access may be initiated based on receiving, by the wireless device, a paging message. For example, the initial access may be initiated based on a cell (re)selection procedure performed by the wireless. The wireless device may receive a message (e.g., Msg B, Msg 4, RRC setup, and/or RRC resume messages) comprising an indication of transitioning to the RRC_CONNECTED state. The wireless device may transition to the RRC_CONNECTED state, e.g., after or in response to receiving the message.

For example, a wireless device may perform (and/or initiate) a CG-based SDT for uplink transmission of uplink data in the Non-RRC_CONNECTED state. The wireless device may monitor, based on the CG-based SDT, a PDCCH in the Non-RRC CONNECTED state. For example, the CG-based SDT may require the wireless device to monitor the PDCCH, e.g., to receive a response to the uplink transmission and/or to receive uplink grant(s) and/or downlink assignment(s). For example, the wireless device may monitor the PDCCH in response to transmitting the uplink data via the CG-based SDT. The wireless device may monitor the PDCCH during a period of time (e.g., during a time window and/or a time interval) that is predefined and/or configured by a base station to the wireless device. The wireless device may receive, via the PDCCH during the period of time, downlink control message(s) (e.g., DCI) comprising a downlink assignment (e.g., that schedules a downlink transmission). The wireless device may receive based on the downlink assignment, a message (e.g., RRC setup and/or RRC resume) comprising an indication of transitioning to the RRC_CONNECTED state. The wireless device may transition to the RRC_CONNECTED state, e.g., after or in response to receiving the message. In this case, the wireless device may make an RRC connection to a network (or a base station) via the CG-based SDT. For example, the wireless device may make an RRC connection to a network (or a base station) without a random access procedure.

A wireless device may receive, from a base station, one or more configuration parameters that indicates and/or comprise a number of occasions of the one or more uplink radio resources (e.g., an example parameter name NumOccasions). The number of occasions may indicate that the one or more uplink radio resources is one time use resource (or grant) for a single uplink transmission. The number of occasions may indicate that the one or more uplink radio resources is a plurality of uplink radio resources. The number of occasions may indicate that the one or more uplink radio resources is one or more periodic radio resources.

For example, the one or more uplink radio resources may be for CG-based SDT and/or RA-based SDT. For example, the wireless device may receive one or more RRC messages (e.g., a broadcast, multicast, and/or wireless specific messages) comprising the one or more configuration parameters. The wireless device may receive at least one of the one or more RRC messages in an RRC_CONNECTED state. The wireless device may receive at least one of the one or more RRC messages in a Non-RRC_CONNECTED state.

A wireless device may initiate a random access (RA) procedure (e.g., RA-based SDT and/or EDT) on a cell to transmit, via the cell, uplink data in an Non-RRC_CONNECTED state. For example, the uplink data may be associated with a particular logical channel. For example, the uplink data may comprise a service data unit (SDU) from a particular logical channel (e.g., DTCH). The wireless device may keep its RRC state as the Non-RRC_CONNECTED state while performing the RA procedure and/or while transmitting the uplink data during the RA procedure. The wireless device may keep the Non-RRC_CONNECTED state in response to or after completing the RA procedure and/or completing the transmission of the uplink data.

A network or a base station may indicate which cell is available for transmission (e.g., SDT and/or EDT) of uplink data (e.g., associated with DTCH) in an Non-RRC_CONNECTED state. The wireless device may receive, from the base station via a cell, a message (e.g., broadcast, multicast, and/or unicast message) indicating whether the transmission of the uplink data on the cell is available in the Non-RRC_CONNECTED state. For example, a message (e.g., broadcast, multicast, and/or unicast message) may indicate whether an RA-based SDT (e.g., EDT) on the cell is available in the Non-RRC_CONNECTED state. For example, a message (e.g., broadcast, multicast, and/or unicast message) may indicate whether a CG-based SDT (e.g., PUR) on the cell is available in the Non-RRC_CONNECTED state. For example, a message (e.g., broadcast, multicast, and/or unicast message) may indicate whether an SDT (e.g., RA-based SDT and/or CG-based SDT) on the cell is available in the Non-RRC_CONNECTED state. For example, the message may be a broadcast (multicast) system information block(s) of a cell and/or an RRC message dedicated to the wireless device.

In an example, an RRC message (e.g., system information block(s)) that a wireless device receive via a cell may comprise one or more parameters indicating whether to allow the wireless device to perform, via the cell, the transmission of uplink data in an Non-RRC_CONNECTED state. The one or more parameters may be a field indicating the wireless device is allowed to initiate an RA-based SDT on the cell. The indication may be true (e.g., initiating the RA-based SDT is allowed) or false (e.g., initiating the RA-based SDT is not allowed). The indication may be a presence of the field (e.g., initiating the RA-based SDT is allowed) or an absence of the field (e.g., initiating the RA-based SDT is not allowed).

The field may indicate that the wireless device is allowed to initiate RA-based SDT on the cell for transmission of a particular type of data. For example, the particular type of data may comprise control plane (CP) data, user plane (UP) data, mobile originating (MO) data (or call), and/or mobile terminating (MT) data (or call), and/or the like. Example formats of the field for CP and UP data may be:

| | | |
|---|---|---|
| cp-SDT | ENUMERATED {true} | OPTIONAL, -- Need OR |
| up-SDT | ENUMERATED {true} | OPTIONAL, -- Need OR. | cp-SDT (=true) and up-SDT (=true) may respectively indicate the wireless device is allowed to initiate SDT for transmission of CP data and UP data.

The field may indicate that the wireless device is allowed to initiate RA-based SDT on the cell when connected to a particular type of network. For example, the particular type of network may comprise an evolved packet core (EPC) network, a 5G core (5GC) network, and/or the like. The field may indicate that the wireless device is allowed to initiate an RA-based SDT on the cell for transmission of a particular type of data when connected to the particular type of network. Example formats of the field for transmission of CP data via EPC or 5GC may be:

| | | |
|---|---|---|
| cp-SDT-EPC | ENUMERATED {true} | OPTIONAL, -- Need OR |
| cp-SDT-5GC | ENUMERATED {true} | OPTIONAL, -- Need OR. | cp-SDT-EPC(=true) and cp-SDT-5GC(=true) may respectively indicate the wireless device is allowed to initiate the RA-based SDT for transmission of CP data via the EPC and 5GC.

The wireless device may initiate an RA-based SDT on a cell when one or more conditions are fulfilled. For example, the one or more conditions may be whether upper layer(s) request an establishment or resumption of an RRC connection, whether the wireless device supports the SDT for a particular type of data, whether one or more parameters (e.g., broadcast via system information block(s)) indicate that the wireless device the RA-based SDT for the particular type of data when connected to a particular type of network. For example, for cp-SDT when the wireless device is connected to 5GC, the wireless device may initiate the RA-based SDT for the CP data based on at least one of upper layer(s) requesting an establishment or resumption of an RRC connection, CP-SDT available by the wireless device, and/or system information block(s) comprising cp-SDT-5GC=true.

For an SDT (e.g., RA-based SDT and/or CG-based SDT), the wireless device may determine a size of transport block (e.g., a size of message comprising uplink data). The transport block may comprise uplink data (e.g., associated with DTCH) that the wireless device transmits via the SDT. The transport block may comprise (e.g., further comprise) one or more MAC headers, e.g., if required, and/or one or more MAC CEs, e.g., if triggered. For example, the transport block that the wireless device transmits via the RA-based the SDT may be an MAC PDU that comprises the uplink data, the one or more MAC headers, and/or the one or more MAC CEs.

A network or a base station may transmit (e.g., broadcast, multicast, and/or unicast) one or more message (e.g., system information block(s), RRC message(s), MAC CE(s), DCI(s) and/or any combination thereof) comprising one or more sdt-TBS values of a cell. For example, the one or more sdt-TBS values may indicate an amount of uplink data (e.g., associated with DTCH) that a wireless device transmits via an SDT (e.g., RA-based SDT and/or CG-based SDT) on the cell. The wireless device that receives the one or more messages may determine, based on the one or more sdt-TBS values, whether the wireless device initiates an SDT (e.g., RA-based SDT and/or CG-based SDT) on the cell. The wireless device may determine a size of transport block comprising uplink data. The wireless device may determine to transmit the uplink data via the SDT (or initiate the SDT for transmission of the uplink data), e.g., if the size is smaller than or equal to at least one of the one or more sdt-TBS values. For example, the wireless device may be allowed to initiate the SDT on the cell for transmission of the uplink data, e.g., if the size is smaller than or equal to at least one of the one or more sdt-TBS values. The wireless device may determine not to transmit the uplink data via the SDT, e.g., if the size is larger than at least one of the one or more sdt-TBS values (e.g., larger than all of the one or more sdt-TBS values). For example, the wireless device may not be allowed to initiate the RA-based SDT on the cell for transmission of the uplink data, e.g., if the size is larger than at least one of the one or more sdt-TBS values (e.g., larger than all of the one or sdt-TBS more values).

The one or more sdt-TBS values may indicate whether the wireless device initiates the SDT (e.g., RA-based SDT and/or CG-based SDT) for transmission of uplink data (e.g., associated with DTCH) or an RA procedure to make a connection to the network or the base station. For example, the wireless device may determine to transmit the uplink data via the SDT (or initiate the SDT for transmission of the uplink data), e.g., if the size is smaller than or equal to at least one of the one or more sdt-TBS values. The wireless device may keep its RRC state as an Non-RRC_CONNECTED state while the RA-based SDT and/or after completing the RA-based SDT. For example, the wireless device may determine not to perform (or initiate) the uplink data via the SDT, e.g., if the size is larger than at least one of the one or more sdt-TBS values (e.g., larger than all of the one or more sdt-TBS values). In this case, the wireless device may initiate the RA procedure to make the connection. The wireless device may transmit the uplink data, e.g., after or in response to determining that the RA procedure is successfully completed. The wireless device may transition its RRC state from an Non-RRC_CONNECTED state to an RRC_CONNECTED state after or in response to determining that the RA procedure is successfully completed. For example, in this case, the wireless device may transmit the uplink data in the RRC_CONNECTED state.

A base station (or a network) may transmit (broadcast, multicast, and/or unicast) one or more messages (e.g., system information block(s), RRC message(s), MAC CE(s), DCI(s) and/or any combination thereof) comprising a sdt-TBS value of a cell. The one or more messages may comprise an sdt-TBS value per an RA type of an RA procedure of the cell. For example, one or more RA types of the RA procedure may be available on the cell. The one or more RA types may comprise a four-step contention-based RA procedure (e.g., FIG. 13A), a two-step contention-free RA procedure (e.g., FIG. 13A and/or FIG. 13B), and/or a tow-step RA procedure (e.g., FIG. 13C). The sdt-TBS value may be a common parameters applied to one or more RA types of the RA procedure configured on the cell. A wireless device that receives the one or more messages may determine a particular RA type of RA procedure. The wireless device may determine (e.g., select) a particular sdt-TBS value of the particular RA type of RA procedure. The wireless device may determine, based on the particular sdt-TBS value, whether the wireless device transmits uplink data (e.g., associated with DTCH) via an SDT (e.g., RA-based SDT and/or CG-based SDT). The SDT may use one or more parameters (and/or procedures) of the particular RA procedure. For example, the wireless device may initiate, using the particular RA procedure, the SDT on the cell, e.g., if a size of transport block comprising the uplink data (e.g., a size of message comprising the uplink data) is smaller than or equal to the particular sdt-TBS value. For example, the wireless device may not initiate, using the particular RA procedure, the RA-based SDT, e.g., if the size of transport block is larger than the particular sdt-TBS value. For example, the wireless device may select a different RA type of RA procedure of the cell and/or may initiate, using the different RA type of RA procedure, the RA-based SDT, e.g., if the size of transport block is larger than the particular sdt-TBS value. For example, an sdt-TBS value of the different RA type may be larger than the size of transport block.

An example configuration parameter of an sdt-TBS (e.g., or edt-TBS) value may be a value in bits. For example, an example format of the sdt-TBS value may be

```
sdt-TBS-r15 ENUMERATED {b328, b408, b504, b600, b712,
b808, b936, b1000or456},
``` where, for example, a value b328 may correspond to 328 bits, b408 may correspond to 408 bits and so on. For example, a value b1000or456 may correspond to 1000 bits for one or more first RA types of RA procedure, and 456 bits for one or more second RA types of RA procedure.

A base station (or a network) may transmit (e.g., broadcast, multicast, and/or unicast) one or more messages (e.g., system information block(s), RRC message(s), MAC CE(s), DCI(s) and/or any combination thereof) comprising one or more sdt-TBS values of a cell. The one or more sdt-TBS values may be per an RA type of an RA procedure of the cell. For example, one or more RA types of the RA procedure may be available on the cell. The one or more RA types may comprise a four-step contention-based RA procedure (e.g., FIG. 13A), a two-step contention-free RA procedure (e.g., FIG. 13A and/or FIG. 13B), and/or a two-step RA procedure (e.g., FIG. 13C). The one or more sdt-TBS values may be a common parameters applied to one or more RA types of the RA procedure configured on the cell. A wireless device that receives the one or more messages may determine a particular RA type of RA procedure. The wireless device may select a particular sdt-TBS value among the one or more sdt-TBS values for the particular RA type of RA procedure. The one or more messages may indicate that the one or more sdt-TBS values are configured for the particular RA type of RA procedure. The wireless device may determine, based on the particular sdt-TBS value, whether the wireless device transmits uplink data (e.g., associated with DTCH) via an SDT (e.g., RA-based SDT and/or CG-based SDT). The wireless device may use one or more parameters (and/or procedures) of the particular RA procedure. For example, the wireless device may initiate, using the particular RA procedure, the RA-based SDT on the cell, e.g., if a size of transport block comprising the uplink data (e.g., a size of message comprising the uplink data) is smaller than or equal to the particular sdt-TBS value. For example, the wireless device may not initiate, using the particular RA procedure, the RA-based SDT, e.g., if the size of transport block is larger than the particular sdt-TBS value. For example, the wireless device may select a different RA type of RA procedure of the cell and/or may initiate, using the different RA type of RA procedure, the RA-based SDT, e.g., if the size of transport block is larger than the particular sdt-TBS value. For example, an sdt-TBS value of the different RA type may be larger than the size of transport block.

FIG. 18A illustrates an RA-based SDT with a four-step RA procedure as per an aspect of an example embodiment of the present disclosure. A wireless device may receive configuration parameters for the RA-based SDT as per an aspect of an example embodiment of the present disclosure. The wireless device may initiate the four-step RA procedure for the RA-based SDT. The wireless device may determine to transmit a preamble (e.g., Msg1 1311 in FIG. 13A) via PRACH resource(s). The wireless device may determine the preamble and/or the PRACH resource(s) to indicate, to a base station, a request of a transmission of uplink data (e.g., associated with DTCH) via Msg3 (e.g., Msg 3 1313 in FIG. 13B). The request may be an indication of triggering and/or initiating the RA-based SDT. The request may indicate a size (e.g., expected, measured, determined size) of a TB comprising the uplink data. The wireless device may receive a response (e.g., Msg2 1312 in FIG. 13A) to the preamble. The response may indicate whether the wireless device is allowed to transmit the uplink data via Msg 3 transmission. If the response indicates that the wireless device is not allowed to transmit the uplink data, the wireless device may cancel the RA-based SDT. The wireless device may transmit Msg3 without the uplink data, e.g., after or in response to canceling the RA-based SDT. If the response indicates that the wireless device is allowed to transmit the uplink data, the wireless device transmit the TB comprising the uplink data via Msg3 transmission. The wireless device may receive a response (e.g., Msg 4 1314 in FIG. 13A) to the Msg3 transmission.

FIG. 18B illustrates an RA-based SDT with a two-step RA procedure as per an aspect of an example embodiment of the present disclosure. A wireless device may receive configuration parameters for the RA-based SDT as per an aspect of an example embodiment of the present disclosure. The wireless device may initiate the two-step RA procedure for the RA-based SDT. The wireless device may determine to transmit a preamble (e.g., Preamble 1341 in FIG. 13C) via PRACH resource(s). The wireless device may determine to transmit a TB (e.g., Transport Block 1342 in FIG. 13C) comprising uplink data (e.g., associated with DTCH) via PUSCH resource(s). The wireless device may determine the preamble, the PRACH resource(s), and/or PUSCH resource(s) to indicate, to a base station, a request of a transmission of uplink data via MsgA. The request may be an indication of triggering and/or initiating the RA-based SDT. The request may indicate a size (e.g., expected, measured, determined size) of the TB comprising the uplink data. The wireless device may receive a response (e.g., MsgB 1332 in FIG. 13C) to the MsgA. The response may indicate a success (e.g., successRAR) of the MsgA transmission. The response may indicate a fallback (e.g., fallbackRAR) to a contention resolution of the four-step RA procedure. The wireless device may (re)transmit the TB via Msg 3 transmission of the contention resolution. The response may indicate that the wireless device is not allowed to perform the RA-based SDT. In this case, the wireless device may cancel the RA-based SDT.

A wireless device may initiate an RA procedure on a cell for transmission of uplink data (e.g., associated with DTCH) via an RA-based SDT. The wireless device may select an RA type of the RA procedure among a four-step RA type and a two-step RA type. The RA type may be associated with at least one sdt-TBS value. The wireless device may determine a TBS of a TB based on the at least one sdt-TBS value. For example, the TB may comprise an MAC PDU that comprises the uplink data and/or one or more padding bits. The wireless device may append the one or more padding bits to the MAC PDU, e.g., if a size of the uplink data (e.g., expected message comprising the uplink data) is smaller than the TBS.

A wireless device may receive a message comprising one or more configurations. A configuration of the one or more configuration may comprise an identifier (or index) of the configuration. each of the one or more configuration may comprise radio resource configuration parameters of one or more uplink radio resources that the wireless device may use in a Non-RRC_CONNECTED state. For example, the wireless device may perform a CG-based SDT via the one or more uplink radio resources.

A wireless device may receive an RRC message indicating one or more uplink radio resources that a wireless device uses in an Non-RRC_CONNECTED state. For example, the wireless device may perform a CG-based SDT via the one or more uplink radio resources. The one or more uplink radio resources in the Non-RRC_CONNECTED state may be one time use resource, e.g., for a single transmission. The one or more uplink radio resources in the Non-RRC_CONNECTED state may be periodic resources, e.g., for one or more uplink transmission(s). The one or more uplink radio resources in the Non-RRC_CONNECTED state may be referred to as a variety of names in different systems and/or implementations. The one or more uplink radio resources in the Non-RRC_CONNECTED state may be referred to as preconfigured uplink resources (PURs). Uplink grants indicating the one or more uplink radio resources in the Non-RRC_CONNECTED state may be referred to as (pre-)configured grant(s). The (pre-)configured grant(s) may comprise a plurality of types. For example, the (pre-)configured grant(s) may comprise a (pre-)configured grant Type 1 and/or a (pre-)configured grant Type 2.

One or more uplink radio resources determined (and/or indicated) by the (pre-)configured grant Type 1 may not require an indication of (re-)initiating (and/or (re-)activating) the one or more uplink radio resources. For example, the one or more uplink radio resources determined (and/or indicated) by the (pre-)configured grant Type 1 may not require an indication of (re-) initiating (and/or (re-)activating) the one or more uplink radio resources, e.g., after or in response to receiving the RRC message indicating the one or more uplink radio resources in the Non-RRC_CONNECTED state.

For example, a wireless device may (re-)initiate (and/or (re-)activate) (pre-)configured grant Type 1 and/or one or more uplink radio resources indicated by the (pre-)configured grant Type 1 after or in response to receiving the RRC message comprising the (pre-)configured grant Type 1. For example, For example, if a wireless device receives configuration parameters of the (pre)configured grant Type 1 for a Non-RRC_CONNECTED state, the wireless device may (re-)initiate (and/or (re-)activate) (pre-)configured grant Type 1 and/or one or more uplink radio resources indicated by the (pre-)configured grant Type 1 after or in response to receiving the RRC message comprising the (pre-)configured grant Type 1 and/or after or in response to transiting an RRC state of the wireless device to the Non-RRC_CONNECTED state.

One or more uplink radio resources determined (and/or indicated) by (pre-)configured grant Type 2 may require an indication of (re-)initiating (and/or (re-)activating) the one or more uplink radio resources. For example, the wireless device may not (re-)initiate (and/or (re-) activate) the one or more uplink radio resources after or in response to receiving the RRC message comprising the (pre-)configured grant Type 2 that indicates the one or more uplink radio resources.

For example, the wireless device may (re-)initiate (and/or (re-)activate) the one or more uplink radio resources after or in response to receiving the indication of (re-)initiating (and/or (re-)activating) the one or more uplink radio resources in the Non-RRC_CONNECTED state. The wireless device may receive the indication after or in response to receiving the RRC message comprising the (pre-)configured grant Type 2 that indicates the one or more uplink radio resources. The wireless device may receive the indication in the Non-RRC_CONNECTED state. If the wireless device receives the indication in an RRC_CONNECTED state, the wireless device may (re-)initiate (and/or (re-)activate) the one or more uplink radio resources after or in response to transitioning an RRC state of the wireless device to the Non-RRC_CONNECTED state. If the wireless device receives the indication in an RRC_CONNECTED state, the wireless device may (re-)initiate (and/or (re-)activate) the one or more uplink radio resources for the RRC_CONNECTED state. The wireless device may determine to (re-)initiate (and/or (re-)activate) and/or may keep the (re-)initiated (and/or (re-) activated) one or more uplink radio resources in the RRC_CONNECTED state as active in the Non-RRC_CONNECTED after or in response to transitioning an RRC state of the wireless device to the Non-RRC_CONNECTED state. The uplink grant(s) indicating the one or more uplink radio resources in the Non-RRC_CONNECTED state may be referred to as (pre-) configured grant(s) with a particular type indicator, e.g., a (pre-)configured grant type 3, 4, or etc. For example, the (pre-)configured grant Type 1 and the (pre-)configured grant Type 2 may indicate one or more (periodic) uplink grants in the RRC_CONNECTED state. For example, the (pre-)configured grant Type 3 (and/or other types of (pre-)configured grant) may indicate one or more (periodic) uplink grants in the Non-RRC_CONNECTED state.

A wireless device may receive, from a base station, one or more configuration parameters that indicates and/or comprise a number of occasions of the one or more uplink radio resources (e.g., an example parameter name NumOccasions). The one or more uplink radio resources may be for a CG-based SDT. The number of occasions may indicate that the one or more uplink radio resources is one time use resource (or grant) for a single uplink transmission. The number of occasions may indicate that the one or more uplink radio resources is a plurality of uplink radio resources. The number of occasions may indicate that the one or more uplink radio resources is one or more periodic radio resources.

The wireless device may receive the one or more configuration parameters, e.g., via a wireless device specific message (e.g., RRC message). The wireless device specific message may be an RRC release message. The wireless device specific message may be an RRC message that the wireless device receives in an RRC_CONNECTED state.

In an example, the one or more configuration parameters that the wireless device receives may indicate a resource allocation of the one or more uplink radio resources. For example, the one or more configuration parameters may indicate a periodicity (e.g., example parameter name Periodicity) of the one or more uplink radio resources in the Non-RRC_CONNECTED state. For example, the periodicity may be for uplink grant(s) of an SDT (e.g., CG-based SDT) and/or the one or more uplink radio resources indicated by the uplink grant(s).

For example, the one or more configuration parameters may comprise a time offset. For example, the time offset may be for uplink grant(s) of an SDT (e.g., CG-based SDT)

and/or the one or more uplink radio resources indicated by the uplink grant(s). The time offset may be a time domain offset with respect to (and/or related to) a time reference. The time reference may be a particular SFN (e.g., of a H-SFN), a particular subframe number, a particular slot number, a particular symbol number, and/or a combination thereof. The time reference may be predefined (e.g., SFN=0 and/or H-SFN=0). The time reference may be a predefined value (e.g., SFN=0 and/or H-SFN=0), e.g., if a field of the time reference is not present in the one or more configuration parameters. For example, the wireless device may receive the uplink grant(s), e.g., indicated by the one or more configuration parameters. The uplink grant(s) may indicate the one or more uplink radio resources. The one or more uplink radio resources may start from a symbol (of a slot of an SFN of a H-SFN) indicated by the time offset. The one or more uplink radio resources may occur from the symbol periodically with the periodicity. For example, the wireless device may, e.g., sequentially, determine that an $N^{th}$ uplink grant of the one or more uplink grant(s) occurs in an transmission time interval (TTI, e.g., slot(s), mini-slot(s), symbol(s)) based on the time offset and N*Periodicity. The time offset may be defined in terms of a number of symbols, a number of slots, a number of subframes, a number of SFNs, a number of H-SFNs, and/or a combination thereof. For example, the one or more configuration parameters may comprise a parameter, timeDomainOffset or the like. For example, timeDomainOffset indicates the time offset that the wireless device received from a base station. For example, the one or more configuration parameters may comprise a parameter, timeReferenceSFN or the like (e.g., a time reference reference defined in terms of SFN(s) and/or H-SFN). For example, timeReferenceSFN indicates an SFN as the time reference used for determination of the time offset of a resource in time domain. For example, the SFN may repeat with a period of 1024 frames. For example, the wireless device may receive, via SFN=3, the one or more configuration parameters indicating timeReferenceSFN=0. For example, timeReferenceSFN=0 may indicate a time reference SFN=0 that is 3 SFNs before the SFN=3. For example, timeReferenceSFN=0 may indicate a time reference SFN=0 that is 1021 SFNs after the SFN=3. For example, the wireless device may determine the closest SFN with the indicated number preceding the reception of the configured grant configuration. For example, in the above example, the wireless device may determine that timeReferenceSFN=0 indicates a time reference SFN=0 that is 3 SFNs before the SFN=3.

For example, the wireless device may, e.g., sequentially, determine that the $N^{th}$ uplink grant of the uplink grant(s) occurs (and/or the uplink grant recurs) in the symbol for which: [(SFN×numberOfSlotsPerFrame×numberOfSymbolsPerSlot)+(slot number in the frame×numberOfSymbolsPerSlot)+symbol number in the slot]=(timeReferenceSFN× numberOfSlotsPerFrame×numberOfSymbolsPerSlot+ timeDomainOffset×numberOfSymbolsPerSlot+S+N× periodicity) modulo (1024×numberOfSlotsPerFrame× numberOfSymbolsPerSlot). For example, numberOfSlotsPerFrame is a number of slots in a frame. For example, numberOfSymbolsPerSlot, is a number of symbols in a slot. For example, periodicity is a peirodicity of the one or more uplink radio resources indicated by the one or more configuration parameters. For example, S is a symbol number (or symbol offset) indicated by the one or more configuration parameters. The determination of the $N^{th}$ uplink grant above may be a case that (pre-)configured grant(s) may not require an additional activation message (e.g., DCI, MAC CE, and/or RRC) that activates (and/or initiates) the one or more uplink radio resources (and/or (pre-)configured grant(s)).

For example, the wireless device may, e.g., sequentially, determine that the $N^{th}$ uplink grant of the uplink grant(s) occurs (and/or the uplink grant recurs) in the symbol for which: [(SFN×numberOfSlotsPerFrame×numberOfSymbolsPerSlot)+(slot number in the frame×numberOfSymbolsPerSlot)+symbol number in the slot]=[(SFNstart time× numberOfSlotsPerFrame×numberOfSymbolsPerSlot+ slotstart time×numberOfSymbolsPerSlot+symbolstart time)+N×periodicity] modulo (1024×numberOfSlotsPerFrame×numberOfSymbolsPerSlot). The determination of the $N^{th}$ uplink grant above may be a case that (pre-)configured grant(s) may require an additional activation message (e.g., DCI, MAC CE, and/or RRC) that activates (and/or initiates) the one or more uplink radio resources (and/or (pre-)configured grant(s)). For example, SFNstart time, slotstart time, and symbolstart time are the SFN, slot, and symbol, respectively, at a time the one or more uplink grant(s) was (re-)initiated. For example, SFNstart time, slotstart time, and symbolstart time are the SFN, slot, and symbol, respectively, at a time where the wireless device receives an indication (e.g., DCI) of (re-)initiating (and/or (re-)activating) the one or more uplink grant(s). For example, SFNstart time, slotstart time, and symbolstart time are the SFN, slot, and symbol, respectively, of a transmission opportunity of PUSCH where the one or more uplink grant(s) was (re-)initiated. For example, the transmission opportunity of PUSCH is the first opportunity of PUSCH where the one or more uplink grant(s) was (re-)initiated.

The wireless device may (re-)initiate transmission via one or more uplink radio resources in the Non-RRC_CONNECTED state based on one or more conditions. For example, the transmission may be a CG-based SDT. For example, the wireless device may receive configuration parameter(s) indicating the one or more conditions. For example, the wireless device may determine if a cell, where one or more uplink radio resources in the Non-RRC_CONNECTED state are configured, supports transmission(s) via the one or more uplink radio resources. For example, the wireless device may receive RRC message(s) (e.g., SIB). The RRC message(s) may comprise configuration parameter(s) indicating whether the cell supports transmission(s) via the one or more uplink radio resources. The configuration parameter(s) may indicate which type of transmission is supported (or available) via the one or more uplink radio resources. For example, the type may comprise control plane (CP) transmission and/or user-plane (UP) transmission. The configuration parameter(s) may indicate which type of network, the cell is connected, supports the transmission via the one or more uplink radio resources. Depending on the type of network that the cell is connected, the wireless device may determine whether the transmission via the one or more uplink radio resources is supported in the cell. For example, the type of network may comprise one or more generations in a network system (e.g., 5G core, Evolved Packet Core (EPC), and/or the like) and/or one or more wireless technologies (e.g., Wifi, 5G, Bluetooth, and/or the like). For example, the configuration parameter(s) may indicate which type of spectrum (and/or frequency band) supports the transmission via the one or more uplink radio resources. For example, the type of spectrum may comprise licensed spectrum and/or unlicensed spectrum. For example, the type of spectrum may comprise a CBRS (Citizens Broadband Radio Service) band (e.g., a wideband in 3.5 GHz band). For example, the type of spectrum may comprise a millimeter wave band (e.g., over 30 GHz band). The configuration parameter(s) in the RRC message(s) may indicate a combination of the type of network, the type of spectrum, and/or the type of transmission. For example, parameter(s), cp-PUR-5GC (e.g., the parameter value may be 'true'/'false' or 'enabled'/'disabled'), in the RRC message(s) indicate whether CP transmission using CG-based SDT is supported in the cell when connected to 5G core network. For example, parameter(s), cp-PUR-EPC (e.g., the parameter value may be 'true'/'false' or 'enabled'/'disabled'), in the RRC message(s) indicate whether CP transmission using CG-based SDT is supported in the cell when connected to EPC. For example, if the RRC message(s) received from a cell indicates cp-PUR-EPC='true' (or 'enabled'), the wireless device determines that the CG-based SDT is supported in the cell when connected to EPC.

Figure 19A:
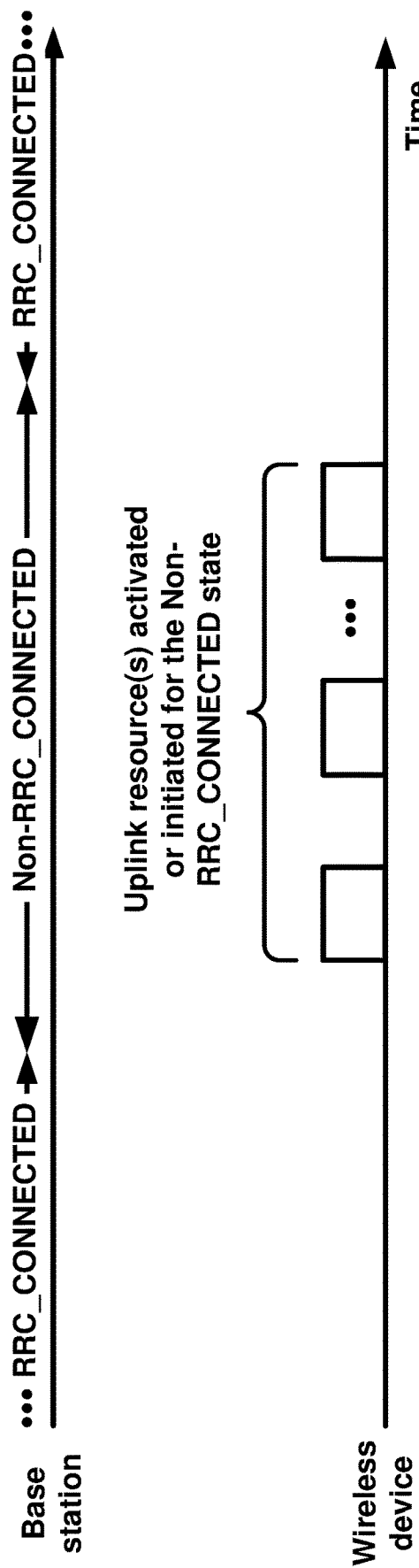
FIG. 19A is an example of (pre-)configured grant(s) of one or more uplink radio resources in a Non-RRC_CONNECTED state as per an aspect of an embodiment of the present disclosure.

FIG. 19A is an example of (pre-)configured grant(s) of one or more uplink radio resources in a Non-RRC_CONNECTED state as per an aspect of an embodiment of the present disclosure. A wireless device may perform a CG-based SDT via the one or more uplink radio resources of the (pre-)configured grant(s). The (pre-)configured grant(s) may not require an additional activation message (e.g., DCI, MAC CE, and/or RRC) to activate (and/or initiate) the one or more uplink radio resources (and/or (pre-)configured grant(s)). For example, a wireless device may receive an RRC message. The RRC message may comprise configuration parameters of the (pre-)configured grant(s) of a cell. The RRC message may comprise an indication and/or an index of a configuration comprising the configuration parameters. For example, the RRC message may be an RRC release message. After or in response to receiving the RRC message, the wireless device may determine (and/or store) the (pre-)configured grant(s) for the cell. After or in response to receiving the RRC message, the wireless device may (re-)initiate (or activate) the (pre-)configured grant. The one or more uplink radio resources (and/or (pre-)configured grant(s)) may be activated and/or initiated (or valid) in an RRC_INACTIVE state. For example, the wireless device may (re-)initiate (or activate) the (pre-)configured grant to start in (and/or from) a time reference. For example, the time reference may be a symbol, a slot, a subframe, an SFN, and/or a hyper-SFN (H-SFN). For example, the H-SFN comprise one or more SFNs (e.g., 1024 SFNs). For example, the time reference may be a combination of one or more of a symbol, a slot, a subframe, an SFN, and/or a hyper-SFN (H-SFN). For example, the time reference may be a symbol of a slot of an SFN of a H-SFN indicated by the configuration parameters (e.g., a time domain offset (e.g., indicating the H-SFN, the SFN and/or the slot) and a symbol number S (e.g., indicating the symbol). For example, the wireless device may determine that the (pre-)configured grant (re-)occurs with a periodicity indicated by the configuration parameters.

In FIG. 19A, a wireless device may make a connection to a network (or a base station) via the CG-based SDT. For example, the wireless device may transmit a first message via one or more uplink rando resources in a Non-RRC_CONNECTED state during the CG-based SDT. The first message may comprise an RRC connection setup request (e.g., for the RRC connection setup procedure) and/or an RRC connection resume request (e.g., for the RRC connection resume procedure). The first message may comprise an SDT (EDT) request message. The wireless device may receive, from the base station, a second message indicating a transition to an RRC_CONNECTED state. The second message may be a response to the first message. For example, the wireless device may receive an RRC connection setup message. For example, the wireless device may receive an RRC connection resume message. The wireless device may transition to the RRC_CONNECTED state after or in response to receiving the second message. The wireless device may deactivate and/or suspend (or clear), in an RRC_CONNECTED state, the one or more uplink radio resources (and/or (pre-)configured grant(s)) that were used in the Non-RRC_CONNECTED state. For example, the one or more uplink radio resources (and/or (pre-)configured grant(s)) may be deactivated and/or suspended (cleared, and/or invalid) after or in response to making the connection to the base station in FIG. 18A.

Figure 19B:
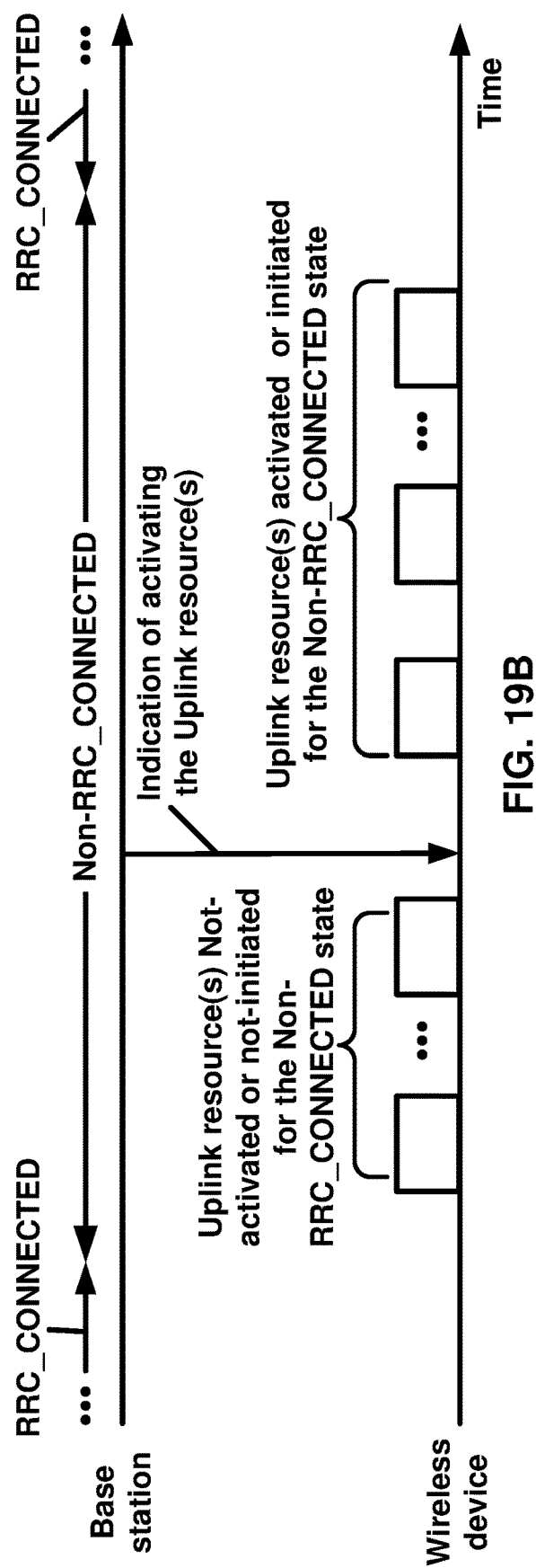
FIG. 19B is an example of (pre-)configured grant(s) indicating one or more uplink radio resources in a Non-RRC_CONNECTED as per an aspect of an embodiment of the present disclosure.

FIG. 19B is an example of (pre-)configured grant(s) indicating one or more uplink radio resources in a Non-RRC_CONNECTED as per an aspect of an embodiment of the present disclosure. A wireless device may perform a CG-based SDT via the one or more uplink radio resources of the (pre-)configured grant(s). The (pre-)configured grant(s) in FIG. 18B may require an additional activation message (e.g., DCI, MAC CE, and/or RRC) that activates (and/or initiates) the one or more uplink radio resources (and/or (pre-)configured grant(s)). For example, a wireless device may receive an RRC message comprising configuration parameters of the (pre-)configured grant(s) of a cell. After or in response to receiving the RRC message, the wireless device may determine (and/or store) the (pre-)configured grant(s) for the cell. For example, the RRC message may be an RRC release message. After or in response to receiving the RRC message, the wireless device may not (re-)initiate (or activate) the (pre-)configured grant, e.g., until the wireless device receives the additional activation message (e.g., DCI, MAC CE, and/or RRC). The wireless device may monitor a PDCCH in the Non-RRC_CONNECTED state to receive the additional activation message. The wireless device may receive the additional activation message (e.g., DCI, MAC CE, and/or RRC) after or in response to receiving the RRC message. A DCI carried by the PDCCH may be the additional activation message. An MAC CE, and/or RRC message received based on a downlink assignment of a DCI carried by the PDCCH may be the additional activation message. The configuration parameters in the RRC message may indicate time and frequency resource allocation of the PDCCH, monitoring occasion(s) of the PDCCH, and/or a monitoring periodicity of the PDCCH. The wireless device may determine that the (pre-)configured grant (re-)occurs with a periodicity indicated by the configuration parameters and/or timing offset references (e.g., a H-SFN, a SFN, a slot and/or a symbol). For example, a wireless device may determine the SFN (e.g., of the H-SFN), the slot and/or the symbol based on a reception timing of the additional activation message received via the PDCCH. The wireless device may receive a deactivation message that indicates to deactivate and/or suspend (clear, and/or invalidate) the one or more uplink radio resources (and/or (pre-)configured grant(s)). The wireless device may receive the deactivation message in the Non-RRC_CONNECTED state.

In FIG. 19B, a wireless device may make a connection to a network (or a base station) via the CG-based SDT. For example, the wireless device may transmit a first message via one or more uplink rando resources in a Non-RRC_CONNECTED state during the CG-based SDT. The first message may comprise an RRC connection setup request (e.g., for the RRC connection setup procedure) and/or an RRC connection resume request (e.g., for the RRC connection resume procedure). The first message may comprise an SDT (EDT) request message. The wireless device may receive, from the base station, a second message indicating a transition to an RRC_CONNECTED state. The second message may be a response to the first message. For example, the wireless device may receive an RRC connection setup message. For example, the wireless device may receive an RRC connection resume message. The wireless device may transition to the RRC_CONNECTED state after or in response to receiving the second message. The wireless device may deactivate and/or suspend (or clear), in an RRC_CONNECTED state, the one or more uplink radio resources (and/or (pre-)configured grant(s)) that were used in the Non-RRC_CONNECTED state. For example, the one or more uplink radio resources (and/or (pre-)configured grant(s)) may be deactivated and/or suspended (cleared, and/or invalid) after or in response to making the connection to the base station in FIG. 18B.

One or more radio resource(s) used for RA-based SDT and/or CG-based SDT may be configured with a particular BWP of a cell. The particular BWP may comprise a DL BWP and/or a UL BWP. One or more downlink receptions of SDT may be configured in the DL BWP. One or more uplink transmission of SDT may be configured in the UL BWP. The particular BWP may be referred to as different name(s), e.g., as a contiguous (or non-contiguous) frequency and/or a range of radio frequency where the RA-based SDT and/or CG-based SDT are configured. The particular BWP, where RA-based SDT and/or CG-based SDT are configured may be predefined (e.g., as an initial BWP of the cell). The particular BWP where RA-based SDT and/or CG-based SDT are configured may be semi-statically configured, e.g., by an RRC message such as an RRC release message.

In an example, the wireless device may receive message(s) (e.g., RRC message(s)) comprising configuration parameters of the particular BWP. The particular BWP may comprise DL BWP and/or UL BWP. The configuration parameters may indicate a numerology (e.g., subcarrier spacing) used in the particular BWP. The configuration parameters may indicate a numerology applied to the DL BWP and/or the UL BWP. The configuration parameters may comprise separate fields and/or indicators indicating numerologies, each used in DL BWP and/or UL BWP. The numerologies used in DL BWP and/or UL BWP may be the same or different. The configuration parameters may comprise radio resource configuration parameters of DL and/or UL control channel (e.g., PDCCH and/or PUCCH) used for transmission via the one or more radio resource(s). The configuration parameters may comprise radio resource configuration parameters of DL and/or UL data channel (e.g., PDSCH and/or PUSCH) used for transmission via the one or more radio resource(s). The DL control and/or data channels (e.g., PDCCH and/or PDSCH) may be configured within the DL BWP. The UL control and/or data channels (e.g., PUCCH and/or PUSCH) may be configured within the UL BWP.

One or more radio resource(s) used for RA-based SDT and/or CG-based SDT may be configured with a particular BWP of a cell. The particular BWP may be an initial BWP. For example, at least one of a DL BWP and a UL BWP configured with RA-based SDT and/or CG-based SDT may be an initial BWP. For example, the DL BWP of the particular BWP may be an initial DL BWP. For example, the UL BWP of the particular BWP may be an initial UL BWP. For example, at least one of the DL BWP and the UL BWP may be an initial BWP. For example, both of the DL BWP and the UL BWP may be initial BWPs, e.g., the initial DL BWP and the initial UL BWP.

One or more radio resource(s) used for RA-based SDT and/or CG-based SDT may be configured with a particular BWP of a cell. The particular BWP may be configured separately from the initial BWP. For example, at least one of a DL BWP and a UL BWP configured with RA-based SDT and/or CG-based SDT may be different from an initial BWP. For example, the DL BWP of the particular BWP may be different form the initial DL BWP. For example, the UL BWP of the particular BWP may be different from initial UL BWP. For example, the one or more radio resource(s) may be associated with a DL BWP and/or a UL BWP. For example, PDCCH (e.g., ACK, NACK, and/or fallback response(s) to the transmission via the one or more radio resource(s)) and/or PDSCH (e.g., RRC response to the RRC message transmitted via the one or more radio resource(s)) related to the transmission via the one or more radio resource(s) may be configured with the DL BWP. For example, PUCCH (e.g., ACK and/or NACK response to the PDSCH) and/or PUSCH (e.g., data via the one or more radio resource(s)) related to the transmission via the one or more radio resource(s) may be configured with the UL BWP. The wireless device may determine that the particular BWP (e.g., DL BWP and/or UL BWP) is the initial BWP (e.g., initial DL BWP and/or initial UL BWP, respectively), e.g., if field(s) indicating the configuration (e.g., frequency location, bandwidth, and/or numerology (e.g., subcarrier spacing)) of the particular BWP, e.g., that is different from the initial BWP, are absent in the configuration parameters indicating the one or more radio resource(s).

One or more radio resource(s) used for RA-based SDT and/or CG-based SDT may be configured with a particular BWP of a cell. The particular BWP may be an active BWP that the wireless device used in RRC_CONNECTED. For example, the DL BWP of the particular BWP may be a last DL BWP that the wireless device used as an active DL BWP in an RRC_CONNECTED state. For example, the UL BWP of the particular BWP may be a last UL BWP that the wireless device used as an active UL BWP in RRC_CONNECTED. For example, the wireless device may transition to a Non-RRC_CONNECTED state from an RRC_CONNECTED state. A BWP (e.g., a last DL BWP and/or a last UL BWP) that the wireless device uses in the RRC_CONNECTED state may be used in the transitioned the Non-RRC_CONNECTED state. The wireless device may determine that the particular BWP (e.g., DL BWP and/or UL BWP) is the BWP (e.g., the last DL BWP and/or the last UL BWP, respectively), e.g., if field(s) indicating the configuration (e.g., frequency location, bandwidth, and/or numerology (e.g., subcarrier spacing)) of the particular BWP, e.g., that is different from the last BWP, are absent in the configuration parameters indicating the one or more radio resource(s).

One or more radio resource(s) used for RA-based SDT and/or CG-based SDT may be configured with a particular BWP of a cell. The particular BWP may be configured separately from the initial BWP. For example, the DL BWP of the particular BWP may be different form the initial DL BWP. For example, the UL BWP of the particular BWP may be different from initial UL BWP. For example, the one or more radio resource(s) may be associated with a DL BWP and/or a UL BWP. For example, PDCCH (e.g., ACK, NACK, and/or fallback response(s) to the transmission via the one or more radio resource(s)) and/or PDSCH (e.g., RRC response to the RRC message transmitted via the one or more radio resource(s)) related to the transmission via the one or more radio resource(s) may be configured with the DL BWP. For example, PUCCH (e.g., ACK and/or NACK response to the PDSCH) and/or PUSCH (e.g., data via the one or more radio resource(s)) related to the transmission via the one or more radio resource(s) may be configured with the UL BWP.

In an example, the one or more configuration parameters may indicate a value of a time alignment timer (TAT) (e.g., example parameter name TimeAlignmentTimer) for a cell (and/or a cell group comprising the cell) where the one or more uplink radio resources in a Non-RRC_CONNECTED state are configured. The cell group comprising the cell may be referred to as a timing advance group (TAG). The value of the TAT may indicate how long a timing advance offset value is valid (e.g., is valid to be used) for adjusting uplink timing for uplink transmission to the cell (and/or cell(s) in the cell group). For example, the value of the TAT may determine how long the wireless device determine the cell (and/or cell(s) belonging to the associated TAG) to be uplink time aligned. The wireless device may determine (or adjust), based on the timing advance offset value, uplink timing for uplink transmission (e.g., PRACH, PUSCH, SRS, and/or PUCCH transmission) on the cell (and/or cells in the cell group). For example, the timing advance offset value may indicate how much (and/or long) the uplink timing for uplink transmission is delayed or advanced for uplink synchronization. For example, the wireless device may run the TAT during a time interval (and/or duration) indicated by the value of the TAT. The wireless device may determine that the timing advance offset value is valid (and/or is used) for adjusting uplink timing for uplink transmission on the cell (or cell(s) in the cell group) while the TAT is running. The wireless device may determine that an uplink from the wireless device to the cell (e.g., base station) is out-of-synchronized, e.g., if the TAT associated with the cell group (e.g., TAG) to which the cell belongs is not running and/or expires. For example, the wireless device may stop to perform uplink transmission(s) on a cell (and/or cell(s) in the cell group), e.g., if the TAT associated with the cell group (e.g., TAG) to which the cell belongs is not running and/or expires. The wireless device may stop uplink transmissions for a cell, e.g., due to the fact that the (e.g., maximum) uplink transmission timing difference between TAGs of the wireless device or the (e.g., maximum) uplink transmission timing difference between TAGs of any MAC entity of the wireless device (e.g., two MAC entities configured for a dual connectivity) is exceeded, the wireless device may determine the TAT associated with the cell as expired. The wireless device may perform a random access preamble (re-)transmission and/or MSG A (re-)transmission, e.g., when the TAT associated with the cell group (e.g., TAG) to which the cell belongs is not running and/or expires. The wireless device may (re-)start the TAT after or in response to receiving a timing advance command that indicates a (new and/or updated) timing advance offset value of the cell (and/or cells in the cell group). The timing advance command may be received as an MAC CE and/or DCI. The timing advance command may indicate a timing advance offset value of a cell where the one or more uplink radio resources in a Non-RRC_CONNECTED state.

The wireless device may (re-)start the time alignment timer after or in response to transition to a Non-RRC_CONNECTED, e.g., if the wireless device receives (and/or is configured with) the one or more uplink radio resources for the Non-RRC_CONNECTED state. For example, the wireless device may (re-)start the time alignment timer after or in response to receiving configuration parameter(s) (e.g., timer value of the time alignment timer) associated with the time alignment timer. The wireless device may (re-)start the time alignment timer after or in response to receiving a timing advance offset value. The wireless device may receive a lower layer control message (e.g., DCI or PDCCH) that indicates the timing advance offset value. The wireless device may receive an MAC layer control message (e.g., MAC CE and/or RAR) that indicates the timing advance offset value. For example, the wireless device may (re-)start the time alignment timer after or in response to receiving a timing advance command MAC control element and/or PDCCH indicating timing advance adjustment. The wireless device may determine that the timing advance offset value is valid at least while the TAT is running. The wireless device may validate a TA value based on one or more validation conditions. The wireless device may (re-)start the time alignment timer after or in response to a determination that the TA is validated. For example, if the TAT has run for a time interval (or duration) indicated by the value of the TAT, the wireless device may determine that the TAT expires. The wireless device may determine that the timing advance offset value is invalid in response to the expiry of the TAT.

Terminologies used in the present disclosure may be interchangeable with and/or be referred to as one or more different ones. For example, the timing advance value may be referred to as a timing alignment value. For example, the timing advance offset value may be referred to as a timing alignment offset value. For example, the timing alignment timer may be referred to as a time alignment timer, a timing advance timer, and/or a time advance timer. For example, the timing advance group may be referred to as a timing alignment group.

For example, the wireless device determines, based on one or more validation conditions (e.g., a TAT based validation and/or a measurement based validation), e.g., if the wireless device has a valid timing advance value. For example, the wireless device may determine the configuration of the one or more uplink radio resources is valid, e.g., based on configuration parameter(s) of the one or more uplink radio resources indicating a validity of the configuration. For example, the wireless device receives message(s) comprising the configuration parameter(s). the configuration is valid, e.g., if a field, config, in the message(s) is set to setup (e.g., true). For example, the configuration is valid, e.g., if the field, config, is set to release (e.g., false).

The wireless device may determine, based on one or more validation conditions, if a timing advance value is valid or not for transmission via the one or more uplink radio resources in the Non-RRC_CONNECTED state. For example, the one or more validation conditions may comprise a TAT based validation and/or a measurement based validation. The wireless device may determine to apply the configured condition(s) among the one or more validation conditions. For example, the wireless device receives message(s) comprising configuration parameters of a first validation condition (e.g., the TAT based validation) among the one or more validation conditions. The message(s) may not comprise configuration parameters of a second validation condition (e.g., the measurement based validation) among the one or more validation conditions. In this case, the wireless device may determine if the timing advance value is valid or not at least based on the first validation condition. For example, if the message(s) comprising configuration parameters of the first validation condition (e.g., the TAT based validation) and the second validation condition (e.g., the measurement based validation), the wireless device may determine if the timing advance value is valid or not at least based on the first validation condition and the second validation condition.

For example, for the TAT based validation, the wireless device determine a validity of the timing advance value based on a TAT. The wireless device may receive RRC message(s) comprising a value of the TAT. The TAT may be for a cell (and/or a TAG comprising the cell) where one or more uplink radio resources in the Non-RRC_CONNECTED state are configured. The wireless device may determine that the timing advance value for transmission via the one or more uplink radio resources is valid, e.g., if the TAT is running. The wireless device may determine that the validation of the timing advance value for transmission is not at least based on the TAT, e.g., if the value of the TAT is not configured (e.g., the RRC message(s) does not comprise the value of the TAT).

A wireless device may perform an SDT, followed by one or more subsequent transmissions in a Non-RRC_CONNECTED state. The one or more subsequent transmissions may comprise at least one uplink transmission. The one or more subsequent transmissions may comprise at least one downlink reception. For example, an SDT and one or more subsequent transmissions may be grouped together. For example, a group of transmission(s) may comprise the SDT and/or the one or more subsequent transmission. The SDT may be an initial uplink transmission of the group.

One or more subsequent transmissions may be one or more transmissions subsequent to and/or associated with an SDT. For example, the wireless device may transmit an uplink data (e.g., perform the SDT) via one or more radio resource(s) in a Non-RRC_CONNECTED state. The wireless device may monitor, based on transmitting the uplink data, a PDCCH during a time window. The wireless device may receive, during the time window, DCI that schedules the one or more subsequent transmissions.

In an example, the wireless device may transmit an uplink data (e.g., perform the SDT) via one or more radio resource(s) in a Non-RRC_CONNECTED state. The wireless device may monitor a PDCCH for a response to the uplink data. For example, the wireless device may monitor, for the response, the PDCCH during a time window. The wireless device may start the time window, e.g., after or in response to transmitting the uplink data. The wireless device may receive DCI via the PDCCH during the time window. The DCI may be a response (e.g., ACK or NACK HARQ feedback) to the transmitting the uplink data. The DCI may comprise an uplink grant (e.g., a dynamic grant) that schedules a first subsequent transmission (e.g., downlink or uplink transmission) of the one or more subsequent transmissions. For example, the first subsequent transmission is a new uplink transmission. For example, the first subsequent transmission is a new downlink reception. For example, the first subsequent transmission may be a retransmission of the uplink data.

In an example, the wireless device may monitor, using one or more RNTIs and during the time window, the PDCCH for the response to the transmission of the uplink data. The one or more RNTIs may comprise a C-RNTI of the wireless device. The one or more RNTIs may comprise an RNTI (e.g., CS-RNTI, PUR-RNTI, PUR C-RNTI, SDT-RNTI, and/or the like) assigned for the SDT. In the present disclosure, the RNTI assigned for the SDT may be referred to as an SDT-RNTI.

The wireless device may receive (and/or detect), via the PDCCH, the DCI during the time window. The DCI may comprise CRC parity bits scrambled with the C-RNTI. The DCI comprising CRC parity bits scrambled with the C-RNTI may comprise a dynamic grant, e.g., dynamic uplink grant scheduling PUSCH and/or dynamic downlink assignment scheduling PDSCH. The DCI whose CRC parity bits scrambled with the C-RNTI may comprise an uplink grant that schedules a new UL transmission, e.g., in the Non-RRC_CONNECTED state. The DCI whose CRC parity bits scrambled with the C-RNTI may comprise a downlink assignment that schedules a new DL transmission, e.g., in the Non-RRC_CONNECTED state.

The wireless device may receive (and/or detect), via the PDCCH, the DCI during the time window. The DCI may comprise CRC parity bits scrambled with the SDT-RNTI. The DCI whose CRC parity bits scrambled with the SDT-RNTI may comprise an uplink grant that schedules a retransmission of the uplink data (and/or SDT), e.g., in the Non-RRC_CONNECTED state.

In an example, the wireless device may (re-)start the time window after or in response to receiving the DCI. For example, the DCI may comprise a UL grant of a retransmission of the uplink data, a UL grant of new UL transmission, and/or a DL assignment of a new DL transmission. The wireless device may monitor, using at least one RNTI (e.g., C-RNTI and/or SDT-RNTI) and during the (re)started time window, the PDCCH. The wireless device may receive a second DCI during the (re-)started time window via the PDCCH. The second DCI has CRC parity bits scrambled with the SDT-RNTI and/or C-RNTI. The second DCI may comprise a UL grant of a retransmission of the uplink data, a UL grant of new UL transmission, and/or a DL assignment of a new DL transmission. The wireless device may (re-)start the time window after or in response to receiving the second DCI and/or monitor, using the at least one RNTI (e.g., C-RNTI and/or SDT-RNTI), the PDCCH during the (re-)started time window. In this manner, the wireless device may continue one or more subsequent transmissions by (re-)starting the time window in response to receiving such DCI.

The wireless device may stop monitoring the PDCCH in response to an expiry of the time window and/or the (re-)started time window. The wireless device may stop the one or more subsequent transmissions in the Non-RRC_CONNECTED state, e.g., if the wireless device does not receive DCI during the time window and/or the (re-)started time window. For example, the one or more subsequent transmissions associated with an SDT may be one or more transmissions performed after or in response to the SDT (e.g., the first initial transmission) and before an expiry of the time window (re-)started after or in response to the SDT. The wireless device may stop monitoring, using one or more RNTIs, the PDCCH in response to an expiry of the time window and/or the (re-)started time window. The one or more RNTIs may comprise a C-RNTI of the wireless device and/or RNTI(s) (e.g., CS-RNTI, PUR-RNTI, PUR C-RNTI, SDT-RNTI, and/or the like) assigned for the SDT.

Figure 20:
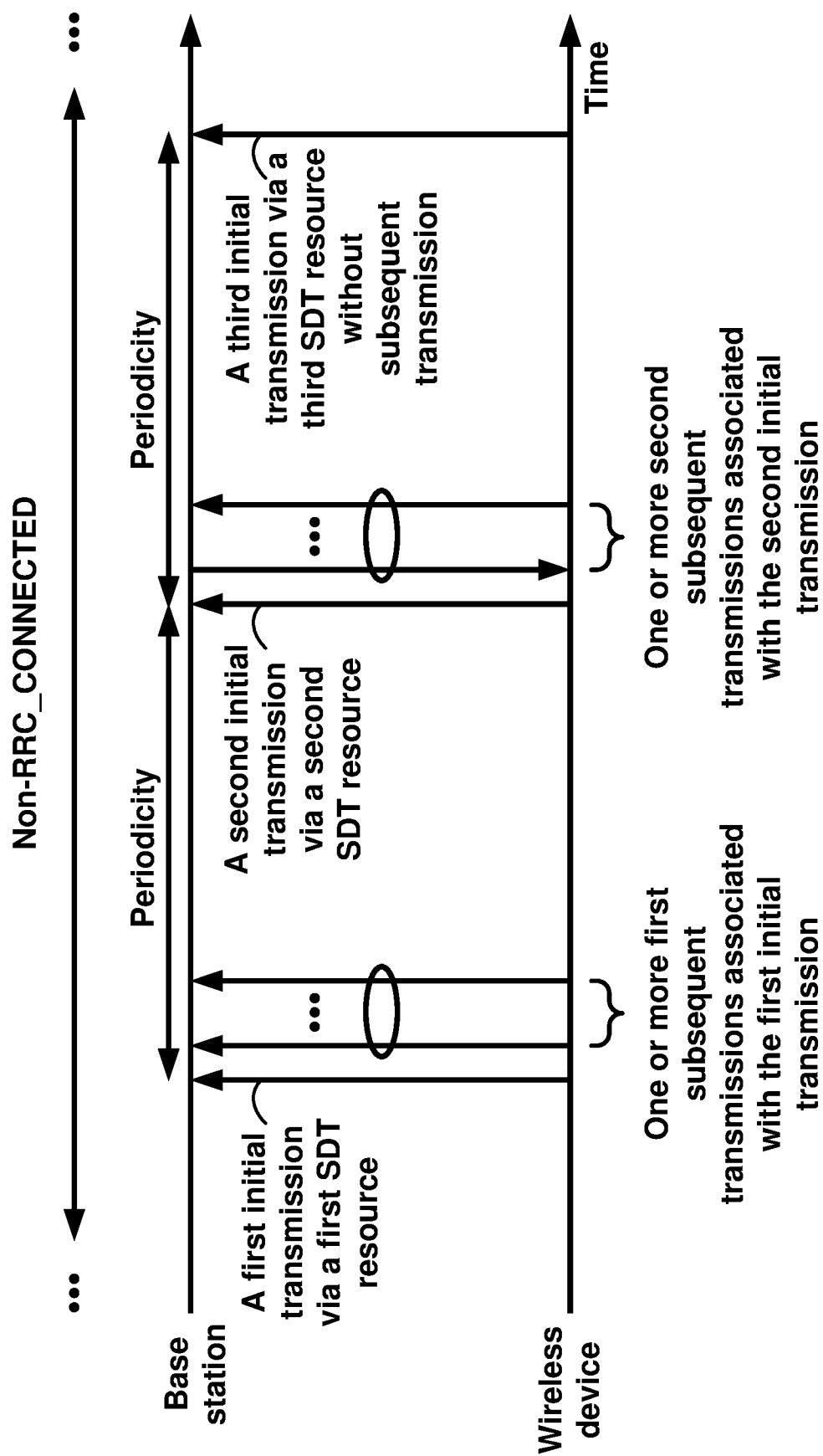
FIG. 20 is an example of one or more subsequent transmissions of an SDT as per an aspect of an embodiment of the present disclosure.

FIG. 20 is an example of one or more subsequent transmissions of an SDT as per an aspect of an embodiment of the present disclosure. A wireless device may receive a message (e.g., an RRC release message) comprising and/or indicating configuration parameters of an SDT. The configuration parameters may indicate uplink grant(s) and/or one or more uplink radio resource(s) of the uplink grant(s) for the SDT. For example, the one or more uplink radio resource(s) may comprise a first SDT resource, a second SDT resource, and/or a third SDT resource in FIG. 20. The wireless device may transmit an uplink data via one of the one or more uplink radio resource(s). The wireless device may skip a transmission via one of the one or more uplink radio resource(s), e.g., if there is no uplink data in a buffer of the wireless device. The one or more uplink radio resource(s) may be a periodic resource with a periodicity as shown in FIG. 20. The wireless device may perform one or more subsequent transmissions after or in response to an SDT. For example, the SDT and the one or more subsequent transmissions may be grouped together. For example, in FIG. 20, the wireless device may determine a first SDT resource, a second SDT resource, and a third SDT resource. The wireless device may perform a first initial transmission (e.g., an SDT) via the first SDT resource. The wireless device may start a time window in response to the first initial transmission. The wireless device may receive, via a PDCCH, one or more DCIs that schedule one or more first subsequent transmissions. For example, the wireless device may perform and/or continue the one or more first subsequent transmissions during a time interval. The time interval may be a value (e.g., length) of the time window that the wireless device runs. The wireless device may extend the time interval by (re-)starting the time window. The wireless device may the (re-) started time window one or more times in response to receiving DCI via the PDCCH and/or transmitting uplink data during the time window. The wireless device may stop monitoring the PDCCH in response to an expiry of the time window (or the (re-)started time window). The one or more subsequent transmissions may comprise at least one uplink transmission (e.g., the one or more first subsequent transmission in FIG. 20). The one or more subsequent transmissions may comprise at least one downlink reception (e.g., the one or more second subsequent transmission in FIG. 20). The wireless device may not perform one or more subsequent transmissions (e.g., the third initial transmission in FIG. 20).

A wireless device may maintain a time window for an SDT and/or one or more subsequent transmissions of an SDT. The wireless device may receive, from a base station, a message comprising a value (e.g., length) of the time window. The value may indicate a time period (or interval) that the wireless device performs (e.g., is allowed to perform) an SDT and/or one or more subsequent transmissions of an SDT. The value may indicate a time period (or interval) that the wireless device monitors (e.g., is allowed to monitor) a PDCCH to receive one or more UL and/or DL grants for new UL and/or new DL transmissions and/or retransmission(s) of the SDT and/or the one or more subsequent transmissions of the SDT. The wireless device may receive one or more DCIs via the PDCCH. The one or more DCIs may comprise the one or more UL and/or DL grants. The wireless device may not (re-)start the time window in response to receiving a grant (e.g., UL grant and/or DL grant) the one or more DCIs. The wireless device may not (re-)start the time window in response to performing a transmission scheduled by a grant (e.g., UL grant and/or DL grant) of the one or more UL and/or DL grants for the SDT and/or the one or more subsequent transmissions of the SDT. The wireless device may stop monitoring the PDCCH in response to an expiry of the time window. The wireless device may stop performing the SDT and/or the one or more subsequent transmissions of the SDT in response to an expiry of the time window.

Figure 21A:
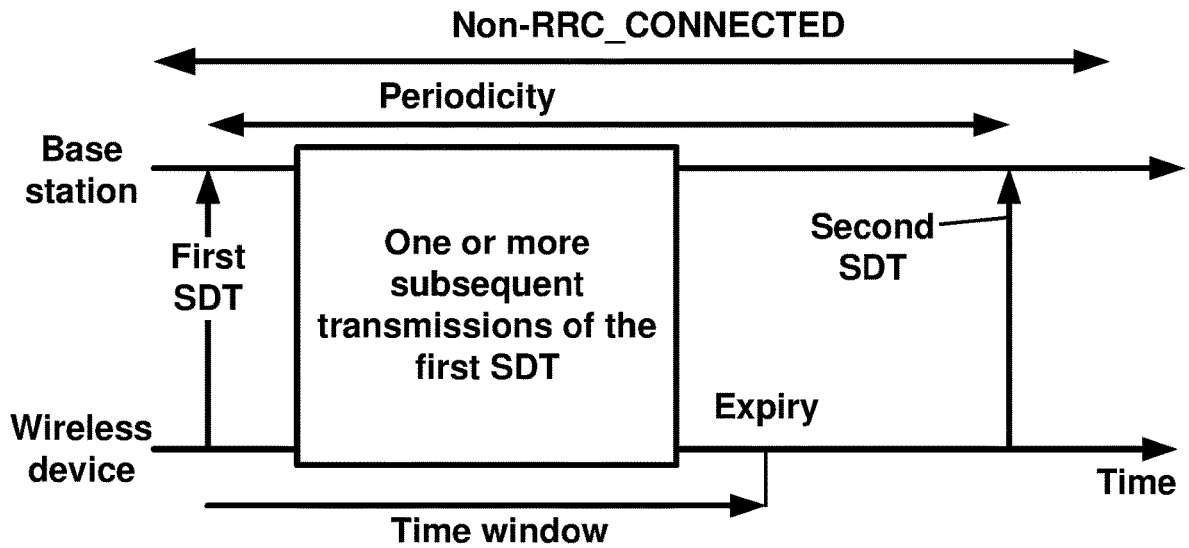
FIG. 21A is an example of a time window management of one or more subsequent transmissions of an SDT as per an aspect of an embodiment of the present disclosure.

FIG. 21A is an example of a time window management of one or more subsequent transmissions of an SDT as per an aspect of an embodiment of the present disclosure. A wireless device may receive a message (e.g., an RRC release message) comprising and/or indicating configuration parameters of an SDT. The configuration parameters may indicate uplink grant(s) and/or one or more uplink radio resource(s) of the uplink grant(s) for the SDT. In FIG. 21A, a first SDT and a second SDT are the transmissions via the uplink grant(s) and/or the one or more uplink radio resource(s) with a periodicity. The wireless device may start a time window in response to transmitting, via the uplink grant(s) and/or the one or more uplink radio resource(s), uplink data. For example, the wireless device may start a time window in response to performing the first SDT in FIG. 21A. The message may comprise a value of the time window. The wireless device may monitor a PDCCH during the time window with one or more RNTIs. The one or more RNTIs may be predefined and/or configured by a base station (e.g., indicated by one or more RRC message that may comprise the message) for the PDCCH monitoring for the SDT and/or for a Non-RRC_CONNECTED. For example, the one or more RNTIs may comprise C-RNTI. The one or more RNTIs may comprise SDT-RNTI. The one or more RNTIs may comprise P-RNTI (e.g., RNTI for a paging message). During the time window, the wireless device may receive, via the PDCCH, one or more DCIs. The one or more DCIs may comprise UL grant(s) that schedule new UL transmission(s). The one or more DCIs may comprise UL grant(s) that schedule UL (re-)transmissions. The one or more DCIs may comprise DL grant(s) that schedule new DL transmissions. The one or more DCIs may comprise DL grant(s) that schedule DL (re-)transmissions. The wireless device may keep running the time window, independent of receiving the one or more DCIs and/or independent of performing UL and/or DL new transmission(s) and/or (re-)transmissions. For example, the wireless device may not stop or may not (re-)start the time window in response to receiving the one or more DCIs and/or in response to performing UL and/or DL new transmission(s) and/or (re-)transmissions. The wireless device may continue to monitor (and/or keep monitoring) the PDCCH until the time window expires. The wireless device may stop to monitor the PDCCH in response to an expiry of the time window.

A wireless device may maintain a time window for an SDT and/or one or more subsequent transmissions of an SDT. The wireless device may receive, from a base station, a message comprising a value (e.g., length) of the time window. The value may indicate a time period (or interval) that the wireless device performs (e.g., is allowed to perform) an SDT and/or one or more subsequent transmissions of an SDT. The value may indicate a time period (or interval) that the wireless device monitors (e.g., is allowed to monitor) a PDCCH to receive one or more UL and/or DL grants for a new UL and/or DL transmissions and/or retransmission of the SDT and/or the one or more subsequent transmissions of the SDT. The wireless device may receive one or more DCIs via the PDCCH. The one or more DCIs may comprise the one or more UL and/or DL grants. The wireless device may (re-)start the time window in response to receiving a grant (e.g., UL grant and/or DL grant) of the one or more DCIs. The wireless device may (re-)start the time window in response to performing a transmission scheduled by a grant (e.g., UL grant and/or DL grant) for the SDT and/or the one or more subsequent transmissions of the SDT. The wireless device may stop monitoring the PDCCH in response to an expiry of the time window. The wireless device may stop performing the SDT and/or the one or more subsequent transmissions of the SDT in response to an expiry of the time window.

Figure 21B:
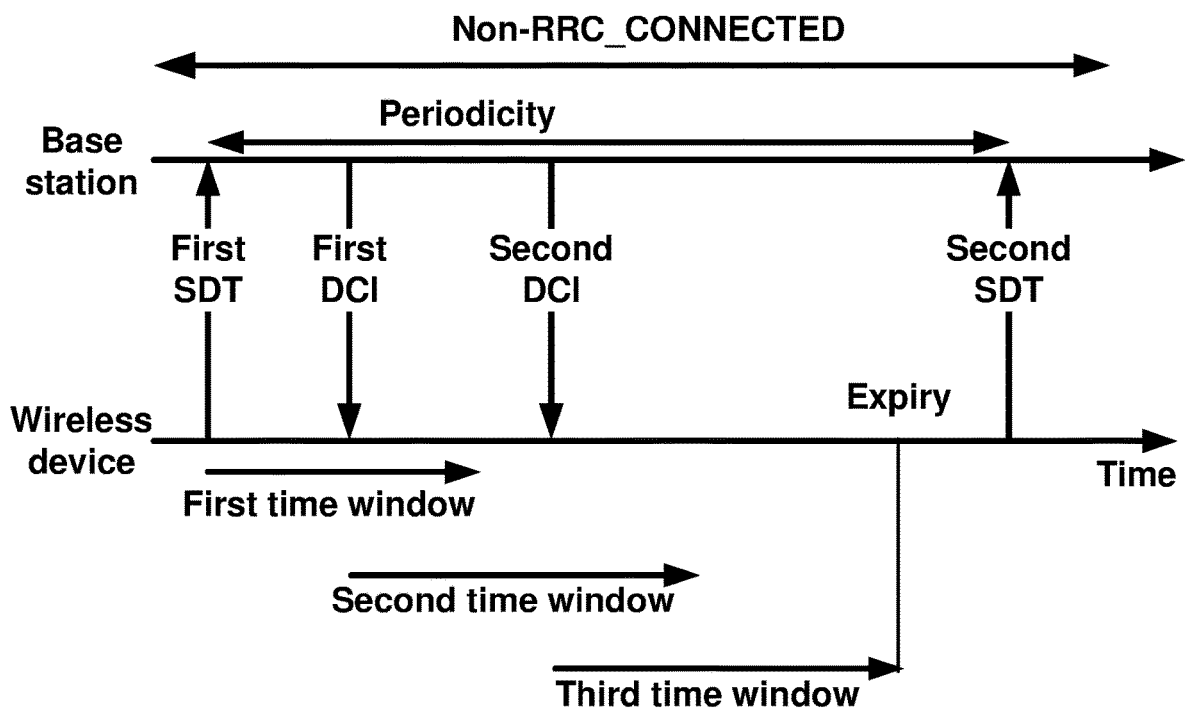
FIG. 21B is an example of a time window management of one or more subsequent transmissions of an SDT as per an aspect of an embodiment of the present disclosure.

FIG. 21B is an example of a time window management of one or more subsequent transmissions of an SDT as per an aspect of an embodiment of the present disclosure. A wireless device may receive a message (e.g., an RRC release message) comprising and/or indicating configuration parameters of an SDT. The configuration parameters may indicate uplink grant(s) and/or one or more uplink radio resource(s)

of the uplink grant(s) for the SDT. In FIG. 21B, a first SDT and a second SDT are the transmissions via the uplink grant(s) and/or the one or more uplink radio resource(s) with a periodicity. The wireless device may start a time window in response to transmitting, via the uplink grant(s) and/or the one or more uplink radio resource(s), uplink data. For example, the wireless device may start a first time window in response to performing the first SDT in FIG. 21B. The message may comprise a value of the first time window. The wireless device may monitor a PDCCH during the first time window with one or more RNTIs. The one or more RNTIs may be predefined and/or configured by a base station (e.g., indicated by one or more RRC message that may comprise the message) for the PDCCH monitoring for the SDT and/or for a Non-RRC_CONNECTED. For example, the one or more RNTIs may comprise C-RNTI. The one or more RNTIs may comprise SDT-RNTI. The one or more RNTIs may comprise P-RNTI (e.g., RNTI for a paging message). During the first time window, the wireless device may receive, via the PDCCH, first DCI. The first DCI may comprise UL grant(s) that schedule new UL transmission(s). The first DCI may comprise UL grant(s) that schedule UL (re-)transmissions of the first SDT. The first DCI may comprise DL grant(s) that schedule new DL transmissions. The wireless device may start a second time window in response to receiving the first DCI and/or in response to performing a UL or DL transmission scheduled by the first DCI. The second time window may have a same length to the first time window. For example, the wireless device may (re-)start the first time window as the second time window in response to receiving the first DCI and/or in response to performing a UL or DL transmission scheduled by the first DCI. The wireless device may monitor, during the second time window, the PDCCH with the one or more RNTIs. The wireless device may start a new time window and/or (re-)start the first time window in response to receiving DCI and/or in response to performing a transmission scheduled by the DCI. In FIG. 21B, the wireless device may start a third time window in response to receiving second DCI during the second time window and/or in response to performing a UL or DL transmission scheduled by the second DCI. The third time window may be the first time window that the wireless device (re-)starts in response to receiving second DCI during the second time window and/or in response to performing a UL or DL transmission scheduled by the second DCI. The wireless device may keep monitoring the PDCCH while a time window (e.g., the first time window, the second time window, and/or the third time window) started for the SDT and/or its associated subsequent transmission(s) is running. If the time window expires, the wireless device may stop monitoring the PDCCH with the one or more RNTIs. For example, in FIG. 21B, the wireless device may stop monitoring the PDCCH if the wireless device has not received DCI (e.g., introduced based on the one or more RNTIs) and/or if the third time window expires.

A wireless device may determine a transmit power of an SDT. The wireless device may determine a transmit power of one or more subsequent transmissions of the SDT. The one or more subsequent transmission may comprise an uplink transmission via PUSCH (or PUCCH or SRS) via a transmission occasion i. The transmit power may comprise one or more received target powers and one or more power offset values. The wireless device may determine one or more power offset values based on transmission parameters (e.g., MCS, and/or bandwidth of resource assignment of the uplink transmission), one or more measured values (e.g., a DL pathloss estimate), and/or one or more transmit power control (TPC) command values. The one or more received target powers and/or the one or more power offset values may be cell-specific (e.g., denoted by a subscription c in the formula), uplink carrier-specific (e.g., denoted by a subscription f in the formula; f=first value indicates an SUL and f=second value indicates an NUL), and/or BWP-specific (e.g., denoted by a subscription b in the formula). For example, the wireless device may use the one or more power offset values such that a base station receives uplink data via the uplink transmission with a received target power required to decode the uplink data successfully. The received target power may comprise the one or more received target powers.

A wireless device may receive one or more TPC command values. The wireless device may accumulate the one or more TPC command values for an uplink transmission via transmission occasion i. The wireless device may apply the one or more TPC command values via an accumulation. For example, the wireless device may use the accumulated one or more TPC command values to determine a transmit power for an uplink transmission (e.g., via PUSCH, PUCCH, and/or SRS). For example, the one or more TPC command values may comprise one or more first TPC command values and one or more second TPC command values. The one or more first TPC command values may be the ones applied to transmission occasions i−1. The one or more second TPC command values may comprise the ones that the wireless device receives between the transmission occasions i and the transmission occasions i−1. For example, the one or more second TPC command values may comprise the ones that the wireless device receives between a first DCI scheduling the transmission occasions i and a second DCI scheduling the transmission occasions i−1. For example, the one or more second TPC command values may comprise TPC command values that the wireless device receives after the transmission occasions i−1 with a time offset (e.g., a value of the time offset may be positive and/or negative). For example, the one or more second TPC command values may comprise TPC command values that the wireless device receives before the wireless device receives the first DCI scheduling the transmission occasions i. For example, the one or more second TPC command values may comprise a TPC command indicated by the first DCI. For example, the one or more second TPC command values may comprise TPC command values that the wireless device receives after receiving the second DCI scheduling the transmission occasions i−1. For example, the one or more second TPC command values may not comprise a TPC command indicated by the second DCI.

A wireless device may receive a message comprising an indicator (e.g., an example parameter may be tpc-accumulation) indicating how to accumulate one or more TPC command values. For example, the indicator may indicate whether the wireless device determines a transmit power of uplink transmission via transmission occasions i based on one or more first TPC command values received before the transmission occasions i (e.g., based on one or more TPC command values received before DCI scheduling the transmission occasions i and/or a TPC command value of the DCI) or not. For example, if the indicator indicates that the TPC accumulation is enabled, the wireless device may determine the transmit power based on one or more first TPC command values applied to transmission occasions i−1 and/or one or more second TPC command values received between the transmission occasions i and the transmission occasions i−1. If the indicator indicates that the TPC accumulation is disabled, the wireless device may determine the transmit power based on a TPC command value of DCI that schedules the uplink transmission via transmission occasions i. If the indicator indicates that the TPC accumulation is disabled, the wireless device may determine the transmit power without any TPC command value. For example, if the indicator indicates that the TPC accumulation is disabled, the wireless device may reset an accumulation parameters value of the transmit power to a predefined value, e.g., zero. The indicator may indicate, by a presence or absence of the indicator in the message, whether the TPC accumulation is enabled or disabled. For example, the TPC accumulation is enabled if the indicator is present in the message, and the TPC accumulation is disabled if the indicator is absent in the message (or vice versa).

In an example, a transmit power control with an TPC accumulation enabled may be referred to as a closed-loop power control. In an example, a transmit power control with an TPC accumulation disabled may be referred to as an open-loop power control. In an example, an TPC accumulation may be referred to as a closed-loop power control parameter. An accumulated value based on the TPC accumulation may be referred to as a power control adjustment value. a value of the closed-loop power control parameter may be referred to as a power control adjustment value.

A wireless device may receive a message comprising configuration parameters indicating one or more uplink grant(s) and/or one or more uplink radio resources used for an SDT in a Non-RRC_CONNECTED state. The configuration parameters may indicate that an uplink grant of the one or more uplink grant(s) (re-)occurs (e.g., sequentially) in a symbol of a slot with a periodicity. For example, the periodicity may be configured and/or defined in terms of a number of symbols, a number of slots, a number of subframe, a number of frame, and/or the like. The length of the periodicity may be minute(s), hour(s), and/or day(s). For example, the periodicity may depend on how often uplink transmission event occurs. For example, a sensing periodicity of a sensor device and/or a reporting periodicity of sensed data may determine the periodicity.

A TPC accumulation may be beneficial for transmission occasions i, e.g., if wireless environments between the transmission occasions i and transmission occasions i–1 are substantially similar. If wireless environments between the transmission occasions i and the transmission occasions i–1 change, it may be beneficial to disable the TPC accumulation for the transmission occasions i. In an RRC_CONNECTED state, a time interval between two transmission occasions may be short enough to enable the TPC accumulation. In an Non-RRC_CONNECTED state, a time interval between two transmission occasions may be long enough to disable the TPC accumulation.

In existing technologies, a wireless device may disable the TPC accumulation for one or more transmissions in the Non-RRC_CONNECTED state. For example, the one or more transmissions may occur with a periodicity that two transmission of the one or more transmissions experience different wireless environments.

In existing technologies, the TPC accumulation may be configured for one or more uplink transmissions scheduled after the wireless device receive a message comprising an indicator of the TPC accumulation. For example, if the indicator indicates whether the TPC accumulation is disabled, the wireless device may not apply the TPC accumulation to the one or more uplink transmissions (e.g., all of the one or more uplink transmissions). For example, if the indicator indicates whether the TPC accumulation is enabled, the wireless device may apply the TPC accumulation to the one or more uplink transmissions (e.g., the one or more uplink transmissions).

A problem arises when a wireless device performs an SDT and/or its associated one or more subsequent transmissions to accommodate a burst of data traffic in a Non-RRC_CONNECTED state. For example, a periodicity of SDT grant(s) and/or SDT resource(s) may be configured to accommodate between two bursts of data traffic. For example, wireless environments between the two bursts may change. For example, the wireless device may perform an SDT and/or its associated one or more subsequent transmissions to accommodate data traffic within a burst. For example, the SDT and/or its associated one or more subsequent transmissions may occur during a time interval shorter than the periodicity of SDT grant(s) and/or SDT resource(s). For example, wireless environments between two transmissions within a burst may be substantially similar. In existing technologies, the wireless device may apply the TPC accumulation, that is applied to uplink transmissions between two bursts, to uplink transmission(s) within a burst. For example, if the TPC accumulation is disabled, the wireless device may not apply the TPC accumulation to first uplink transmissions between two bursts and second uplink transmissions within a burst. For example, if the TPC accumulation is enabled, the wireless device may apply the TPC accumulation to first uplink transmissions between two bursts and second uplink transmissions within a burst. The TPC accumulation in existing technologies may be beneficial for (e.g., may improve a performance of) either transmissions between two bursts or transmissions in a burst. For example, enabled TPC accumulation may be beneficial for transmissions in a burst but may degrade a performance in transmissions between two bursts. For example, disabled TPC accumulation may be beneficial for transmissions between bursts but may degrade a performance in transmissions within a burst. The performance degradation may result in retransmission and/or a failure of the uplink transmission. The performance degradation may result in higher better power consumption to compensate a loss in a transmit power. There is a need to enhance the TPC accumulation in the Non-RRC_CONNECTED state based on traffic type of transmissions.

In example embodiment(s), a wireless device may enable a TPC accumulation for a group of uplink transmissions in a Non-RRC_CONNECTED. The group of uplink transmission(s) may be a burst of uplink data. The uplink transmission(s) may comprise one or more transmissions via PUSCH, PUCCH, and/or SRS. The wireless device may accumulate one or more TPC command values for an SDT and/or its associated one or more subsequent transmission. The wireless device may reset the accumulation between two SDTs. The enhanced TPC accumulation in example embodiments of the present disclosure may improve a performance of both transmissions between two bursts and transmissions in a burst. The improve performance may result in less batter power consumption and/or decreasing a number of retransmission, e.g., caused by inaccurate power control parameter value(s)

In example embodiments of the present disclosure, a group of uplink transmission(s) and/or a burst of uplink transmission(s) may comprise at least one SDT and/or one or more subsequent transmissions associated with the at least one SDT. For example, an SDT and/or one or more subsequent transmissions associated with the one SDT may be referred to as a group of transmission(s). The wireless device may determine that the one or more subsequent transmissions are associated with the at least one SDT, e.g., if the one or more subsequent transmissions are scheduled by one or more grants (DL grant and/or UL grant) received during a time window (re-)started in response to the at least one SDT. The one or more grants (DL grant and/or UL grant) may comprise a dynamic grant (DL grant and/or UL grant) indicated by DCI that the wireless device receives during the time window.

Figure 22:
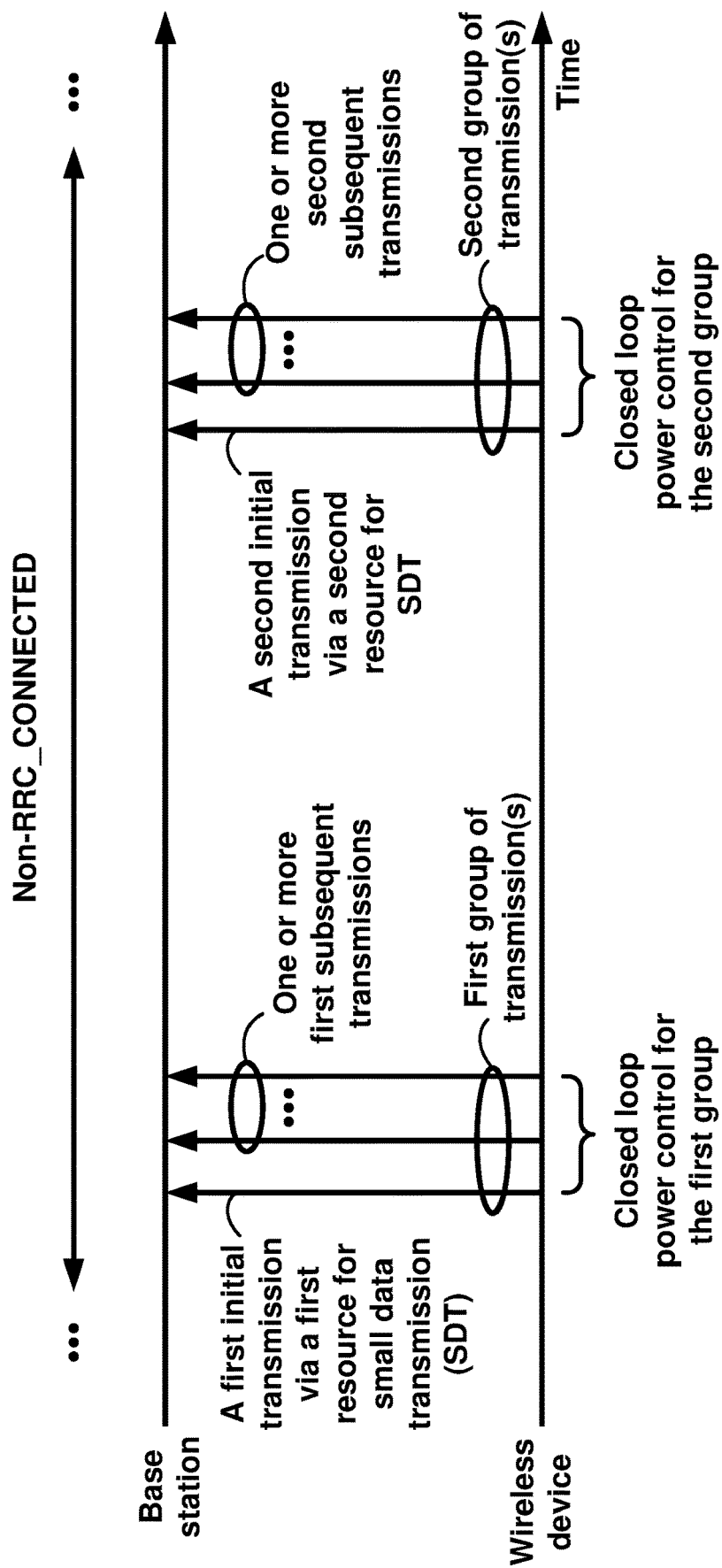
FIG. 22 is an example of one or more group transmissions in a Non-RRC_CONNECTED state as per an aspect of an embodiment of the present disclosure.

FIG. 22 is an example of one or more group transmissions in a Non-RRC_CONNECTED state as per an aspect of an embodiment of the present disclosure. A wireless device may receive a message (e.g., an RRC release message) comprising and/or indicating configuration parameters of one or more SDTs. The configuration parameters may indicate uplink grant(s) and/or one or more uplink radio resource(s) of the uplink grant(s) for the one or more SDTs. The one or more SDTs may comprise a first initial transmission via a first resource of the one or more uplink radio resource(s). The wireless device may perform one or more first subsequent transmissions associated with the first initial transmissions. The one or more first subsequent transmissions may be associated with the first initial transmission, e.g., if one or more DCIs scheduling the one or more first subsequent transmissions are received by the wireless device during one or more time windows (re-)starting based on the first initial transmission. the first initial transmission and the one or more first subsequent transmission may form a first group of transmission(s). The wireless device may apply the TPC accumulation to the one or more transmissions in a same group. For example, the wireless device may reset a TPC accumulation value (e.g., a closed loop power control parameter) of the first initial transmission to zero. The wireless device may determine a TPC accumulation value (e.g., a closed loop power control parameter) of a firstly scheduled transmission of the one or more first subsequent transmissions as a sum of the TPC accumulation value of the first initial transmission and the TPC command value indicated by DCI scheduling the firstly scheduled transmission. The wireless device may determine a TPC accumulation value of a secondly scheduled transmission of the one or more first subsequent transmissions as a sum of the TPC accumulation value of the firstly scheduled transmission and the TPC command value indicated by DCI scheduling the secondly scheduled transmission, and so on. The wireless device may reset the TPC accumulation for a second initial transmission via a second resource of the one or more uplink radio resource(s). The wireless device may perform a second group of transmission(s) that comprises the second initial transmission and/or one or more second subsequent transmissions. The wireless device may determine a TPC accumulation value of a firstly scheduled transmission of the one or more second subsequent transmissions as a sum of the TPC accumulation value of the second initial transmission and the TPC command value indicated by DCI scheduling the firstly scheduled transmission of the one or more second subsequent transmissions. The wireless device may determine a TPC accumulation value of a secondly scheduled transmission of the one or more second subsequent transmissions as a sum of the TPC accumulation value of the firstly scheduled transmission of the one or more second subsequent transmissions and the TPC command value indicated by DCI scheduling the secondly scheduled transmission of the one or more second subsequent transmissions, and so on.

In an example, a wireless device may receive a message (e.g., an RRC release message) comprising and/or indicating configuration parameters of one or more SDTs. The configuration parameters may indicate uplink grant(s) and/or one or more uplink radio resource(s) of the uplink grant(s) for the one or more SDTs. The uplink grant(s) may be periodic uplink grant(s) with a periodicity. For example, the one or more uplink radio resource(s) may comprise a first SDT resource of a first SDT, a second SDT resource of a second SDT, a third SDT resource of a third SDT, and so on. The wireless device may perform the first SDT via the first SDT resource. The wireless device may determine a transmit power of the first SDT. The wireless device may reset a TPC accumulation parameter value of the transmit power to a predefined value (e.g., zero). The wireless device may reset a TPC accumulation parameter value of the transmit power to a predefined value (e.g., zero) in response to the first SDT being based on one of the uplink grant(s). The wireless device may start a time window in response to the first SDT. The wireless device may maintain the time window, e.g., until the time window expires (e.g., as illustrated in FIG. 21A). The wireless device may (re-)start one or more time windows (e.g., as illustrated in FIG. 21B) in response to receiving one or more grants for one or more subsequent transmissions of the SDT. The wireless device may (re-)start one or more time windows (e.g., as illustrated in FIG. 21B) in response to performing one or more subsequent transmissions of the SDT. The wireless device may apply (e.g., enable) a TPC accumulation to the one or more subsequent transmissions of the SDT. For example, the wireless device may receive a first grant scheduling a first subsequent transmission during a time window (re-) starting in response to the first SDT. The wireless device may determine a first transmit power of the first subsequent transmission. The wireless device may determine a TPC accumulation value of the first transmit power based on a TPC command value indicated by the first grant. For example, the wireless device may receive a second grant scheduling a second subsequent transmission during a time window starting in response to the first SDT, (re-)starting in response to receiving the second grant, and/or (re-)starting in response to performing the second subsequent transmission. The wireless device may determine a second transmit power of the second subsequent transmission. The wireless device may determine a TPC accumulation value of the second transmit power based on a TPC command value indicated by the first grant and/or a TPC command value indicated by the second grant. The wireless device may determine a TPC accumulation value of the second transmit power based on a TPC accumulation value of the first transmit power and and/or a TPC command value indicated by the second grant. The wireless device may keep applying the TPC accumulation to one or more subsequent transmissions performing based on one or more DCIs received during the time window starting in response to the SDT and/or (re-)starting in response to one or more subsequent transmissions of the SDT. The wireless device may perform a second SDT. The wireless device may determine a transmit power of the second SDT. The wireless device may determine a TPC accumulation value of the transmit power of the second SDT. The wireless device may reset the TPC accumulation value of the transmit power of the second SDT to the predefined value (e.g., zero) in response to the second SDT being based on one of the uplink grant(s).

In an example, a wireless device may determine, based on a type of grant, whether to apply (e.g., enable) a TPC accumulation of a transmit power. For example, the wireless device may not apply the TPC accumulation of a transmit power, e.g., if the transmit power is for uplink transmission scheduled by a configured grant (e.g., two-step RA-based SDT in FIG. 18B and/or CG based SDT in FIG. 19A and/or in FIG. 19B). For example, the wireless device may apply the TPC accumulation of a transmit power, e.g., if the transmit power is for uplink transmission scheduled by a dynamic grant. For example, the dynamic grant may comprise an uplink grant of DCI received during a time window (re-)starting in response to an SDT. For example, the dynamic grant may comprise a downlink grant of DCI that schedules PUCCH and/or that the wireless receives during a time window (re-)starting in response to an SDT. For example, the dynamic grant may comprise DCI that triggers an SRS and/or that the wireless device receives during a time window (re-)starting in response to an SDT.

In an example, a wireless device may determine, based on whether a grant is received during a time window associated with an SDT, to apply (e.g., enable) a TPC accumulation of a transmit power. For example, the wireless device may apply the TPC accumulation of a transmit power, e.g., if the transmit power is for uplink transmission scheduled by a grant that the wireless device receives during a time window. The time window may be the one that wireless device starts in response to the SDT, e.g., as illustrated in FIG. 21A. The time window may be the one that wireless device starts in response to the SDT and/or restarts in response to receiving one or more grants scheduling one or more subsequent transmissions of the SDT, e.g., as illustrated in FIG. 21B. For example, the wireless device may not apply the TPC accumulation of a transmit power, e.g., if the transmit power is for uplink transmission scheduled by a grant that the wireless device receives outside the time window. For example, the grant may be one of uplink grant(s) for the one or more SDTs. For example, the wireless device may receive the grant from a message (e.g., an RRC release message) that the wireless device receives and/or that comprises configuration parameters indicate the uplink grant(s) and/or one or more uplink radio resource(s) of the uplink grant(s) for the one or more SDTs.

In an example, a wireless device may maintain a TPC accumulation per a type of a channel (e.g., PUSCH, PUCCH, and/or SRS). For example, a TPC accumulation for PUSCH may comprise one or more TPC command values that the wireless device received for PUSCH. For example, a TPC accumulation for PUSCH may comprise one or more TPC command values of one or more DCIs scheduling one or more PUSCHs. For example, a TPC accumulation for PUCCH may comprise one or more TPC command values that the wireless device received for PUCCH. For example, a TPC accumulation for PUCCH may comprise one or more TPC command values of one or more DCIs scheduling one or more PUCCHs. For example, a TPC accumulation for SRS may comprise one or more TPC command values that the wireless device received for SRS. For example, a TPC accumulation for SRS may comprise one or more TPC command values of one or more DCIs scheduling one or more SRS.

In an example, a wireless device may receive an indication indicating whether a TPC accumulation is enabled or not. The wireless device may receive the indication in an RRC message. The indication may indicate whether a TPC accumulation is enabled or not for an RRC_CONNECTED state. The indication may indicate whether a TPC accumulation is enabled or not for the RRC_CONNECTED state, e.g., if the wireless device receives the indication during the RRC_CONNECTED state. The wireless device may apply the TPC accumulation (enabled or disabled), indicated by the indication received in the RRC_CONNECTED state, to uplink transmission(s) in a Non-RRC_CONNECTED state, e.g., if and/or after the wireless device transitions an RRC state of the wireless device from the RRC_CONNECTED state to the Non-RRC_CONNECTED state. The wireless device may apply the TPC accumulation (enabled or disabled), indicated by the indication received in the RRC_CONNECTED state, to uplink transmission(s) in the Non-RRC_CONNECTED state, e.g., if (and/or after) the wireless device transitions an RRC state of the wireless device from the RRC_CONNECTED state to the Non-RRC_CONNECTED state and/or if the wireless device does not receive (is not provided) a second indication indicating whether a TPC accumulation is enabled or not for the Non-RRC_CONNECTED state. For example, the wireless device may use the TPC accumulation (enabled or disabled) used in the RRC_CONNECTED state for uplink transmission(s) in the Non-RRC_CONNECTED state In an example, a wireless device may receive an indication indicating whether a TPC accumulation is enabled or not. The wireless device may receive the indication in an RRC message. The indication may indicate whether a TPC accumulation is enabled or not for a Non-RRC_CONNECTED state. The indication may indicate whether a TPC accumulation is enabled or not for the Non-RRC_CONNECTED state, e.g., if the wireless device receives the indication during the Non-RRC_CONNECTED state. The wireless device may apply the TPC accumulation (enabled or disabled), indicated by the indication received in the Non-RRC_CONNECTED state, to uplink transmission(s) in an RRC_CONNECTED state, e.g., if and/or after the wireless device transitions an RRC state of the wireless device from the Non-RRC_CONNECTED state to the RRC_CONNECTED state. The wireless device may apply the TPC accumulation (enabled or disabled), indicated by the indication received in the Non-RRC_CONNECTED state, to uplink transmission(s) in the RRC_CONNECTED state, e.g., if (or after) the wireless device transitions the RRC state from the Non-RRC_CONNECTED state to the RRC_CONNECTED state and/or if the wireless device does not receive (is not provided) a second indication indicating whether a TPC accumulation is enabled or not for the RRC_CONNECTED state. For example, the wireless device may use the TPC accumulation (enabled or disabled) used in the Non-RRC_CONNECTED state for uplink transmission(s) in the RRC_CONNECTED state.

In an example, a wireless device may receive separate indications indicating a TPC accumulation for an RRC_CONNECTED sate and for a Non-RRC_CONNECTED state. For example, the wireless device may receive a first indication indicating whether a TPC accumulation is enabled or not for uplink transmission(s) in an RRC_CONNECTED state. The wireless device may receive a second indication indicating whether a TPC accumulation is enabled or not for uplink transmission(s) in a Non-RRC_CONNECTED state. The wireless device may receive the first indication in an RRC message, e.g., an RRC setup message, an RRC resume message, and/or an RRC reconfiguration message. The wireless device may receive the second indication in an RRC message, e.g., an RRC release message. The TPC accumulation indicated by first indication may be for one or more uplink transmissions in the RRC_CONNECTED state. For example, the wireless device may apply the TPC accumulation indicated by the first indication to one or more the uplink transmissions in the RRC_CONNECTED state after or in response to receiving the first indication. The TPC accumulation indicated by the second indication may be for a group of transmissions in the Non-RRC_CONNECTED state. For example, the wireless device may apply the TPC accumulation indicated by the second indication to an SDT and/or its associated one or more subsequent transmissions of the SDT. The wireless device may determine whether to reset or accumulate the TPC accumulation of a transmit power for an uplink transmission based on a type of a grant (e.g., dynamic grant or a configured grant) scheduling the uplink transmission and/or based on whether the grant is received during a time window associated with an SDT.

Figure 23:
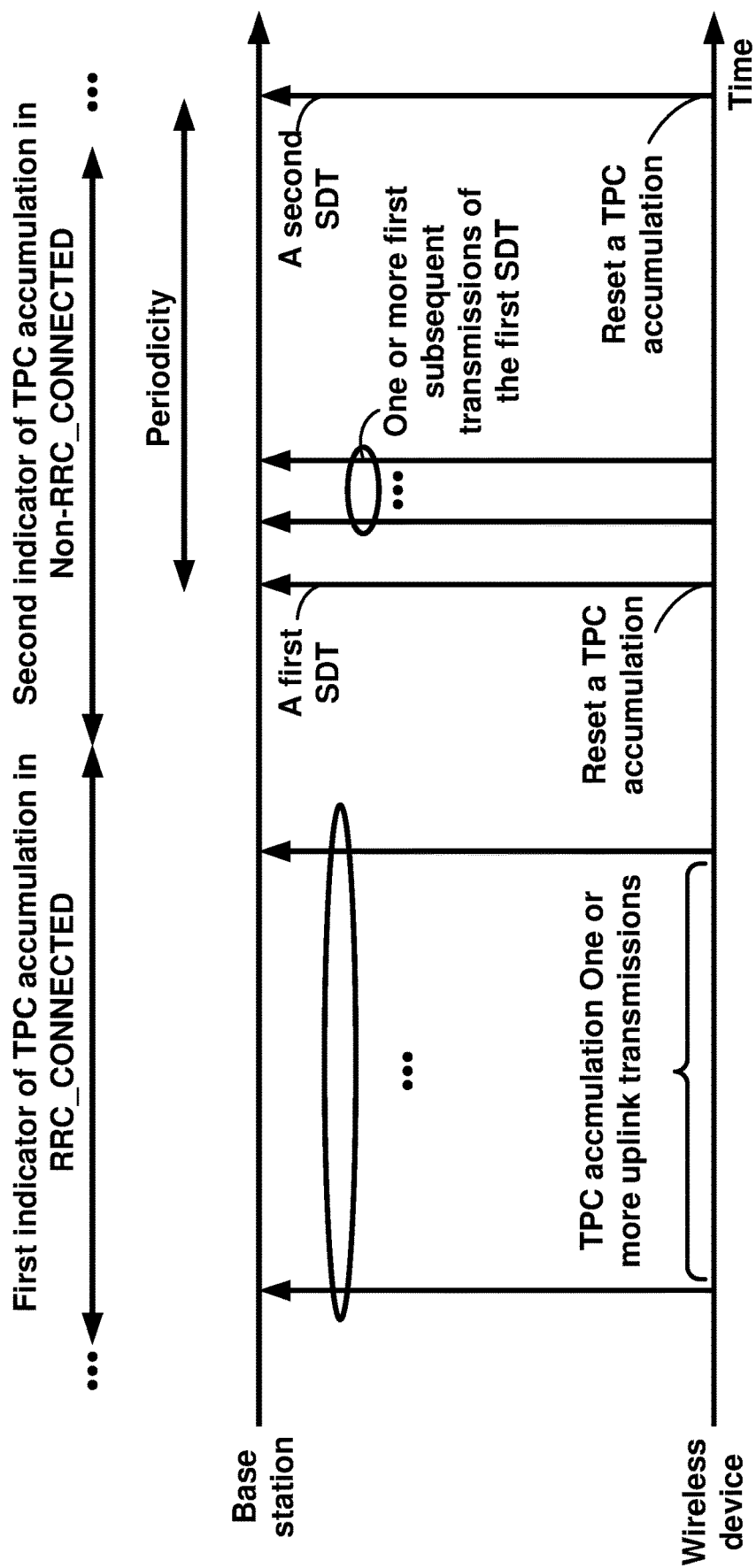
FIG. 23 is an example of TPC accumulations in a Non-RRC_CONNECTED state and in an RRC_CONNECTED state as per an aspect of an embodiment of the present disclosure.

FIG. 23 is an example of TPC accumulations in a Non-RRC_CONNECTED state and in an RRC_CONNECTED state as per an aspect of an embodiment of the present disclosure. The wireless device may receive separate indications comprising a first indication and a second indication indicating TPC accumulations for an RRC_CONNECTED sate and for a Non-RRC_CONNECTED state, respectively. The wireless device may determine a first value of a first TPC accumulation for a first transmit power of a first uplink transmission in the RRC_CONNECTED state. The first indication indicates that the wireless device determines the first TPC accumulation based on a second value of a second TPC accumulation for a second transmit power of a second uplink transmission in the RRC_CONNECTED state. For example, the second uplink transmission may occur before the first uplink transmission. For example, the first TPC accumulation may comprise (e.g., may be a sum of) the second value of a second TPC accumulation and one or more TPC command values received between the first uplink transmission and the second uplink transmission. The second TPC accumulation may comprise (e.g., may be a sum of) the third value of a third TPC accumulation and one or more TPC command values received between the second uplink transmission and the third uplink transmission, and so on. The wireless device may transition to the Non-RRC_CONNECTED state. The wireless device may use a second indicator to determine one or more TPC accumulation values in the Non-RRC_CONNECTED state. For example, the wireless device may receive configured grant(s) having a periodicity. The wireless device may perform a first SDT via a first uplink radio resource indicated by a first grant of the configured grant(s). The wireless device may reset a TPC accumulation for the first SDT to a predefined value (e.g., zero) in response to the first SDT performing based on the configured grant(s). The wireless device may start one or more time windows (e.g., as illustrated in FIG. 21A and/or in FIG. 21B). The wireless device may receive one or more grant(s) (e.g., one or more dynamic grant(s)) during the one or more time windows. The wireless device may perform one or more first subsequent transmissions via one or more radio resources indicated by the one or more grant(s). The wireless device may enable a TPC accumulation during the one or more first subsequent transmissions. The wireless device may stop monitoring a PDCCH in response to one (e.g., a time window (re-)started in the last among the one or more time windows) of the one or more time windows. expires. The wireless device may perform a second SDT via a second uplink radio resource indicated by a second grant of the configured grant(s). The wireless device may reset a TPC accumulation for the second SDT to a predefined value (e.g., zero) in response to the second SDT performing based on the configured grant(s).

In an example, an absence of the first indicator may indicate that a TPC accumulation is disabled in an RRC_CONNECTED state. The indicating state may change. For example, an absence of the first indicator may indicate that a TPC accumulation is enabled in an RRC_CONNECTED state. In an example, an absence of the second indicator may indicate that a TPC accumulation is disabled in a Non-RRC_CONNECTED state. The indicating state may change. For example, an absence of the second indicator may indicate that a TPC accumulation is enabled in a Non-RRC_CONNECTED state.

In an example, an absence of the first indicator may indicate that a TPC accumulation for an RRC_CONNECTED state follows a TPC accumulation for a Non-RRC_CONNECTED state. For example, if the TPC accumulation for a Non-RRC_CONNECTED state is enabled, the wireless device may apply the TPC accumulation to a transmit power of uplink transmission(s) for an RRC_CONNECTED state. For example, if the TPC accumulation for a Non-RRC_CONNECTED state is disabled, the wireless device may disable the TPC accumulation to a transmit power of uplink transmission(s) for an RRC_CONNECTED state.

In an example, an absence of the second indicator may indicate that a TPC accumulation for a Non-RRC_CONNECTED state follows a TPC accumulation for an RRC_CONNECTED state. For example, if the TPC accumulation for the RRC_CONNECTED state is enabled, the wireless device may apply, based on example embodiment(s) in the present disclosure, the TPC accumulation to a transmit power of one or more uplink transmission(s) for the Non-RRC_CONNECTED state. For example, if the TPC accumulation for an RRC_CONNECTED state is disabled, the wireless device may disable, based on example embodiment(s) in the present disclosure, the TPC accumulation to a transmit power of uplink transmission(s) for the Non-RRC_ CONNECTED state.

In an example, a wireless device may determine a transmit power for PUSCH in a Non-RRC_CONNECTED state. In present disclosure, $\hat{P}_{PUSCH,b,f,c}(i,j,q_d,l)$ may be a linear value of the transmit power for PUSCH, $P_{PUSCH,b,f,c}(i,j,q_d,l)$, on active UL BWP b of carrier f of serving cell c. For example, if a wireless device transmits a PUSCH on active UL BWP b of carrier f of serving cell c using parameter set configuration with index j and PUSCH power control adjustment state with index l, the wireless device may determine the PUSCH transmission power $P_{PUSCH,b,f,c}(i,j,q_d,l)$ in PUSCH transmission occasion i as $$P_{PUSCH,b,f,c}(i, j, q_d, l) = \min\left\{ \begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\} \; [dBm].$$

For example, $P_{CMAX,f,c}(i)$ may be a configured maximum output power of the wireless device for carrier f of serving cell c in PUSCH transmission occasion i. $P_{O\_PUSCH,b,f,c}(j)$ may be a parameter comprising a sum of a component $P_{O\_NOMINAL\_PUSCH,f,c}(j)$ (e.g., a received target power that may be serving cell specific) and a component $P_{O\_UE\_PUSCH,b,f,c}(j)$ (e.g., received target power that may be wireless device specific) where j∈{0, 1, . . . , J−1}. $P_{O\_NOMINAL\_PUSCH,f,c}(j)$ and a component $P_{O\_UE\_PUSCH,b,f,c}(j)$ may be simi-statically configured. $M_{RB,b,f,c}^{PUSCH}(i)$ may be a bandwidth of the PUSCH resource assignment expressed in number of resource blocks for PUSCH transmission occasion i on active UL BWP b of carrier f of serving cell c and µ is a SCS configuration. $\alpha_{b,f,c}(j)$ may be a scaling value of a DL PL estimate. $PL_{b,f,c}(q_d)$ be a DL PL estimate (e.g., in dB) of PUSCH via the PUSCH transmission occasion i. The wireless device may determine the DL PL estimate using a DL RS index $q_d$ of the DL RS for the active DL BWP of carrier f of serving cell c. For example, the wireless device may receive one or more messages (e.g., RRC message, MAC CE, DCI, and/or any combination thereof) indicating which $q_d$ is used for the PUSCH transmission occasion i. For example, an RRC message may comprise one or more DL RSs. The RRC message may indicate that a first DL RS with index $q_d$ of the one or more DL RSs may be the PL reference RS used to determine the DL PL estimate. For example, the wireless device may receive DCI scheduling PUSCH via the PUSCH transmission occasion i. The DCI may indicate a first DL RS with index $q_d$ of the one or more DL RSs may be the PL reference RS used to determine the DL PL estimate. $\Delta_{TF,b,f,c}(i)$ may be a power offset determined based on a MCS (e.g., modulation order and/or code rate) of the PUSCH. $f_{b,f,c}(i,l)$ may be a PUSCH power control adjustment state l for active UL BWP b of carrier f of serving cell c and PUSCH transmission occasion i. The wireless device may determine $f_{b,f,c}(i,l)$ based on one or more TPC command values (e.g., a sum of the one or more TPC command values) received before the PUSCH transmission occasion i. In an example, $f_{b,f,c}(i,l)$ is a power control adjustment value for PUSCH transmission. $f_{b,f,c}(i,l)$ may be referred to as a closed-loop power control parameter value for PUSCH. The TPC accumulation may determine $f_{b,f,c}(i,l)$. For example, if the wireless resets the TPC accumulation, $f_{b,f,c}(i,l)$=predefined value (e.g., zero). For example, if the wireless accumulates the TPC accumulation, $f_{b,f,c}(i,l)$ may comprise one or more TPC command values.

For example, $\delta_{PUSCH,b,f,c}(i,l)$ may be a TPC command value indicated by in a DCI format that schedules the PUSCH transmission occasion i on active UL BWP b of carrier f of serving cell c and/or jointly coded with other TPC commands in a particular DCI format (e.g., DCI format 2_2 with CRC scrambled by TPC-PUSCH-RNTI). For example, $l \in \{0,1\}$, e.g., if the wireless device is configured with twoPUSCH-PC-AdjustmentStates. For example, $l=0$ if the wireless device is not configured with twoPUSCH-PC-AdjustmentStates and/or if the PUSCH transmission is scheduled by an RAR UL grant. For a PUSCH (re-)transmission configured by ConfiguredGrantConfig (e.g., configured by one or more grant(s) of CG-based SDT), the wireless device may receive the value of $l \in \{0,1\}$ by a parameter (e.g., powerControlLoopToUse), e.g., in an RRC message (e.g., an RRC release message). If the wireless device receives SRI-PUSCH-PowerControl, the wireless device may determine a mapping between a set of values for the SRI field in a DCI format scheduling the PUSCH transmission and the l value(s) provided by sri-PUSCH-ClosedLoopIndex and may determine the l value that is mapped to the SRI field value. $l=0$, e.g., if the PUSCH transmission is scheduled by a DCI format that does not include an SRI field, and/or if an SRI-PUSCH-PowerControl is not provided to the wireless device. The wireless device may receive the l value by a field (e.g., a closed loop indicator field) of a particular DCI format (e.g., DCI format 2_2), e.g., with CRC scrambled by a TPC-PUSCH-RNTI.

For example, $$f_{b,f,c}(i, l) = f_{b,f,c}(i - i_0, l) + \sum_{m=0}^{\mathcal{C}(D_i)-1} \delta_{PUSCH,b,f,c}(m, l),$$

may be a PUSCH power control adjustment state l for active UL BWP b of carrier f of serving cell c and PUSCH transmission occasion i. The wireless device may determine $$f_{b,f,c}(i, l) = f_{b,f,c}(i - i_0, l) + \sum_{m=0}^{\mathcal{C}(D_i)-1} \delta_{PUSCH,b,f,c}(m, l),$$

e.g., if the wireless device does not receive an indication of TPC accumulation (e.g., tpc-Accumulation). The wireless device may determine $$f_{b,f,c}(i, l) = f_{b,f,c}(i - i_0, l) + \sum_{m=0}^{\mathcal{C}(D_i)-1} \delta_{PUSCH,b,f,c}(m, l),$$

e.g., if the wireless device receives an indication of TPC accumulation enabled (e.g., tpc-Accumulation=enabled). The $\delta_{PUSCH,b,f,c}$ values may be predefined.

$$\sum_{m=0}^{\mathcal{C}(D_i)-1} \delta_{PUSCH,b,f,c}(m, l)$$

may be a sum of TPC command values in a set $D_i$ of TPC command values with cardinality $c(D_i)$ that the wireless device receives between $K_{PUSCH}$ $(i-i_0)-1$ symbols before PUSCH transmission occasion $i-i_0$ and $K_{PUSCH}$ (i) symbols before PUSCH transmission occasion i on active UL BWP b of carrier f of serving cell c for PUSCH power control adjustment state l. For example, $i_0 > 0$ may be the smallest integer for which $K_{PUSCH}$ $(i-i_0)$ symbols before PUSCH transmission occasion $i-i_0$ is earlier than $K_{PUSCH}$ (i) symbols before PUSCH transmission occasion i.

$$\sum_{m=0}^{\mathcal{C}(D_i)-1} \delta_{PUSCH,b,f,c}(m, l)$$

may be a sum of one or more TPC command values that the wireless device receives during a time window (re-)starting associated with and/or in response to PUSCH transmission initiated by uplink grant(s) and/or one or more uplink radio resource(s) of the uplink grant(s) for the one or more SDTs (e.g., as illustrated in FIG. 21A and/or in FIG. 21B). If a PUSCH transmission is scheduled by a DCI format, $K_{PUSCH}$ (i) is a number of symbols for active UL BWP b of carrier f of serving cell c after a last symbol of a corresponding PDCCH reception and before a first symbol of the PUSCH transmission. If a PUSCH transmission is configured by configured grants (e.g., ConfiguredGrantConfig), $K_{PUSCH}$ (i) is a number of $K_{PUSCH,min}$ symbols may equal to the product of a number of symbols per slot, $N_{symb}^{slot}$, and the minimum of the values provided by k2 in PUSCH-ConfigCommon for active UL BWP b of carrier f of serving cell c. If the wireless device has reached maximum power for active UL BWP b of carrier f of serving cell c at PUSCH transmission occasion $i-i_0$ and $$\sum_{m=0}^{\hat{C}(D_i)-1} \delta_{PUSCH,b,f,c}(m, l) \geq 0,$$

the wireless device may determine $f_{b,f,c}(i,l)=f_{b,f,c}(i-i_0,l)$ If the wireless device has reached minimum power for active UL BWP b of carrier f of serving cell C at PUSCH transmission occasion $i-i_0$ and $$\sum_{m=0}^{\hat{C}(D_i)-1} \delta_{PUSCH,b,f,c}(m, l) \leq 0,$$

the wireless device may determine $f_{b,f,c}(i,l)=f_{b,f,c}(i-i_0,l)$. The wireless device may reset accumulation of a PUSCH power control adjustment state l for active UL BWP b of carrier f of serving cell c to $f_{b,f,c}(k,l)=0$, k=0, 1, . . . i, e.g., if a configuration for a corresponding $P_{O\_UE\_PUSCH,b,f,c}(j)$ value is provided by higher layers. The wireless device may reset accumulation of a PUSCH power control adjustment state l for active UL BWP b of carrier f of serving cell c to $f_{b,f,c}(k,l)=0$, k=0, 1, . . . i, if a configuration for a corresponding $a_{b,f,c}(j)$ value is provided by higher layers.

The wireless device may reset accumulation of a PUSCH power control adjustment state l for active UL BWP b of carrier f of serving cell c to $f_{b,f,c}(k,l)=0$, k=0, 1, . . . i, e.g., if the PUSCH transmission via the PUSCH transmission occasion i is initiated by one of one or more configured grant(s) that the wireless device receives for one or more SDT. The wireless device may reset accumulation of a PUSCH power control adjustment state l for active UL BWP b of carrier f of serving cell c to $f_{b,f,c}(k,l)=0$, k=0, 1, . . . i, e.g., if the PUSCH transmission of the PUSCH transmission occasion i is based on uplink grant(s) and/or one or more uplink radio resource(s) of the uplink grant(s) for the one or more SDTs. The wireless device may reset accumulation of a PUSCH power control adjustment state l for active UL BWP b of carrier f of serving cell c to $f_{b,f,c}(k,l)=0$, k=0, 1, . . . i e.g., if the PUSCH transmission via the PUSCH transmission occasion i is initiated by one of one or more configured grant(s) that the wireless device receives for one or more SDT, if the wireless device does not receive an indication of TPC accumulation (e.g., tpc-Accumulation), and/or if the wireless device receives an indication of TPC accumulation disabled (e.g., tpc-Accumulation=disabled). For example, the wireless device may determine l from the value of j. For example, if j>1 and the wireless device receive a higher layer parameter, e.g., SRI-PUSCH-PowerControl, l is the sri-PUSCH-ClosedLoopIndex value(s) configured in any SRI-PUSCH-PowerControl with the sri-P0-PUSCH-AlphaSetId value corresponding to j. l=0, e.g., if j>1 and the wireless device does not receive the higher layer parameter, SRI-PUSCH-PowerControl or j=0. The wireless device may receive l by the value of powerControlLoopToUse, e.g., if j=1. For example, $f_{b,f,c}(i,l)=\delta_{PUSCH,f,c}(i,l)$ is the PUSCH power control adjustment state for active UL BWP b of carrier f of serving cell c and PUSCH transmission occasion i, e.g., if the wireless device receives an indication of TPC accumulation disabled (e.g., tpc-Accumulation=disabled). $\delta_{PUSCH,b,f,c}$ absolute values may be predefined. For example, $f_{b,f,c}(0,l)=\Delta P_{rampup,b,f,c}+\delta_{msg\ 2,b,f,c}$, (e.g., where l=0) e.g., if the wireless device receives a random access response message in response to a PRACH transmission or a MsgA transmission on active UL BWP b of carrier f of serving cell c. For example, $f_{b,f,c}(0,l)=0$, if the wireless device performs an SDT and/or its associated one or more subsequent transmissions. For example, $f_{b,f,c}(0,l)=0$, e.g., if the wireless device performs the PUSCH transmission via uplink grant(s) and/or one or more uplink radio resource(s) of the uplink grant(s) for the one or more SDTs. For example, the wireless device may determine $f_{b,f,c}(0,l)=\Delta P_{rampup,b,f,c}+\delta_{msg\ 2,b,f,c}$, $\delta_{msg\ 2,b,f,c}$ may be a TPC command value indicated in a random access response grant of the random access response message corresponding to a PRACH transmission according to Type-1 random access procedure, or in a random access response grant of the random access response message corresponding to a MsgA transmission according to Type-2 random access procedure with RAR message(s) for fallback-RAR, on active UL BWP b of carrier f of serving cell c. For example, $$\Delta P_{rampup,b,f,c} = \min\left[\left\{\max\left(0, P_{CMAX,f,c} - \left(10\log_{10}\left(2^{\mu} \cdot M_{RB,b,f,c}^{PUSCH}(0)\right) + P_{O\_PUSCH,b,f,c}(0) + \alpha_{b,f,c}(0) \cdot PL_c + \Delta_{TF,b,f,c}(0) + \delta_{msg2,b,f,c}\right)\right)\right\}, \Delta P_{rampuprequested,b,f,c}\right].$$

For example, $\Delta P_{rampuprequested,b,f,c}$ may be provided by higher layers and corresponds to the total power ramp-up requested by higher layers from the first to the last random access preamble for carrier f in the serving cell c, $M_{RP,b,f,c}^{PUSCH}(0)$ is the bandwidth of the PUSCH resource assignment expressed in number of resource blocks for the first PUSCH transmission on active UL BWP b of carrier f of serving cell c. $\Delta_{TF,b,f,c}(0)$ may be the power adjustment of first PUSCH transmission on active UL BWP b of carrier f of serving cell c. If the wireless device transmits the PUSCH in PUSCH transmission occasion i on active UL BWP b of carrier f of serving cell c, the wireless device may determine $f_{b,f,c}(0,l)=\Delta P_{rampup,b,f,c}$ (e.g., l=0). For example, the wireless device may determine $$\Delta P_{rampup,b,f,c} = \min\{\{\max(0, P_{CMAX,f,c} - (10\log_{10}(2^\mu \cdot M_{RB,b,f,c}^{PUSCH}(i)) + P_{O\_PUSCH,b,f,c}(0) + \alpha_{b,f,c}(0) \cdot PL_c + \Delta_{TF,b,f,c}(i)))\}, \Delta P_{rampuprequested,b,f,c}\}.$$

$\Delta P_{rampuprequested,b,f,c}$ may be provided by higher layers and corresponds to the total power ramp-up requested by higher layers. $M_{RB,b,f,c}^{PUSCH}(i)$ may be the bandwidth of the PUSCH resource assignment expressed in number of resource blocks, and $\Delta_{TF,b,f,c}(i)$ may be the power adjustment of the PUSCH transmission in PUSCH transmission occasion i.

In an example, a wireless device may determine a transmit power for PUCCH in a Non-RRC_CONNECTED state. In present disclosure, $\hat{P}_{PUCCH,b,f,c}(i,q_u,q_d,l)$ may be a linear value of the transmit power for PUCCH, $P_{PUCCH,b,f,c}(i,q_u,q_d,l)$, on active UL BWP b of carrier f of serving cell c. For example, if a wireless device transmits a PUCCH on active UL BWP b of carrier f of serving cell c using parameter set configuration with index $q_u$ and PUCCH power control adjustment state with index l, the wireless device may determine the PUCCH transmission power $P_{PUCCH,b,f,c}(i,q_u,q_d,l)$ in PUCCH transmission occasion i as $$P_{PUCCH,b,f,c}(i, q_u, q_d, l) = \min\begin{cases} P_{CMAX,f,c}(i), \\ P_{O\_PUCCH,b,f,c}(q_u) + 10\log_{10}(2^\mu \cdot M_{RB,b,f,c}^{PUCCH}(i)) + PL_{b,f,c}(q_d) + \Delta_{F\_PUCCH}(F) + \Delta_{TF,b,f,c}(i) + g_{b,f,c}(i, l) \end{cases} [dBm].$$

For example, $P_{CMAX,f,c}(i)$ may be a configured maximum output power of the wireless device for carrier f of serving cell c in PUSCH transmission occasion i. $P_{O\_PUSCH,b,f,c}(j)$ may be a parameter comprising a sum of a component $P_{O\_NOMINAL\_PUCCH}$ (e.g., a received target power that may be serving cell specific) and a component $P_{O\_UE\_PUCCH}(q_u)$ (e.g., received target power that may be wireless device specific) where $0 \leq q_u < Q_u$. $0 \leq q_u < Q_u$. $Q_u$ may be a size for a set of $P_{O\_UE\_PUCCH}$ values provided by a higher layer parameter (e.g., maxNrofPUCCH-P0-PerSet). $P_{O\_NOMINAL\_PUCCH}$ and/or $P_{O\_UE\_PUCCH}(q_u)$ may be simi-statically configured. If the wireless device does not receive a value of $P_{O\_NOMINAL\_PUCCH}$ and/or $P_{O\_UE\_PUCCH}(q_u)$, the wireless device may determine the respective value as a predefined value (e.g., zero). $M_{RB,b,f,c}^{PUCCH}(i)$ may be a bandwidth of the PUCCH resource assignment expressed in number of resource blocks for PUCCH transmission occasion i on active UL BWP b of carrier f of serving cell c and µ is a SCS configuration. For example, $PL_{b,f,c}(q_d)$ may be a DL PL estimate (e.g., in dB) of PUCCH via the PUCCH transmission occasion i. The wireless device may determine the DL PL estimate using a DL RS index $q_d$ of the DL RS for the active DL BWP of carrier f of serving cell c. For example, the wireless device may receive one or more messages (e.g., RRC message, MAC CE, DCI, and/or any combination thereof) indicating which is $q_d$ used for the PUCCH transmission occasion i. For example, an RRC message may comprise one or more DL RSs. The RRC message may indicate that a first DL RS with index $q_d$ of the one or more DL RSs may be the PL reference RS used to determine the DL PL estimate. For example, the wireless device may receive DCI scheduling PUCCH via the PUCCH transmission occasion i. The DIC may comprise downlink assignment of PDSCH. The DCI may indicate a first DL RS with index $q_d$ of the one or more DL RSs may be the PL reference RS used to determine the DL PL estimate.

$\Delta_{F\_PUCCH}(F)$ may be a power offset value determined based on a PUCCH format. $\Delta_{TF,b,f,c}(i)$ may be a PUCCH transmission power adjustment component on active UL BWP b of carrier f of a cell (e.g., a primary cell) c. The wireless device may determine $\Delta_{TF,b,f,c}(i)$ based on the PUCCH format and/or a number of UCI bits of a PUCCH transmission. $g_{b,f,c}(i,l)$ may be a PUCCH power control adjustment state l for active UL BWP b of carrier f of serving cell c and PUCCH transmission occasion i. The wireless device may determine $g_{b,f,c}(i,l)$ based on one or more TPC command values (e.g., a sum of the one or more TPC command values) received before the PUCCH transmission occasion i. In an example, $g_{b,f,c}(i,l)$ is a power control adjustment value for PUCCH transmission. $g_{b,f,c}(i,l)$ may be referred to as a closed-loop power control parameter value for PUCCH. The TPC accumulation may determine $g_{b,f,c}(i,l)$. For example, if the wireless resets the TPC accumulation, $g_{b,f,c}(i,l)$=predefined value (e.g., zero). For example, if the wireless accumulates the TPC accumulation, $g_{b,f,c}(i,l)$ may comprise one or more TPC command values.

For example, For the PUCCH power control adjustment state $g_{b,f,c}(i,l)$ for active UL BWP b of carrier f of a cell (e.g., primary cell) c and PUCCH transmission occasion i. For example, $\delta_{PUCCH,b,f,c}(i,l)$ may be a TPC command value and/or is included in a DCI (e.g., DCI format 1_0 or DCI format 1_1) for active UL BWP b of carrier f of a cell (e.g., a primary cell) c that the wireless device detects for PUCCH transmission occasion i and/or is jointly coded with other TPC commands in a DCI format 2_2 with CRC scrambled by TPC-PUCCH-RNTI. For example, l∈{0,1}, e.g., if the wireless device is provided twoPUCCH-PC-Adjustment-States and PUCCH-SpatialRelationInfo. For example, l=0 if the wireless device is not provided twoPUCCH-PC-AdjustmentStates or PUCCH-SpatialRelationInfo. If the wireless device determines (e.g., obtains) a TPC command value from the DCI (e.g., DCI format 1_0 or a DCI format 1_1) and/or if the wireless device is provided PUCCH-SpatialRelationInfo, the wireless device determines (e.g., obtains) a mapping, by an index provided by p0-PUCCH-Id, between a set of pucch-SpatialRelationInfoId values and a set of values for closedLoopIndex that provide the l value(s). If the wireless device receives an activation command indicating a value of pucch-SpatialRelationInfoId, the wireless device may determine the value closedLoopIndex that provides the value of l through the link to a corresponding p0-PUCCH-Id index. If the wireless device determines (e.g., obtains) one TPC command from a DCI (e.g., DCI format 2_2 with CRC scrambled by a TPC-PUCCH-RNTI), the l value may be provided by the closed loop indicator field in the DCI (e.g., DCI format 2_2).

For example, $$g_{b,f,c}(i, l) = g_{b,f,c}(i - i_0, l) + \sum_{m=0}^{\mathcal{C}(C_i)-1} \delta_{PUCCH,b,f,c}(m, l)$$

may be the current PUCCH power control adjustment state l for active UL BWP b of carrier f of a cell (e.g., a primary cell) C and PUCCH transmission occasion i. The $\delta_{PUCCH,b,f,c}$ values may be predefined. For example, $$g_{b,f,c}(i, l) = g_{b,f,c}(i - i_0, l) + \sum_{m=0}^{\mathcal{C}(C_i)-1} \delta_{PUCCH,b,f,c}(m, l),$$

e.g., if the wireless device does not receive an indication of TPC accumulation (e.g., tpc-Accumulation). The wireless device may determine $$g_{b,f,c}(i, l) = g_{b,f,c}(i - i_0, l) + \sum_{m=0}^{\mathcal{C}(C_i)-1} \delta_{PUCCH,b,f,c}(m, l),$$

e.g., if the wireless device receives an indication of TPC accumulation enabled (e.g., tpc-Accumulation=enabled).

$$\sum_{m=0}^{\mathcal{C}(C_i)-1} \delta_{PUCCH,b,f,c}(m, l)$$

may be a sum of TPC command values in a set $C_i$ of TPC command values with cardinality $\mathcal{C}(C_i)$ that the wireless device receives between $K_{PUCCH}(i-i_0)-1$ symbols before PUCCH transmission occasion $i-i_0$ and $K_{PUCCH}(i)$ symbols before PUCCH transmission occasion i on active UL BWP b of carrier f of a cell (e.g., a primary cell) c for PUCCH power control adjustment state, where $i_0>0$ is the smallest integer for which $K_{PUCCH}(i-i_0)$ symbols before PUCCH transmission occasion $i-i_0$ is earlier than $K_{PUCCH}(i)$ symbols before PUCCH transmission occasion i.

$$\sum_{m=0}^{\mathcal{C}(C_i)-1} \delta_{PUCCH,b,f,c}(m, l)$$

may be a sum of one or more TPC command values that the wireless device receives during a time window (re-)starting associated with and/or in response to a transmission initiated by uplink grant(s) and/or one or more uplink radio resource(s) of the uplink grant(s) for the one or more SDTs (e.g., as illustrated in FIG. 21A and/or in FIG. 21B).

If the PUCCH transmission is in response to a detection by the wireless device of a particular DCI (e.g., DCI format 1_0 or DCI format 1_1), $K_{PUCCH}(i)$ may be a number of symbols for active UL BWP b of carrier f of a cell (e.g., a primary cell) C after a last symbol of a corresponding PDCCH reception and before a first symbol of the PUCCH transmission.

If the PUCCH transmission is not in response to a detection by the wireless device of a DCI format 1_0 or DCI format 1_1, $K_{PUCCH}(i)$ may be a number of $K_{PUCCH,min}$ symbols equal to the product of a number of symbols per slot, $N_{symb}^{slot}$, and the minimum of the values provided by k2 in PUSCH-ConfigCommon for active UL BWP b of carrier f of a cell (e.g., a primary cell) C.

If the wireless device has reached maximum power for active UL BWP b of carrier f of a cell (e.g., a primary cell) C at PUCCH transmission occasion $i-i_0$ and $$\sum_{m=0}^{\mathcal{C}(C_i)-1} \delta_{PUCCH,b,f,c}(m, l) \geq 0,$$

the wireless device may determine $g_{b,f,c}(i,l)=g_{b,f,c}(i-i_0,l)$. If a wireless device has reached minimum power for active UL BWP b of carrier f of a cell (e.g., a primary cell) C at PUCCH transmission occasion $i-i_0$ and $$\sum_{m=0}^{\hat{C}(C_i)-1} \delta_{PUCCH,b,f,c}(m,l) \leq 0,$$

then $g_{b,f,c}(i,l)=g_{b,f,c}(i-i_0,l)$. If a configuration of a $P_{O\_PUCCH,b,f,c}(q_u)$ value for a corresponding PUCCH power control adjustment state l for active UL BWP b of carrier f of a cell (e.g., a primary cell) C is provided by higher layers, the wireless device may determine $g_{b,f,c}(k,l)=0$, k=0, 1, . . . i.

The wireless device may reset accumulation of a PUCCH power control adjustment state l for active UL BWP b of carrier f of serving cell c to $g_{b,f,c}(k,l)=0$, k=0, 1, . . . i, e.g., if the PUCCH transmission via the PUCCH transmission occasion i is associated with a PUSCH transmission initiated by one of one or more configured grant(s) that the wireless device receives for one or more SDT.

If the wireless device is provided PUCCH-SpatialRelationInfo, the wireless device may determine the value of l from the value of $q_u$ based on a pucch-SpatialRelationInfoId value associated with the p0-PUCCH-Id value corresponding to $q_u$ and with the closedLoopIndex value corresponding to l; otherwise, l=0. The wireless device may determine $g_{b,f,c}(0,l)=\Delta P_{rampup,b,f,c}+\delta_{b,f,c}$, e.g., l=0.

For example, $g_{b,f,c}(0,l)=0$, if the wireless device performs an SDT and/or its associated one or more subsequent transmissions. For example, $g_{b,f,c}(0,l)=0$, e.g., if the wireless device performs the PUCCH transmission triggered by a DCI (e.g., downlink grant) received during a time window (re-)starting associated with and/or in response to PUSCH transmission initiated by uplink grant(s) and/or one or more uplink radio resource(s) of the uplink grant(s) for the one or more SDTs (e.g., as illustrated in FIG. 21A and/or in FIG. 21B).

For example, $\delta_{b,f,c}$ may be the TPC command value indicated in a random access response grant corresponding to a PRACH transmission according to Type-1 random access procedure, or in a random access response grant corresponding to MsgA transmissions according to Type-2 random access procedure with RAR message(s) for fallback-RAR.

For example, $\delta_{b,f,c}$ may be the TPC command value indicated in a successRAR corresponding to MsgA transmissions for Type-2 random access procedure. For example, $\delta_{b,f,c}$ may be the TPC command value in a DCI format with CRC scrambled by C-RNTI or MCS-C-RNTI that the wireless device detects in a first PDCCH reception in a search space set provided by recoverySearchSpaceId if the PUCCH transmission is a first PUCCH transmission after 28 symbols from a last symbol of the first PDCCH reception.

For example, if the wireless device transmits PUCCH on active UL BWP b of carrier f of a cell (e.g., a primary cell) c, the wireless device may determine $$\Delta P_{rampup,b,f,c} = \min\left[\max\begin{pmatrix}0,\\ P_{CMAX,f,c}-\left(P_{O\_PUCCH,b,f,c}+PL_{b,f,c}(q_d)+\Delta_{F\_PUCCH}(F)+\Delta_{TF,b,f,c}+\delta_{b,f,c}\right)\end{pmatrix}\right];$$
$$\Delta P_{rampuprequested,b,f,c}$$

otherwise, $$\Delta P_{rampup,b,f,c} = \min\left[\max\begin{pmatrix}0,\\ P_{CMAX,f,c}-(P_{O\_PUCCH,b,f,c}+PL_{b,f,c}(q_d))\end{pmatrix},\right].$$
$$\Delta P_{rampuprequested,b,f,c}$$

For example, $\Delta P_{rampuprequested,b,f,c}$ may be provided by higher layers and may correspond to the total power ramp-up requested by higher layers from the first to the last preamble for active UL BWP b of carrier f of a cell (e.g., a primary cell) c. For example, $\Delta_{F\_PUCCH}$ (F) corresponds to PUCCH format 0 or PUCCH format 1.

In an example, a wireless device may determine a transmit power for SRS in a Non-RRC_CONNECTED state. In present disclosure, $\hat{P}_{SRS,b,f,c}(i,q_s,l)$ may be a linear value of the transmit power for SRS, $P_{SRS,b,f,c}(i,q_s,l)$, on active UL BWP b of carrier f of serving cell c. The wireless device may split a linear value $\hat{P}_{SRS,b,f,c}(i,q_s,l)$ of the transmit power $P_{SRS,b,f,c}(i,q_s,l)$ on active UL BWP b of carrier f of serving cell c equally across the configured antenna ports for SRS. For example, if a wireless device transmits, e.g., based on a configuration by SRS-ResourceSet, an SRS on active UL BWP b of carrier f of serving cell c using parameter set configuration with index $q_s$ and SRS power control adjustment state with index l, the wireless device may determine the SRS transmission power $P_{SRS,b,f,c}(i,q_s,l)$ in SRS transmission occasion i as if the wireless device receive a parameter (e.g., srs-PowerControlAdjustmentStates) indicating a same power control adjustment state for SRS transmissions and PUSCH transmissions. In an example, $h_{b,f,c}(i,l)$ is a power control adjustment value for SRS transmission. $h_{b,f,c}(i,l)$ may be referred to as a closed-loop power control parameter value for SRS. The TPC accumulation may determine $h_{b,f,c}(i,l)$. For example, if the wireless resets the TPC accumulation, $h_{b,f,c}(i,l)$=predefined value (e.g., zero). For example, if the wireless accumulates the TPC accumulation, $h_{b,f,c}(i,l)$ may comprise one or more TPC command values.

For the SRS power control adjustment state for active UL BWP b of carrier f of serving cell c and SRS transmission occasion i, the wireless device may determine $h_{b,f,c}(i,l)=f_{b,f,c}(i,l)$. For example, $f_{b,f,c}(i,l)$ may be the current PUSCH power control adjustment state e.g., if srs-PowerControlAdjustmentStates indicates a same power control adjustment state for SRS transmissions and PUSCH transmissions.

$$P_{SRS,b,f,c}(i, q_s, l) = \min\begin{Bmatrix} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{Bmatrix} [dBm]$$

For example, $P_{CMAX,f,c}(i)$ may be the wireless device configured maximum output power for carrier f of serving cell c in SRS transmission occasion i. For example, $P_{O\_SRS,b,f,c}(q_s)$ may be a target receive power of SRS transmission. The wireless device may receive a value of $P_{O\_SRS,b,f,c}(q_s)$ via an SRS configuration parameter (e.g., p0) for active UL BWP b of carrier f of serving cell c and SRS resource set $q_s$ provided by an SRS configuration (e.g., SRS-ResourceSet and SRS-ResourceSetId). $M_{SRS,b,f,c}(i)$ may be an SRS bandwidth determined in number of resource blocks for SRS transmission occasion i on active UL BWP b of carrier f of serving cell c and μ may be a SCS configuration. $\alpha_{SRS,b,f,c}(q_s)$ may be a scaling value of a DL PL estimate for active UL BWP b of carrier f of serving cell c and SRS resource set $q_s$. For example, $PL_{b,f,c}(q_d)$ may be a DL PL estimate (e.g., in dB) of SRS via the SRS transmission occasion i. The wireless device may determine the DL PL estimate using a DL RS index $q_d$ of the DL RS for the active DL BWP of carrier f of serving cell c. For example, the wireless device may receive one or more messages (e.g., RRC message, MAC CE, DCI, and/or any combination thereof) indicating which is $q_d$ used for the SRS transmission occasion i. For example, an RRC message may comprise one or more DL RSs. The RRC message may indicate that a first DL RS with index $q_d$ of the one or more DL RSs may be the PL reference RS used to determine the DL PL estimate. For example, the wireless device may receive DCI scheduling SRS via the SRS transmission occasion i. The DCI may indicate a first DL RS with index $q_d$ of the one or more DL RSs may be the PL reference RS used to determine the DL PL estimate. $h_{b,f,c}(i,l)$ may be an SRS power control adjustment state l for active UL BWP b of carrier f of serving cell c and SRS transmission occasion i. The wireless device may determine $h_{b,f,c}(i,l)$ based on one or more TPC command values (e.g., a sum of the one or more TPC command values) received before the SRS transmission occasion i. The wireless device may determine $h_{b,f,c}(i,l)=f_{b,f,c}(i,l)$, e.g., For example, the wireless device may determine $$h_{b,f,c}(i) = h_{b,f,c}(i - i_0) + \sum_{m=0}^{\mathcal{C}(S_i)-1} \delta_{SRS,b,f,c}(m),$$

e.g., if the wireless device is not configured for PUSCH transmissions on active UL BWP b of carrier f of serving cell C, and/or if srs-PowerControlAdjustmentStates indicates separate power control adjustment states between SRS transmissions and PUSCH transmissions, and/or if an indication of TPC accumulation indicates the TPC accumulation enabled (e.g., tpc-Accumulation is absent and/or tpc-Accumulation=enabled). The $\delta_{SRS,b,f,c}$ values may be predefined. $\delta_{SRS,b,f,c}(m)$ may be jointly coded with other TPC commands in a PDCCH with a DCI (e.g., DCI format 2_3).

For example, $$h_{b,f,c}(i) = h_{b,f,c}(i - i_0) + \sum_{m=0}^{\mathcal{C}(S_i)-1} \delta_{SRS,b,f,c}(m),$$

e.g., if the wireless device does not receive an indication of TPC accumulation (e.g., tpc-Accumulation). The wireless device may determine $$h_{b,f,c}(i) = h_{b,f,c}(i - i_0) + \sum_{m=0}^{\mathcal{C}(S_i)-1} \delta_{SRS,b,f,c}(m),$$

e.g., if the wireless device receives an indication of TPC accumulation enabled (e.g., tpc-Accumulation=enabled).

$$\sum_{m=0}^{\mathcal{C}(S_i)-1} \delta_{SRS,b,f,c}(m)$$

may be a sum of TPC command values in a set $s_i$ of TPC command values with cardinality $C(s_i)$ that the wireless device receives between $K_{SRS}(i-i_0)-1$ symbols before SRS transmission occasion $i-i_0$ and $K_{SRS}(i)$ symbols before SRS transmission occasion i on active UL BWP b of carrier f of serving cell C for SRS power control adjustment state, where $i_0>0$ is the smallest integer for which $K_{SRS}(i-i_0)$ symbols before SRS transmission occasion $i-i_0$ is earlier than $K_{SRS}(i)$ symbols before SRS transmission occasion i.

$$\sum_{m=0}^{C(S_i)-1} \delta_{SRS,b,f,c}(m)$$

may be a sum of one or more TPC command values that the wireless device receives during a time window (re-)starting associated with and/or in response to a transmission initiated by uplink grant(s) and/or one or more uplink radio resource(s) of the uplink grant(s) for the one or more SDTs (e.g., as illustrated in FIG. 21A and/or in FIG. 21B).

If the SRS transmission is aperiodic, $K_{SRS}(i)$ may be a number of symbols for active UL BWP b of carrier f of serving cell c after a last symbol of a corresponding PDCCH triggering the SRS transmission and before a first symbol of the SRS transmission. If the SRS transmission is semi-persistent or periodic, $K_{SRS}(i)$ may be a number of $K_{SRS,min}$ symbols equal to the product of a number of symbols per slot, $N_{symb}^{slot}$, and the minimum of the values provided by k2 in PUSCH-ConfigCommon for active UL BWP b of carrier f of serving cell c. If the wireless device has reached maximum power for active UL BWP b of carrier f of serving cell c at SRS transmission occasion $i-i_0$ and $$\sum_{m=0}^{C(S_i)-1} \delta_{SRS,b,f,c}(m) \geq 0,$$

the wireless device may determine $h_{b,f,c}(i)=h_{b,f,c}(i-i_0)$. If wireless device has reached minimum power for active UL BWP b of carrier f of serving cell c at SRS transmission occasion $i-i_0$ and $$\sum_{m=0}^{C(S_i)-1} \delta_{SRS,b,f,c}(m) \leq 0,$$

the wireless device may determine $h_{b,f,c}(i)=h_{b,f,c}(i-i_0)$. If a configuration for a $P_{O\_SRS,b,f,c}(q_s)$ value and/or for a $\alpha_{SRS,b,f,c}(q_s)$ value for a corresponding SRS power control adjustment state l for active UL BWP b of carrier f of serving cell c is provided by higher layers, the wireless device may determine $h_{b,f,c}(k)=0$, k=0, 1, . . . , i.

The wireless device may reset accumulation of an SRS power control adjustment state l for active UL BWP b of carrier f of serving cell c to $h_{b,f,c}(k)=0$, k=0, 1, . . . , i e.g., if the SRS transmission via the SRS transmission occasion i is associated with a PUSCH transmission initiated by one of one or more configured grant(s) that the wireless device receives for one or more SDT.

For example, $h_{b,f,c}(0,l)=0$, if the wireless device performs an SDT and/or its associated one or more subsequent transmissions. For example, $h_{b,f,c}(0,l)=0$, e.g., if the wireless device performs the SRS transmission triggered by a DCI (e.g., downlink grant) received during a time window (re-)starting associated with and/or in response to PUSCH transmission initiated by uplink grant(s) and/or one or more uplink radio resource(s) of the uplink grant(s) for the one or more SDTs (e.g., as illustrated in FIG. 21A and/or in FIG. 21B).

The wireless device may determine $h_{b,f,c}(0) = \Delta P_{rampup,b,f,c} + \delta_{msg\ 2,b,f,c}$. $\delta_{msg2,b,f,c}$ may be the TPC command value indicated in the random access response grant corresponding to the random access preamble that the wireless device transmitted on active UL BWP b of carrier f of the serving cell c. For example, $$\Delta P_{rampup,b,f,c} = \min\left[\max\binom{0,}{P_{CMAX,f,c} - (P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d))}, \atop \Delta P_{rampuprequested,b,f,c}\right].$$

For example, $\Delta P_{rampuprequested,b,f,c}$ may be provided by higher layers and may correspond to the total power ramp-up requested by higher layers from the first to the last preamble for active UL BWP b of carrier f of serving cell C.

For example, $h_{b,f,c}(i)=\delta_{SRS,b,f,c}(i)$ if the wireless device is not configured for PUSCH transmissions on active UL BWP b of carrier f of serving cell C, and/or if srs-PowerControlAdjustmentStates indicates separate power control adjustment states between SRS transmissions and PUSCH transmissions, and tpc-Accumulation is provided, and the wireless device detects a DCI format 2_3 $K_{SRS,min}$ symbols before a first symbol of SRS transmission occasion i. For example, absolute values of $\delta_{SRS,b,f,c}$ may be predefined.

If srs-PowerControlAdjustmentStates indicates a same power control adjustment state for SRS transmissions and PUSCH transmissions, the update of the power control adjustment state for SRS transmission occasion i may occur at the beginning of each SRS resource in the SRS resource set $q_s$; otherwise, the update of the power control adjustment state SRS transmission occasion i may occur at the beginning of the first transmitted SRS resource in the SRS resource set $q_s$.

If a wireless device transmits SRS based on a configuration by SRS-PosResourceSet-r16 on active UL BWP b of carrier f of serving cell c, the wireless device determines the SRS transmission power $P_{SRS,b,f,c}(i,q_s)$ in SRS transmission occasion i as $$P_{SRS,b,f,c}(i, q_s) = \min\begin{Bmatrix} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) \end{Bmatrix} [dBm].$$

For example, $P_{O\_SRS,b,f,c}(q_s)$ and $\alpha_{SRS,b,f,c}(q_s)$ may be provided by p0-r16 and alpha-r16 respectively, for active UL BWP b of carrier f of serving cell c, and SRS resource set $q_s$ may be indicated by SRS-PosResourceSetId-r16 from SRS-PosResourceSet-r16. For example, $PL_{b,f,c}(q_d)$ may be a downlink pathloss estimate in dB calculated by the wireless device in case of an active DL BWP of a serving cell c, using RS resource indexed $q_d$ in a serving or non-serving cell for SRS resource set $q_s$. A configuration for RS resource index $q_d$ associated with SRS resource set $q_s$ may be provided by pathlossReferenceRS-Pos-r16. If a ssb-IndexNcell-r16 is provided, referenceSignalPower may be provided by ss-PBCH-BlockPower-r16. If a dl-PRS-ResourceId-r16 is provided, referenceSignalPower may be provided by dl-PRS-ResourcePower-r16. If the wireless device determines that the wireless device is not able to accurately measure $PL_{b,f,c}(q_d)$, and/or the wireless device is not provided with pathlossReferenceRS-Pos-r16, the wireless device may calculate $PL_{b,f,c}(q_d)$ using a RS resource obtained from the SS/PBCH block of the serving cell that the wireless device uses to obtain MIB. The wireless device may indicate a capability for a number of pathloss estimates that the wireless device can simultaneously maintain for all SRS resource sets provided by SRS-PosResourceSet-r16, e.g., in addition to the up to four pathloss estimates that the wireless device maintains per serving cell for PUSCH/PUCCH transmissions and for SRS transmissions configured by SRS-Resource.

FIG. 24 is a flow diagram as per an aspect of an example embodiment of the present disclosure. At 2410, a wireless device may receive a message comprising one or more configured grants for a radio resource control (RRC) inactive state. At 2420, the wireless device may determine, based on a first transmission being initiated by a configured grant of the one or more configured grants, to reset a first power control adjustment value of a first transmit power of the first transmission. At 2430, the wireless device may transmit, based on the first transmit power, a first transport block via a resource of the configured grant. At 2440, the wireless device may receive, based on the transmitting the first transport block and in the RRC inactive state, a first dynamic grant comprising a first power control value. At 2450, the wireless device may determine, based on the first power control value and the first power control adjustment value, a second power control adjustment value of a second transmit power of a second transmission scheduled by the first dynamic grant. At 2460, the wireless device may transmit, based on the second transmit power, a second transport block via a resource of the first dynamic grant.

For example, the wireless device may initiate the first transmission based on the configured grant of the one or more configured grants. For example, the first power control adjustment value may be zero in response to determining to reset. For example, the message may be an RRC release message. For example, the message may indicate that an accumulation of the one or more power control adjustment values is enabled in the RRC inactive state. For example, based on the accumulation being enabled, a power control adjustment value may be based on a previous power control adjustment value. For example, the second power control adjustment value may be a sum of the first power control value and the first power control adjustment value. For example, the wireless device may start a time window in response to transmitting the first transport block. For example, the wireless device may monitor, during the time window, a downlink control channel for downlink control information. For example, the wireless device may receive, during the time window, the downlink control message comprising the first dynamic grant. For example, the determination of the second power control adjustment value may be in response to the first dynamic grant being received during the time window. For example, the downlink control information may be scrambled with C-RNTI of the wireless device. For example, the determination of the second power control adjustment value may be in response to the downlink control information being scrambled with C-RNTI. For example, the downlink control information may be scrambled with SDT-RNTI of the wireless device. For example, the determination of the second power control adjustment value may be in response to the downlink control information being scrambled with SDT-RNTI. For example, the determination of the second power control adjustment value may be in response to the first dynamic grant being received during the time window. For example, the wireless device may receive, during the time window, a second downlink control message comprising a second dynamic grant comprising a second power control value. For example, the wireless device may determine, based on the second power control value and the second power control adjustment value, a third power control adjustment value of a third transmit power of a third transmission scheduled by the second dynamic grant. For example, the wireless device may transmit, based on the third transmit power, a third transport block via a resource of the second dynamic grant. For example, the wireless device may (re-)start a time window in response to receiving the first dynamic grant. For example, the wireless device may monitor, during the restarted time window, the downlink control channel for downlink control information. For example, the wireless device may receive, during the restarted time window, the downlink control message comprising a second dynamic grant comprising a second power control value. For example, the wireless device may determine, based on the second power control value and the second power control adjustment value, a third power control adjustment value of a third transmit power of a third transmission scheduled by the second dynamic grant. For example, the wireless device may transmit, based on the third transmit power, a third transport block via a resource of the second dynamic grant.

Figure 25:
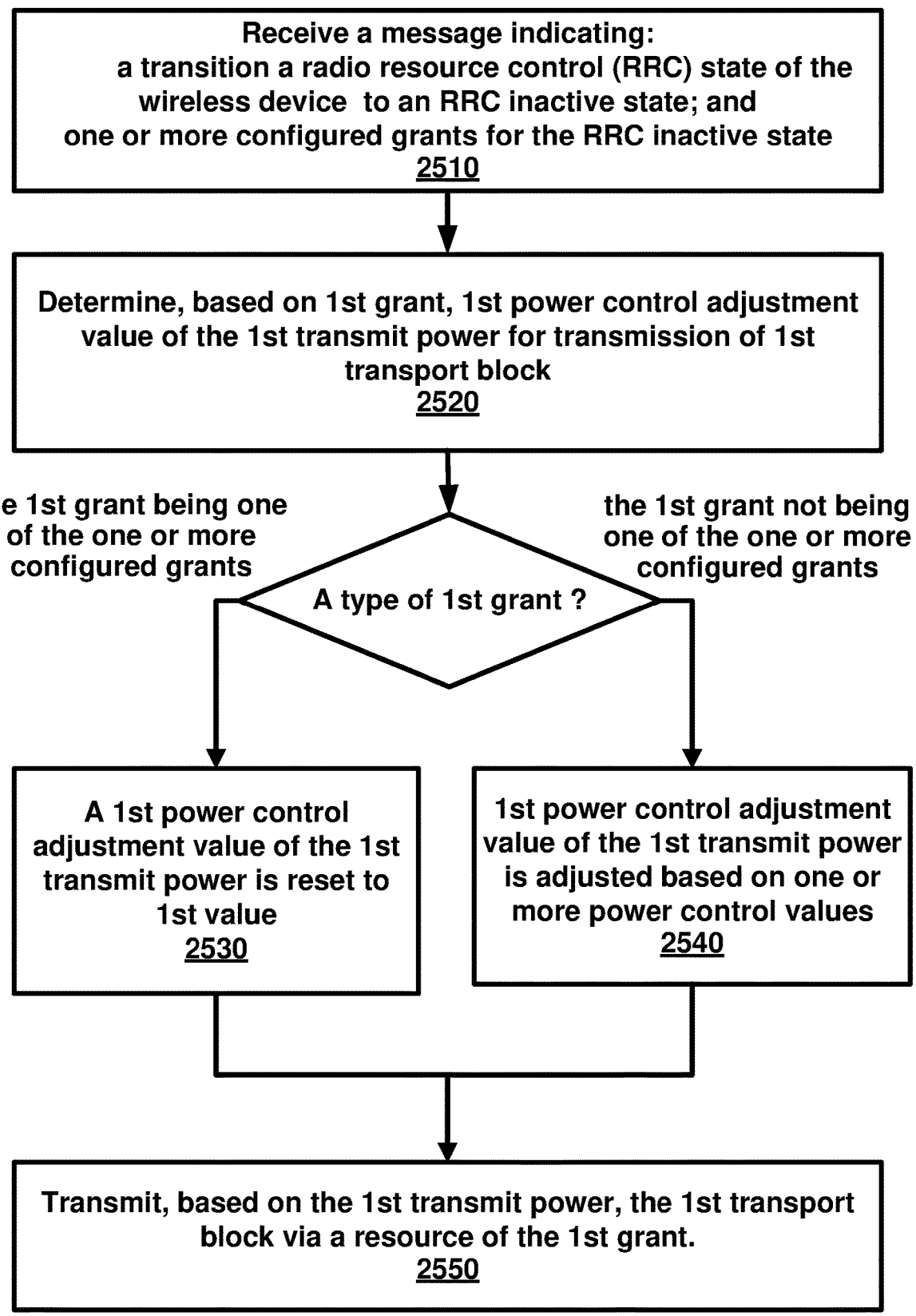
FIG. 25 is a flow diagram as per an aspect of an example embodiment of the present disclosure.

FIG. 25 is a flow diagram as per an aspect of an example embodiment of the present disclosure. At 2510, a wireless device may receive a message. The message may indicate a transition a radio resource control (RRC) state of the wireless device to an RRC inactive state. The message may indicate one or more configured grants for the RRC inactive state. At 2520, the wireless device may determine, based on a first grant, a first power control adjustment value of the first transmit power for transmission of a first transport block. At 2530, in response to the first grant being one of the one or more configured grants, a first power control adjustment value of the first transmit power is reset to a first value. At 2540, in response to the first grant not being one of the one or more configured grants, a first power control adjustment value of the first transmit power is adjusted based on one or more power control values. At 2530, the wireless device may transmit, based on the first transmit power and the first grant, the first transport block in the RRC inactive state.

For example, the message may be an RRC release message. For example, the message may indicate that an accumulation of a power control adjustment value is enabled. For example, the accumulation may be enabled based on a grant, scheduling a transmission with the power control adjustment, not being one of the one or more configured grants. For example, the wireless device may start a time window in response to transmitting the first transport block. For example, the wireless device may monitor, during the time window, a downlink control channel. For example, the wireless device may, in response to a expiry of the time window, stop monitoring the downlink control channel. For example, the first grant may comprise at least one of the one or more power control values in response to the first grant not being one of the one or more configured grants. For example, the first grant may comprise a dynamic grant. The dynamic grant may not be one of the one or more configured grants. For example, the first value may be predefined.

In an example, a wireless device may receive a message comprising one or more configured grants for a radio resource control (RRC) inactive state. The wireless device may reset a first power control adjustment value of a first transmit power of a first transmission in response to the first transmission being based on a first configured grants of the one or more configured grants. The wireless device may transmit, based on the first transmit power, a first transport block via a first resource of the first configured grant. The wireless device may determine, based on one or more power control values, a second power control adjustment value of a second transmit power of a second transmission. The determination of the second power control adjustment value may be in response to the second transmission being based on receiving a dynamic grant in the RRC inactive state. The wireless device may transmit, based on the second transmit power, a second transport block via a second resource of the second grant. The message may be an RRC release message.

The wireless device may start a time window in response to transmitting the first transport block. The wireless device may monitor, during the time window, a downlink control channel for downlink control information. The wireless device may receive, during the time window, the downlink control message comprising the second grant comprising one of the one or more power control values. The second grant may comprise a dynamic grant.

FIG. 26 is a flow diagram as per an aspect of an example embodiment of the present disclosure. At 2610, a base station may transmit a message comprising one or more configured grants for a radio resource control (RRC) inactive state. At 2620, the base station may receive, based on a first transmit power, a first transport block via a resource of the configured grant. For example, a first power control adjustment value of the first transmit power of the first transport block may be reset based on a transmission of the first transport block being initiated by a configured grant of the one or more configured grants. At 2630, the base station may transmit, based on the receiving the first transport block and in the RRC inactive state, a first dynamic grant comprising a first power control value. At 2640, the base station may receive, based on a second transmit power, a second transport block via a resource of the first dynamic grant. For example, a second power control adjustment value of the second transmit power of a second transmission scheduled by the first dynamic grant may be determined based on the first power control value and the first power control adjustment value.

For example, the transmission of the first transport block may be initiated based on the configured grant of the one or more configured grants. For example, the first power control adjustment value may be zero in response to determining to reset. For example, the message may be an RRC release message. For example, the message may indicate that an accumulation of the one or more power control adjustment values is enabled in the RRC inactive state. For example, based on the accumulation being enabled, a power control adjustment value may be based on a previous power control adjustment value. For example, the second power control adjustment value may be a sum of the first power control value and the first power control adjustment value. For example, the base station may start a time window in response to transmitting the first transport block. For example, the base station may transmit, during the time window and via a downlink control channel, downlink control information comprising the first dynamic grant. For example, the base station may transmit, during the time window, a second downlink control message the second downlink control message may comprise a second dynamic grant comprising a second power control value. For example, the base station may receive, based on a third transmit power, a third transport block via a resource of the second dynamic grant. For example, a third power control adjustment value of the third transmit power of a transmission scheduled by the second dynamic grant may be determined based on the second power control value and the second power control adjustment value. For example, the base station may (re-)start a time window in response to receiving the first dynamic grant. The base station may transmit, during the restarted time window, the downlink control message comprising a second dynamic grant comprising a second power control value. The base station may transmit, based on a third transmit power, a third transport block via a resource of the second dynamic grant. For example, a third power control adjustment value of the third transmit power of a transmission scheduled by the second dynamic grant may be determined based on the second power control value and the second power control adjustment value.

What is claimed is:

1. A wireless device comprising:
one or more processors; and
memory storing instructions that, when executed by the one or more processors, causes the wireless device to:
receive a radio resource control (RRC) release message indicating a small data transmission (SDT) time window for an SDT in an RRC inactive state;
transmit, during the SDT time window, an initial uplink transmission using a first power control adjustment (PCA) state being reset to zero; and
transmit, using a second PCA state, a second uplink transmission, wherein, in response to the second uplink transmission being subsequent to the initial uplink transmission during the SDT time window, the second PCA state is based on:
the first PCA state; and
one or more transmit power control command values received during the SDT time window.

2. The wireless device of claim 1, wherein the RRC release message further indicates one or more configured uplink grants for the SDT in the RRC inactive state.

3. The wireless device of claim 1, wherein the instructions further cause the wireless device to start the SDT time window based on initiating the SDT.

4. The wireless device of claim 1, wherein transmitting the initial uplink transmission is via a first configured uplink grant of one or more configured uplink grants.

5. The wireless device of claim 1, wherein transmitting the second uplink transmission is via a second configured uplink grant of one or more configured uplink grants.

6. The wireless device of claim 1, wherein:
the initial uplink transmission is a new transmission of a first transport block; and
the second uplink transmission is a new transmission of a second transport block.

7. The wireless device of claim 1, wherein the instructions further cause the wireless device to determine a transmission power, for transmitting the second uplink transmission, based on the first PCA state and the one or more transmit power control command values.

8. The wireless device of claim 1, wherein the instructions further cause the wireless device to:
monitor, during the SDT time window, a downlink control channel; and
receive, via the downlink control channel and during the SDT, one or more uplink grants comprising the one or more transmit power control command values.

9. The wireless device of claim 8, wherein the one or more uplink grants comprise one or more dynamic grants.

10. The wireless device of claim 1, wherein a transmission power of the second uplink transmission comprises a sum of the first PCA state and the one or more transmit power control command values.

11. A non-transitory computer-readable medium comprising instructions that, when executed by one or more processors of a wireless device, cause the wireless device to:
receive a radio resource control (RRC) release message indicating a small data transmission (SDT) time window for an SDT in an RRC inactive state;
transmit, during the SDT time window, an initial uplink transmission using a first power control adjustment (PCA) state being reset to zero; and
transmit, using a second PCA state, a second uplink transmission, wherein, in response to the second uplink transmission being subsequent to the initial uplink transmission during the SDT time window, the second PCA state is based on:
the first PCA state; and
one or more transmit power control command values received during the SDT time window.

12. The non-transitory computer-readable medium of claim 11, wherein the RRC release message further indicates one or more configured uplink grants for the SDT in the RRC inactive state.

13. The non-transitory computer-readable medium of claim 11, wherein the instructions further cause the wireless device to start the SDT time window based on initiating the SDT.

14. The non-transitory computer-readable medium of claim 11, wherein transmitting the initial uplink transmission is via a first configured uplink grant of one or more configured uplink grants.

15. The non-transitory computer-readable medium of claim 11, wherein transmitting the second uplink transmission is via a second configured uplink grant of one or more configured uplink grants.

16. The non-transitory computer-readable medium of claim 11, wherein:
the initial uplink transmission is a new transmission of a first transport block; and
the second uplink transmission is a new transmission of a second transport block.

17. The non-transitory computer-readable medium of claim 11, wherein the instructions further cause the wireless device to determine a transmission power, for transmitting the second uplink transmission, based on the first PCA state and the one or more transmit power control command values.

18. The non-transitory computer-readable medium of claim 11, wherein the instructions further cause the wireless device to:
monitor, during the SDT time window, a downlink control channel; and
receive, via the downlink control channel and during the SDT, one or more uplink grants comprising the one or more transmit power control command values.

19. The non-transitory computer-readable medium of claim 18, wherein the one or more uplink grants comprise one or more dynamic grants.

20. The non-transitory computer-readable medium of claim 11, wherein a transmission power of the second uplink transmission comprises a sum of the first PCA state and the one or more transmit power control command values.

* * * * *